US010882041B2

(12) United States Patent
Goel

(10) Patent No.: US 10,882,041 B2
(45) Date of Patent: Jan. 5, 2021

(54) SYSTEMS AND METHODS FOR MOBILE DEVICE ANALYSIS OF NUCLEIC ACIDS AND PROTEINS

(71) Applicant: Nanobiosym, Inc., Cambridge, MA (US)

(72) Inventor: Anita Goel, Boston, MA (US)

(73) Assignee: Nanobiosym, Inc., Cambridge, MA (US)

( * ) Notice: Subject to any disclaimer, the term of this patent is extended or adjusted under 35 U.S.C. 154(b) by 177 days.

(21) Appl. No.: 14/202,791

(22) Filed: Mar. 10, 2014

(65) Prior Publication Data

US 2014/0335527 A1   Nov. 13, 2014

Related U.S. Application Data

(60) Provisional application No. 61/790,354, filed on Mar. 15, 2013.

(51) Int. Cl.
| | | |
|---|---|---|
| *C12Q 1/6806* | (2018.01) | |
| *B01L 3/00* | (2006.01) | |
| *B01L 7/00* | (2006.01) | |
| *G01N 27/447* | (2006.01) | |

(52) U.S. Cl.
CPC ... *B01L 3/502753* (2013.01); *B01L 3/502738* (2013.01); *B01L 7/52* (2013.01); *B01L 2200/04* (2013.01); *B01L 2200/0689* (2013.01); *B01L 2200/141* (2013.01); *B01L 2200/143* (2013.01); *B01L 2300/023* (2013.01); *B01L 2300/025* (2013.01); *B01L 2300/0645* (2013.01); *B01L 2300/0816* (2013.01); *B01L 2300/1822* (2013.01); *B01L 2400/043* (2013.01); *B01L 2400/0478* (2013.01); *B01L 2400/0487* (2013.01); *B01L 2400/0622* (2013.01); *B01L 2400/0672* (2013.01); *G01N 27/44726* (2013.01); *Y02A 90/10* (2018.01)

(58) Field of Classification Search
None
See application file for complete search history.

(56) References Cited

U.S. PATENT DOCUMENTS

| | | | |
|---|---|---|---|
| 4,683,195 A | 7/1987 | Mullis et al. | |
| 4,683,202 A | 7/1987 | Mullis | |
| 4,965,188 A | 10/1990 | Mullis et al. | |
| 5,122,345 A | 6/1992 | Tabor et al. | |
| 5,413,906 A | 5/1995 | Eberle et al. | |
| 5,527,670 A | 6/1996 | Stanley et al. | |
| 5,545,540 A | 8/1996 | Mian | |
| 5,635,358 A | 6/1997 | Wilding et al. | |
| 5,683,875 A | 11/1997 | Lichtenwalter | |
| 5,753,439 A | 5/1998 | Smith et al. | |
| 5,824,477 A | 10/1998 | Stanley | |
| 5,856,174 A | 1/1999 | Lipshutz et al. | |
| 5,922,591 A | 7/1999 | Anderson et al. | |
| 5,939,291 A | 8/1999 | Loewy | |
| 6,010,607 A | 1/2000 | Ramsey | |
| 6,017,696 A | 1/2000 | Heller | |
| 6,033,850 A | 3/2000 | Purvis | |
| 6,174,670 B1 | 1/2001 | Wittwer et al. | |
| 6,197,508 B1 | 3/2001 | Stanley | |
| 6,214,587 B1 | 4/2001 | Dattagupta et al. | |
| 6,261,431 B1 | 7/2001 | Mathies et al. | |
| 6,277,605 B1 | 8/2001 | Wijnhoven | |
| 6,291,185 B1 | 9/2001 | Purvis | |
| 6,303,298 B1 | 10/2001 | Gut et al. | |
| 6,333,157 B1 | 12/2001 | Miller-Jones | |
| 6,344,326 B1 | 2/2002 | Nelson et al. | |
| 6,391,622 B1 | 5/2002 | Knapp et al. | |
| 6,395,489 B1 | 5/2002 | Stanley | |
| 6,408,878 B2 | 6/2002 | Unger et al. | |
| 6,613,527 B1 | 9/2003 | Stanley | |
| 6,613,560 B1 | 9/2003 | Tso et al. | |
| 6,696,022 B1 | 2/2004 | Chan et al. | |
| 6,699,713 B2 | 3/2004 | Milanovich et al. | |
| 6,783,647 B2 | 8/2004 | Culbertson et al. | |
| 6,793,753 B2 | 9/2004 | Unger et al. | |
| 6,818,395 B1 | 11/2004 | Quake et al. | |
| 6,828,786 B2 | 12/2004 | Scherer et al. | |
| 6,911,345 B2 | 6/2005 | Quake et al. | |
| 6,929,030 B2 | 8/2005 | Unger et al. | |
| 6,960,437 B2 | 11/2005 | Enzelberger et al. | |
| 7,013,717 B1 | 3/2006 | Struckmeier et al. | |

(Continued)

FOREIGN PATENT DOCUMENTS

| | | |
|---|---|---|
| CN | 101558302 A | 10/2009 |
| CN | 101868721 A | 10/2010 |

(Continued)

OTHER PUBLICATIONS

Abbondanzieri et al., "Direct observation of base-pair stepping by RNA polymerase," *Nature*, 2005, vol. 438, pp. 460-65 (doi:10.1038/nature04268), Nature Publishing Group.

Andricioaei et al., "Dependence of DNA Polymerase Replication Rate on External Forces: A Model Based on Molecular Dynamics Simulations," *Biophysical Journal*, 2004, vol. 87, pp. 1478-1497, Biophysical Society.

Argaman, M., el al., "Revealing the Mode of Action of DNA Topoisomerase I and its Inhibitors by Atomic Force Microscopy," *Biochemical and Biophysical Research Communications*, 301:789-797 (2003).

Babcock et al., "Relating the Microscopic and Macroscopic Response of a Polymeric Fluid in a Shearing Flow," *Physical Review Letters*, 2000, vol. 85, n. 9, pp. 2018-2021, The American Physical Society.

Bartley, et al., "Exploration of the Transition State for Teriary Structure Formation between an RNA Helix and a Large Structured RNA," *J. Mol. Biol.*, 328:1011-1026 Academic Press (2003).

(Continued)

*Primary Examiner* — Channing S Mahatan
(74) *Attorney, Agent, or Firm* — Saul Ewing Arnstein & Lehr LLP; Brian R. Landry

(57) ABSTRACT

A portable system for extracting, optionally amplifying, and detecting nucleic acids or proteins using a compact integrated chip in combination with a mobile device system for analyzing detected signals, and comparing and distributing the results via a wireless network. Related systems and methods are provided.

50 Claims, 24 Drawing Sheets

(56) References Cited

U.S. PATENT DOCUMENTS

| | | | |
|---|---|---|---|
| 7,033,764 B2 | 4/2006 | Korlach et al. | |
| 7,041,481 B2 | 5/2006 | Anderson et al. | |
| 7,169,556 B2 | 1/2007 | Park et al. | |
| 7,291,504 B2 | 11/2007 | Seul | |
| 7,315,376 B2 | 1/2008 | Bickmore, Jr. et al. | |
| 7,494,791 B2 | 2/2009 | Goel | |
| 8,632,973 B2 | 1/2014 | Goel | |
| 9,862,984 B2 | 1/2018 | Goel | |
| 2003/0027187 A1 | 2/2003 | Strick et al. | |
| 2004/0023207 A1 | 2/2004 | Polansky | |
| 2004/0096846 A1 | 5/2004 | Seul | |
| 2006/0019274 A1 | 1/2006 | Goel | |
| 2007/0160175 A1 | 7/2007 | Lang | |
| 2007/0254279 A1 | 11/2007 | Goel | |
| 2008/0025875 A1 | 1/2008 | Martin et al. | |
| 2008/0081329 A1 | 4/2008 | Elliott et al. | |
| 2008/0160630 A1 | 7/2008 | Liu et al. | |
| 2009/0148933 A1 | 6/2009 | Battrell et al. | |
| 2009/0246834 A1 | 10/2009 | Goel | |
| 2011/0005932 A1* | 1/2011 | Jovanovich | G01N 27/745 204/453 |
| 2011/0244467 A1 | 10/2011 | Haswell | |
| 2011/0312598 A1 | 12/2011 | Azimi et al. | |
| 2011/0312622 A1 | 12/2011 | Azimi et al. | |
| 2012/0082985 A1 | 4/2012 | Zenhausern et al. | |
| 2014/0186940 A1 | 7/2014 | Goel | |
| 2014/0335527 A1 | 11/2014 | Goel | |
| 2016/0016171 A1 | 1/2016 | Goel | |
| 2018/0195104 A1 | 7/2018 | Goel | |

FOREIGN PATENT DOCUMENTS

| | | |
|---|---|---|
| CN | 102089079 A | 6/2011 |
| CN | 102245305 A | 11/2016 |
| EA | 015713 | 10/2011 |
| EP | 1384022 | 1/2004 |
| EP | 1486785 A1 | 12/2004 |
| JP | 2003507026 | 2/2003 |
| RU | 2440575 | 1/2012 |
| RU | 2011133945 | 2/2013 |
| SG | 127211 | 6/2009 |
| WO | WO 92/04470 | 3/1992 |
| WO | WO 95/25177 | 9/1995 |
| WO | 1996001836 | 1/1996 |
| WO | WO 96/41864 | 12/1996 |
| WO | WO 97/08293 | 3/1997 |
| WO | WO 98/00562 | 1/1998 |
| WO | WO 98/02573 | 1/1998 |
| WO | WO 98/50147 | 11/1998 |
| WO | WO 99/09042 | 2/1999 |
| WO | WO 99/33559 | 7/1999 |
| WO | WO 00/49176 | 8/2000 |
| WO | 2000070073 | 11/2000 |
| WO | WO 2001/013088 A1 | 2/2001 |
| WO | WO 02/081729 A2 | 10/2002 |
| WO | WO 02/081729 A3 | 10/2002 |
| WO | WO 2003/104774 A1 | 12/2003 |
| WO | WO 2005/011867 A2 | 2/2005 |
| WO | WO 2005/073691 A1 | 8/2005 |
| WO | WO 2006/029387 A1 | 3/2006 |
| WO | WO 2006/076022 A2 | 7/2006 |
| WO | WO 2007/124105 A2 | 11/2007 |
| WO | WO 2008/057781 A2 | 5/2008 |
| WO | WO 2010/041088 A1 | 4/2010 |
| WO | WO 2010/141139 A1 | 12/2010 |
| WO | WO 2010/141921 A1 | 12/2010 |
| WO | 2011144583 A1 | 11/2011 |
| WO | 2012031027 A1 | 3/2012 |
| WO | 2012073114 | 6/2012 |
| WO | WO 2014/144548 A2 | 9/2014 |

OTHER PUBLICATIONS

Baumann et al., "Stretching of Single Collapsed DNA Molecules," Biophysical Journal, 2000, vol. 78, pp. 1965-1978, Biophysical Society.

Baumann, C.G., et al., "Ionic Effects on the Elasticity of Single DNA Molecules," Proc. Natl. Acad. Sci., USA, 94:6185-6190 (Jun. 1997).

Berger, et al., "Preparation and Properties of an Aqueous Ferrofluid", Journal of Chemical Education, 76(7): 943-948 (Jul. 1999).

Blanchard et al., "tRNA dynamics on the ribosome during translation," PNAS, 2004, vol. 101, n. 35, pp. 12893-12898, National Academy of Sciences.

Block, S.M., et al., "Bead Movement by Single Kinesin Molecules Studied with Optical Tweezers," Nature, 348:348-352 (1990).

Bockelmann et al., "Unzipping DNA with Optical Tweezers: High Sequence Sensitivity and Force Flips," Biophysical Journal, 2002, vol. 82, pp. 1537-1553, Biophysical Society.

Bowen et al., "Single Molecule Studies of Synaptotagmin and Complexin Binding to the SNARE Complex," Biophys., vol. 89, pp. 690-702 (BioFAST, published on line Apr. 8, 2005, pp. 1-56 (with figures)), The Biophysical Society.

Braslavsky et al., "Sequence information can be obtained from single DNA molecules," PNAS, 2003, vol. 100, n. 7, pp. 3960-3964, National Academy of Sciences.

Brody et al., "Significance and statistical errors in the analysis of DNA microarray data," PNAS, 2002, vol. 99, n. 20, pp. 12975-12978, National Academy of Sciences.

Bryant et al., "Structural transitions and elasticity from torque measurements on DNA" Nature, 2003, vol. 424, pp. 338-106, Nature Publishing Group.

Bustamante et al., "Single-molecule studies of DNA mechanics,:" Current Opinion in Structural Biology, 2000, vol. 10, pp. 279-285, Elsevier Science Ltd.

Bustamante et al., "Ten years of tension: single-molecule DNA mechanics," Nature, 2003, vol. 421, pp. 423-427, Nature Publishing Group.

Bustamante et al., "The Physics of Molecular Motors," Acc. Chem. Res., 2001, vol. 34, pp. 412-420, American Chemical Society.

Bustamante, et al., "The Physics of Molecular Motors," Acc. Chem. Res., vol. 34, pp. 412-420, American Chemical Society.

Butler et al., "Brownian dynamics simulations of a flexible polymer chain which includes continuous resistance and multibody hydrodynamic interactions," The Journal of Chemical Physics, 2005, vol. 122, pp. 014901-1-014901-11, American Institute of Physics.

Caldarelli-Stefano, R., et al., "Use of magnetic beads for tissue DNA extraction and 1S6110 Mycobacterium tuberculosis PCR", J. Clin. Pathol: Mol. Pathol, 52: 158-163 (1999).

Charvin et al., "Single-molecule study of DNA unlinking by eukaryotic and prokaryotic type-II topoisomerases," PNAS, 2003, vol. 100, n. 17, National Academy of Sciences. pp. 9820-9825 (Aug. 19, 2003).

Charvin, G., "Tracking Topoisomerase Activity at the Single-Molecule Level", Annu. Rev. Biophys. Biomol. Struct., 34: 201-19 (2005).

Chou et al., "Disposable Microdevices for DNA Analysis and Cell Sorting," Proc. Solid-State Sensor and Actuator Workshop, Hilton Head, SC, Jun. 8-11, 1998, pp. 11-14.

Chou et al., "Integrated Elastomer Fluidic Lab-on-a-chip-Surface Patterning and DNA Diagnostics," Proceedings of Solid State Sensor and Actuator Workshop, Hilton Head, Jun. 2000., pp. 11-14.

Chou et al., "Microfabricated Devices for Sizing DNA and Sorting Cells," Micro- and Nanofabricated Structures and Devices for Biomedical Environmental Applications, Paul L. Gourley, Editor, Proceedings of SPIE, vol. 3258, pp. 181-187, 1998.

Chou, et al., "A Microfabricated Rotary Pump," Biomedical Microdevices, 3(4):323-330, Kluwer Academic Publishers (2001).

Cluzel, P., et al., "DNA: An Extensible Molecule", Science, 271: 792-794 (Feb. 1996).

Davenport et al., "Single-Molecule Study of Transcriptional Pausing and Arrest by E. coli RNA Polymerase," Science, 2000, vol. 287, pp. 2497-2500, American Society for the Advancement of Science.

(56) References Cited

OTHER PUBLICATIONS

Dessinges et al., "Single-molecule assay reveals strand switching and enhanced processivity of UvrD," *PNAS*, 2004, vol. 101, n. 17, pp. 6439-6444, National Academy of Sciences.
Essevaz-Roulet et al., "Mechanical separation of the complementary strands of DNA," *Proc. Natl. Acad. Sci. USA*, 1997, vol. 94, pp. 11935-11940, The National Academy of Sciences.
European Search Report for European Patent Application No. 05856709.0, "Nano-PCR: Methods and Devices for Nucleic Acid Amplification and Detection" filed May 13, 2005.
Eyal et al., "Velocity-independent microfluidic flow cytometry," *Electrophoresis*, 2002, vol. 23, pp. 2653-2657, Wiley-VCH Verlag GmbH.
Filippova et al., "Quantifying Double-Strand Breaks and Clustered Damages in DNA by Single-Molecule Laser Fluorescence Sizing," *Biophysical Journal*, 2003, vol. 84, pp. 1281-1290, Biophysical Society.
Forde et al., "Using mechanical force to probe the mechanism of pausing and arrest during continuous elongation by *Escherichia coli* RNA polymerase," *PNAS*, vol. 99, n. 18, pp. 11682-11687, National Academy of Sciences. (Sep. 3, 2002).
Frothingham, "Applications of the Polymerase Chain Reaction to Infectious Disease Diagnosis," *Annals of Saudi Medicine*, 1996, vol. 16, pp. 657-665.
Fu et al., "A microfabricated fluorescence-activated cell sorter," *Nature Biotechnology*, 1999, vol. 17, pp. 1109-1111, Nature America Inc.
Fu et al., "An Integrated Microfabricated Cell Sorter," *Anal. Chem.*, 2002, vol. 74, pp. 2451-2457, American Chemical Society.
Gai, Hongwei, et al., "Visualizing Chemical Interactions in Life Sciences with Wide-Field Fluorescence Microscopy Towards the Single-Molecule Level," *Trends in Analytical Chemistry*, 26:980-992 (2007).
Gerton et al., "Tip-Enhanced Fluorescence Microscopy at 10 Nanometer Resolution," *Physical Review Letters*, 2004, vol. 93, n. 18, pp. 180801-1-4, The American Physical Society. pp. 180801-1-180801-4 (Oct. 29, 2004).
Goel et al., "Tuning and switching a DNA polymerase motor with mechanical tension," *PNAS*, 2003, vol. 100, n. 17, pp. 9699-9704, National Academy of Sciences.
Goel et al., "Tuning DNA "strings": Modulating the rate of DNA replication with mechanical tension," *PNAS*, 2001, vol. 98, n. 15, pp. 8485-8489, National Academy of Sciences.
Goel et al., "Unifying Themes in DNA Replication: Reconciling Single Molecule Kinetic Studies with Structural Data on DNA Polymerases," *Journal of Biomolecular Structure & Dynamics*, 2002, vol. 19, n. 4, pp. 1-14, Adenine Press.
Goel, A., et al., "Harnessing Biological Motors to Engineer Systems for Nanoscale Transport and Assembly", *Nature Nanotechnology*, (Jul. 1-11, 2008).
Gore et al., "Bias and error in estimates of equilibrium free-energy differences from nonequilibrium measurements," *PNAS*, 2003, vol. 100, n. 22, National Academy of Sciences. (Oct. 28, 2003).
Ha, T., et al., "Ligand-Induced Conformational Changes Observed in Single RNA Molecules," *Proc. Natl. Acad. Sci. USA*, 96:9077-9082 (1999).
Hansen et al., "A robust and scalable microfluidic metering method that allows protein crystal growth by free interface diffusion," *PNAS*, 2002, vol. 99, n. 26, National Academy of Sciences. pp. 16531-16536 (Dec. 24, 2002).
Hansen et al., "Microfluidics in structural biology: smaller, faster . . . better," *Current Opinion in Structural Biology*, 2003, vol. 13, pp. 538-544, Elsevier.
Hansen et al., "Systematic investigation of protein phase behavior with a microfluidic formulator," *PNAS*, 2004, vol. 101, n. 40, pp. 14431-14436, National Academy of Sciences.
Harada, Y., et al., "Single-Molecule Imaging of RNA Polymerase-DNA Interactions in Real Time," *Biophysical Journal*, 76:709-715 (1999).

Hong et al., "A nanoliter-scale nucleic acid processor with parallel architecture," *Nature Biology*, 2004, vol. 22, n. 4, pp. 435-439, Nature Publishing Group.
Hong et al., "Integrated nanoliter systems," *Nature Biology*, 2003, vol. 21, n. 10, pp. 1179-1183, Nature Publishing Group.
Huang, "Microfluidic Devices for Genomic Analysis," A dissertation presented to the faculty of Princeton University in candidacy for the degree of Doctor of Philosophy,—Oct. 2003, pp. 1-95.
Hur et al., "Dynamic of dilute and semidilute DNA solutions in the start-up of shear flow," *J. Rheol*, 2001, vol. 45, n. 2, pp. 421-450, The Society of Rheology, Inc.
Hur et al., "Dynamics and configurational fluctuations of single DNA molecules in linear mixed flows," *Physical Review*, 2002, vol. 66, pp. 011915-1-011915-4, The American Physical Society.
International Preliminary Report on Patentability for PCT/US2005/016638, "Nano-PCR: Methods and Devices for Nucleic Acid Amplification and Detection" dated Oct. 30, 2007.
International Preliminary Report on Patentability, PCT/US2007/009747, "Single-Molecule Platform for Drug Discovery: Methods and Apparatuses for Drug Discovery, Including Discovery of Anti-cancer and Antiviral Agents" dated Oct. 30, 2008.
International Search Report for PCT/US2005/016638, "Nano-PCR: Methods and Devices for Nucleic Acid Amplification and Detection" dated Oct. 3, 2007.
Johnson et al., "Early Steps of Supported Bilayer Formation Probed by Single Vesicle Fluorescence Assays," *Biophysical Journal*, 2002, vol. 83, pp. 3371-3379, Biophysical Society.
Kartalov et al., "Microfluidic device reads up to four consecutive base pairs in DNA sequencing-by-synthesis," *Nucleic Acids Research*, 2004, vol. 32, n. 9, pp. 2873-2879, Oxford University Press.
Keller et al., "Relating Single-Molecule Measurements to Thermodynamics," *Biophysical Journal*, 2003, vol. 84, pp. 733-738, Biophysical Society.
Kim et al., "Mg2+-dependent conformational change of RNA studied by fluorescence correlation and FRET on immobilized single molecules," *PNAS*, 2002, vol. 99, n. 7, pp. 4284-4289, National Academy of Sciences.
Kovarova et al., "New specificity and yield enhancer of polymerase chain reactions," *Nucleic Acids Research*, 2000, vol. 28, n. 13, pp. i-iv, Oxford University Press.
Kuo, S.C. and Sheetz, M.P., "Force of Single Kinesin Molecules Measured with Optical Tweezers," *Science*, 260:232-234 (1993).
Ladoux et al., "Direct imaging of single-molecules: from dynamics of a single DNA chain to the study of complex DNA-protein interactions," *Science Progress*, 2001, vol. 84, n. 4, pp. 267-290.
Lai et al., "Microsatellite mutations during the polymerase chain reaction: mean field approximations and their applications," *Journal of Theoretical Biology*, 2003, vol. 224, pp . 127-137, Elsevier Ltd.
Lang et al., "Combined optical trapping and single-molecule fluorescence," *Journal of Biology*, 2003, vol. 2, n. 1, Article 6, 2003 (published online at jbiol.com/content/2/1/6). 4 pages.
Lang et al., "Simultaneous, coincident optical trapping and single-molecule fluorescence," *Nature Methods*, 2004, vol. 1, n. 2, pp. 1-7, Nature Publishing Group. (Nov. 2004).
Larson et al., "Brownian dynamics simulations of a DNA molecule in an extensional flow field," *J. Rheol.*, 1999, vol. 42, n. 2, pp. 267-304, The Society of Rheology, Inc.
Larson, "Hydrodynamics of a DNA molecule in a flow field," *Physical Review*, 1997, vol. 55, n. 2, pp. 1794-1797, The American Physical Society.
Li et al., "DNA molecules and configurations in a solid-state nanopore microscope," *Nature Materials*, 2003, vol. 2, pp. 611-615, Nature Publishing Group.
Li et al., "Rapid spontaneous accessibility of nucleosomal DNA," *Nature Structural & Molecular Biology*, 2005, vol. 12, n. 1, pp. 46-53, Nature Publishing Group.
Lia et al., "Supercoiling and denaturation in Gal repressor/heat unstable nucleoid protein (HU)-mediated DNA looping," *PNAS*, 2003, vol. 100, n. 20, National Academy of Sciences. pp. 11373-11377 (Sep. 30, 2003).
Liphardt et al., "Reversible Unfolding of Single RNA Molecules by Mechanical Force," *Science*, 2001, vol. 292, pp. 733-737, American Society for the Advancement of Science.

(56) References Cited

OTHER PUBLICATIONS

Liu et al., A nanoliter rotary device for polymerase chain reaction,: *Electrophoresis*, 2002, vol. 23, pp. 1531-1536, Wiley-VCH Verlag GmbH.

Liu et al., "Solving the "World-to-Chip" Interface Problem with a Microfluidic Matrix," *Analytical Chemistry*, vol. 75, n. 18, pp. 4718-4723, American Chemical Society. (Aug. 16, 2003).

Maier et al, "Replication by a single DNA polymerase of a stretched single-stranded DNA," *PNAS*, 2000, vol. 97, n. 22, pp. 12002-12007, National Academy of Sciences.

Marko et al., "Twist and shout (and pull): Molecular chiropractors undo Dna," *Proc. Natl. Acad. Sci. USA*, 1997, vol. 94, pp. 11770-11772, The National Academy of Sciences.

Meiners et al., "Femtonewton Force Spectroscopy of Single Extended DNA Molecules," *Physical Review Letters*, 2000, vol. 84, n. 21, The American Physical Society. pp. 5014-5017 (May 22, 2000).

Michael et al., "Evaluation of Polymerase Chain Reaction for Rapid Diagnosis of Tuberculous Meningitis," *Indian Journal of Tuberculosis*, 2002, vol. 49, pp. 133-137.

Munce et al., "Single Cell Analysis on a Microchip Platform using Optical Tweezers and Optical Scissors," in *Micromachining and Microfabrication 2003:, Microfluidics, BioMEMS, and Medical Microsystems*, SPIE 4982, San Jose, CA, Jan. 27-29, 2003, pp. 28-36.

Namasivayam et al., "Light-Induced Molecular Cutting: Localized Reacation on a Single DNA Molecule," *Analytical Chemistry*, 2003, vol. 75, n. 16, pp. 4188-4194, American Chemical Society.

Neuman et al., "Optical trapping," *Review of Scientific Instruments*, 2004, vol. 75, n. 9, American Institute of Physics, pp. 2787-2808 (Sep. 2004).

Neuman et al., "Ubiquitous Transcriptional Pausing Is Independent of RNA Polymerase Backtracking," *Cell*, 2003, vol. 115, pp. 437-447, Cell Press.

Notomi, T., et al., "Loop-mediated isothermal amplification of DNA", *Nucleic Acids Research*, 28(12): e63, 7 pgs (2000).

Partial International Search Report for International Application No. PCT/US2014/029008, "Systems and Methods for Mobile Device Analysis of Nucleic Acids and Proteins" dated Jul. 22, 2014.

Perkins et al., "Direct Observation of Tube-Like Motion of a Single Polymer Chain," *Science*, 1994, vol. 264, pp. 819-822, American Society for the Advancement of Science.

Perkins et al., "Forward and Reverse Motion of Single RecBCD Molecules on DNA," *Biophysical Journal*, 2004, vol. 86, pp. 1640-1648, Biophysical Society.

Perkins et al., "Relaxation of a Single DNA Molecule Observed by Optical Microscopy," *Science*, 1994, vol. 264, pp. 822-826, American Society for the Advancement of Science.

Perkins et al., "Sequence-Dependent Pausing of Single Lambda Exonuclease Molecules," *Science*, 2003, vol. 301, pp. 1914-1918, American Society for the Advancement of Science.

Perkins et al., "Single Polymer Dynamics in an Elongational Flow," *Science*, 1997, vol. 276, pp. 2016-2021, American Society for the Advancement of Science.

Perkins et al., "Stretching of a Single Tethered Polymer in a Uniform Flow," *Science*, 1995, vol. 268, pp. 83-87, American Society for the Advancement of Science.

Pope, L. H., et al., "Force-induced melting of a short DNA double helix," *Eur. Biophys. J.*, 30: 53-62 (2001) (month of publication not available).

Qiu, X., et al., "A portable, integrated analyzer for microfluidic—based molecular analysis", 13: 809-817 (2011).

Quake et al., "From Micro- to Nanofabrication with Soft Materials," *Science*, 2000, vol. 290, pp. 1536-1540, American Society for the Advancement of Science.

Quake et al., "The dynamics of partially extended single molecules of DNA," *Nature*, 1997, vol.3 88, pp. 151-154, Nature Publishing Group.

Quint et al., "Reliability of Methods for Hepatitis B Virus DNA Detection," *Journal of Clinical Microbiology*, 1995, vol. 33, n. 1, pp. 225-228, American Society for Microbiology.

Reese et al., "Microfabricated Fountain Pens for High-Density DNA Arrays," *Genome Research*, 2003, vol. 13, pp. 2348-2352, Cold Spring Harbor Laboratory Press.

Rice, S.E., "Building and Using Optical Traps to Study Properties of Molecular Motors", *Methods in Enzymalogy*, 361: 112-133 (2003).

Ritort et al., "A two-state kinetic model for the unfolding of single molecules by mechanical force," *PNAS*, 2002, vol. 99, n. 21, pp. 13544-13548, National Academy of Sciences.

Rolland et al., "Solvent-Resistant Photocurable "Liquid Teflon" for Microfluidic Device Fabrication," *J. Am. Chem. Soc.*, 2004, vol. 126, pp. 2322-2323, American Chemical Society.

Ros et al., "Single molecule force spectroscopy on ligand-DNA complexes: from molecular binding mechanisms to biosensor application," *Journal of Biotechnology*, 2004, vol. 112, pp. 5-12, Elsevier.

Rosenfeld et al., "Stepping and Stretching," *The Journal of Biological Chemistry*, 2003, vol. 278, n. 20, pp. 18550-18556, JBC Papers in Press.

Rouzina, I. and Bloomfield, V.A., "Force-Induced Melting of the DNA Double Helix," *Biophys. J.*, 80:894-900 (2001).

Rouzina, I. et al., "Force-Induced Melting of the DNA Double Helix," Biophysical Journal, 80:882-893 (2001).

Russell et al., "Exploring the folding landscape of a structured RNA," *PNAS*, 2002, vol. 99, n. 1, pp. 155-160, National Academy of Sciences.

Rusu et al., "Direct Integration of Micromachined Pipettes in a Flow Channel for Single DNA Molecule Study by Optical Tweezers," *Journal of Microelectromechanical Systems*, 2001, vol. 10, n. 2, pp. 238-245.

Schäfer, A. and Radmacher, M., "Influence of Myosin II Activity on Stiffness of Fibroblast Cells," *Acta Biomaterialia*, 1:273-280 (2005).

Scherer and Quake Monolithic Integration of Microfluidics and Optoelectronics for Biological Analysis, ARO Grant No. DAAD 19-00-1-0392 DARPA Biofips Report on Standard Form 298, Apr. 15, 2004.

Schnitzer et al., "Force production by single kinesin motors," *Nature Cell Biology*, 2000, vol. 2, pp. 718-723, Macmillan Magazines, Ltd.

Schroeder et al., "Dynamics of DNA in the Flow-Gradient Plane of Steady Shear Flow: Observations and Simulations," *Macromolecules*, 2005, vol. 38, pp. 1967-1978, American Chemical Society.

Schroeder et al., "Effect of Hydrodynamic Interactions on DNA Dynamics in Extensional Flow: Simulation and Single Molecule Experiment," *Macromolecules*, 2004, vol. 37, pp. 9242-9256, American Chemical Society.

Search Report for Singapore Application No. 200903281-4 "Nano-PCR: Methods and Devices for Nucleic Acid Amplification and Detection", dated Dec. 10, 2013.

Shaevitz et al., "Backtracking by single RNA polymerase molecules observed at near-base-pair resolution," *Nature*, 2003, vol. 426, pp. 684-687, Nature Publishing Group.

Shivashankar et al., "RecA polymerization on double-stranded DNA by using single-molecule manipulation: The role of ATP hydrolysis," *PNAS*, 1999, vol. 96, pp. 7916-7921, National Academy of Sciences.

Singh-Zocchi et al., "Single-molecule detection of DNA hybridization," *PNAS*, 2003, vol. 100, n. 13, pp. 7606-7610, National Academy of Sciences.

Smith et al., "Dynamical Scaling of DNA Diffusion Coefficients," *Macromolecules*, 1996, vol. 29, pp. 1372-1373, American Chemical Society.

Smith et al., "Response of Flexible Polymers to a Sudden Elongational Flow," *Science*, 1998, vol. 281, pp. 1335-1340, American Society for the Advancement of Science.

Smith et al., "Self-Diffusion of an Entangled DNA Molecule by Reptation," *Physical Review Letters*, 1995, vol. 75, n. 2, The American Physical Society. pp. 4146-4149 (Nov. 27, 1995).

Smith et al., "Single-Polymer Dynamics in Steady Shear-Flow," *Science*, 1999, vol. 283, pp. 1724-1727, American Society for the Advancement of Science.

Smith et al., "The bacteriophage phi 29 portal motor can package DNA against a large internal force," *Nature*, 2001, vol. 413, pp. 748-752, Nature Publishing Group.

(56) References Cited

OTHER PUBLICATIONS

Smith, S.B. et al., "Direct Mechanical Measurements of the Elasticity of Single DNA Molecules by Using Magnetic Beads," Science, 258:1122-1126 (1992).
Smith, S.B. et al., "Overstretching B-DNA: The Elastic Response of Individual Double-Stranded and Single-Stranded DNA Molecules," Science, 271:795-799 (1996).
Spies, M., et al., "A Molecular Throttle: The Recombination Hotspot χ Controls DNA Translocation by the RecBCD Helicase," Cell Press, 114:647-654 (2003).
Strick et al., "Micro-mechanical measurement of the torsional modulus of DNA" Genetica, 1999, vol. 106, pp. 57-62, Springer.
Strick et al., "Phase coexistence in a single DNA molecule," Physica A, 1999, v. 263, pp. 392-404, Elsevier Science.
Strick, T. et al., "Twisting and Stretching Single DNA Molecules," Progress in Biophysics & Molecular Biology, 74:115-140 (2000).
Strunz, T., et al., "Dynamic force spectroscopy of single DNA molecules," Proc. Natl. Acad. Sci. USA, 96: 11277-11282 (Sep. 1999).
Supplementary European Search Report, European Application No. 05 856 709.0-2402, "Nano-PCR: Methods and Devices for Nucleic Acid Amplification and Detection" dated May 23, 2009.
Supplementary European Search Report, European Application No. 07775933.0.2404/2016415, "Nano-PCR: Methods and Devices for Nucleic Acid Amplification and Detection" dated Nov. 16, 2009.
Svoboda-Newman et al., "Detection of hepatitis C by RT-PCR in formalin-fixed paraffin-embedded tissue from liver transplant patients," Diagn. Mol. Pathol., 1997, vol. 6, n. 2, pp. 123-129.
Thorsen et al., "Dynamic Pattern Formation in a Vesicle-Generating Microfluidic Device," Physical Review Letters, 2001, vol. 86, n. 18, The American Physical Society. pp. 4163-4166 (Apr. 30, 2001).
Thorsen et al., "Microfluidic Large-Scale Integration," Science, 2002, vol. 298, pp. 580-584, American Society for the Advancement of Science.
Transmittal of International Search Report and Written Opinion of the International Searching Authority, PCT/US2007/009747, "Single-Molecule Platform for Drug Discovery: Methods and Apparatuses for Drug Discovery, Including Discovery of Anticancer and Antiviral Agents" dated Sep. 17, 2008.
Van Dam et al., "Gene Expression Analysis with Universal n-mer Arrays," Genome Research, 2002, vol. 12, pp. 145-152, Cold Spring Harbor Laboratory Press.
Van Den Broek et al., "DNA-tension dependence of restriction enzyme activity reveals mechanochemical properties of the reaction pathway," Nucleic Acids Research, 2005, vol. 33, n. 8, pp. 2676-2684, Oxford University Press.
Van Oijen et al., "Single-Molecule Kinetics of Exonuclease Reveal Base Dependence and Dynamic Disorder," Science, 2003, vol. 301, pp. 1235-1238.
Vincent, M., "Helicase-dependent isothermal DNA amplification", EMBO Reports, 5(8): 795-800 (2004).
Voulgarakis, N.K., et al., "Probing The Mechanical Unzipping of DNAS", PCAS, 87(15): 64-70 (Feb. 2008).
Voulgarakis, N.K., et al., "Sequencing DNA by Dynamic Force Spectroscopy: Limitations and Prospects," Nano Letters, 6(7):1483-1486 (2006).
Walker, G.T., et al., "Isothermal in vitro amplification of DNA by a restriction enzyme/DNA polymerase system," Proc. Natl. Acad. Sci USA, 89: 392-396 (Jan. 1992).
Wang et al., "Force and Velocity Measured for Single Molecules of RNA Polymerase," Science, 1998, vol. 282, pp. 902-907, American Association for the Advancement of Science.
Weninger et al., "Single-molecule studies of SNARE complex assembly reveal parallel and antiparallel configurations," PNAS, 2003, vol. 100, n. 25, pp. 14800-14805, National Academy of Sciences.
Wong et al., "Deformation of DNA molecules by hydrodynamic focusing," J. Fluid Mech., 2003, vol. 497, pp. 55-65, Cambridge University Press.
Wulte, G.J.L. et al., "Single-molecule studies of the effect of template tension on T7 DNA polymerase activity," Nature, 404:103-106 (2000).
Yin, H., et al., "Transcription Against an Applied Force," Science, 270:1653-1657 (1995).
Zhuang et al., "A Single-Molecule Study of RNA Catalysis and Folding," Science, 2000, vol. 288, pp. 2048-2051, American Society for the Advancement of Science.
Zhuang et al., "Correlating Structural Dynamics and Function in Single Ribozyme Molecules," Science, 2002, vol. 296, pp. 1473-1476, American Society for the Advancement of Science.
Zhuang et al., "Fluorescence quenching: a tool for single-molecule protein-folding study," PNAS, 2000, vol. 97, n. 26, pp. 14241-14244, National Academy of Sciences.
Zimmerman et al., "DNA stretching on functionalized gold surfaces," Nucleic Acids Research, 1994, vol. 22, n. 3, pp. 492-497, Oxford University Press.
Final Office Action for U.S. Appl. No. 11/790,071, "Single Molecule Platform for Drug Discovery: Methods and Apparatuses for Drug Discovery, Including Discovery of Anticancer and Antiviral Agents", dated: Mar. 3, 2016.
Office Action for U.S. Appl. No. 12/321,825, "Nano-PCR Methods and Devices for Nucleic Acid Amplification and Detection", dated: Jun. 14, 2011.
International Preliminary Report on Patentability for International Searching Authority, or the Declaration for International Application No. PCT/US2014/029008, "Systems and Methods for Mobile Device Analysis of Nucleic Acids and Proteins", dated Sep. 15, 2015.
Notification of Transmittal of the International Search Report and the Written Opinion of the International Searching Authority, or the Declaration for International Application No. PCT/US2014/029008, "Systems and Methods for Mobile Device Analysis of Nucleic Acids and Proteins", dated Oct. 13, 2014.
Prudnikov, D., et al., "Chemical methods of DNA and RNA fluorescent labeling", Nucleic Acids Research, 1996, 24(220): 4535-4542.
Xiando Qiu, et al., "A portable, integrated analyzer for microfluidic-based molecular analysis", Biomed Microdevices, vol. 13 (May 27, 2011), pp. 809-817.
Final Office Action for U.S. Appl. No. 14/106,399, "Nano-PCR: Methods and Devices for Nucleic Acid Amplification and Detection", dated Aug. 19, 2016.
Namasivayam V., et al., "Electrostretching DNA molecules using poler-enhanced media within microfabricated devices", Analytical Chemistry,2002, 74(14): 3378-3385.
Office Action for U.S. Appl. No. 11/790,071, "Single Molecule Platform for Drug Discovery: Methods and Apparatuses for Drug Discovery, Including Discovery of Anticancer and Antiviral Agents", dated Aug. 29, 2016.
Search Report for China Application No. 201480021900.2, "Systems and Methods for Mobile Device Analysis of Nucleic Acids and Proteins", dated Aug. 17, 2016.
Search Report for Singapore Application No. 11201507590Q, "Systems and Methods for Mobile Device Analysis of Nucleic Acids and Proteins", dated Jun. 21, 2016.
Washizu, M., et al., "Manipulation of Dna Molecules in Micro-Structures", DECHEMA Monographs, 1996, 132: 177-194.
Final Office Action for U.S. Appl. No. 11/790,071, "Single Molecule Platform for Drug Discovery: Methods and Apparatuses for Drug Discovery, Including Discovery of Anticancer and Antiviral Agents", dated Jan. 23, 2017.
Search Report for China Application No. 201480021900.2, "Systems and Methods for Mobile Device Analysis of Nucleic Acids and Proteins", dated Mar. 9, 2017.
Office Action for U.S. Appl. No. 14/106,399, "Nano-PCR: Methods and Devices for Nucleic Acid Amplification and Detection", dated Mar. 28, 2017.
Fang, Z., et al., "Microfluidic Analysis Chip", pp. 123-125, Science Press, Mar. 2003.
Wang, Z., "Design and Manufacture of MicroSystems", First Edition, p. 603, Tsinghua University Press, 2008.

(56) References Cited

OTHER PUBLICATIONS

Bennett, S., "A Brief History of Automatic Control", IEEE Control Systems, Jun. 1996, 17-25.
Christen et al., "Localized closed-loop temperature control anhd regulation in hybrid silicon/silicone life science microsystems", IEEE, 2007, 2886-2889.
Illingworth, Control Systems 2003, University of Leeds, School of Biochemistry and Molecular Biology, Feb. 21, 2003, 13 pgs.
Liu et al., "A Low-Cost Microfluidic Chip for Rapid Genotyping of Malaria-Transmitting Mosquitoes", PLOS One, 7(8): 7 pgs. (Aug. 2012).
Mann et al. "Control Systems and Homeostatis, in The Nervous System in Action, Chapter 2", Jul. 20, 2011, 7 pages, (www://michaeldmann.net/mann2.html.
Miller et al., "Microfluidic device incorporating closed loop feedback control for uniform and tunable production of micro-droplets", Lab on a Chip, May 2010, 10: 1293-1301.
Mosadegh et al., "Next-generation integrated microfluidic circuits" Lab on a Chip, Sep. 2011, 11(17): 2813-2818.
Munson et al., "Image-based feedback control for real-time sorting of microspheres in a microfluidic device", Lab on a Chip, 2010 Sep. 2010, 10: 2402-2410.
Neuman et al. "Single-Molecule force spectroscopy: optical tweezers, magnetic tweezers and atomic force Microscopy" Nat. Methods. Jun. 2008, 5(6): 491-505.
Uhlendorf et al, "Long-term model predictive control of gene expression at the population and single-cell levels", PNAS, Aug. 28, 2012, 109(35): 14271-14276.
Wang et al., "Stretching DNA with Optical Tweezers", Biophysical Journal, 72: 1335-1346 (Mar. 1997).
Yang et al., "Integrated Multi-Process Microfluidic Systems for Automating Analysis", JALA Charlottesv Va. Jun. 2010, 15(3): 198-209.
Notice of Allowance for U.S. Appl. No. 11/790,071, "Single-Molecule Platform for Drug Discovery: Methods and Apparatuses for Drug Discovery, Including Discovery of Anticancer and Antiviral Agents", dated Aug. 30, 2017.
Office Action for U.S. Appl. No. 14/777,194, "Systems and Methods for Mobile Device Analysis of Nucleic Acids and Proteins", dated Sep. 25, 2017.
Design Technique and Quality Assurance in AIDS Lab, Wang, Y., p. 132, Science Press, Jan. 15, 2009.
"Introduction to Biophotonics", Prasad, P.N., pp. 435-437, Zhejiang University Press 2006.
Office Action for U.S. Appl. No. 14/106,399, "Nano-PCR: Methods and Devices for Nucleic Acid Amplification and Detection ", dated Jan. 22, 2018.
Burger et al., "IR Thermocycler for Centrifugal Microfluidic Platform with Direct On-Disk Wireless Temperature Measurement System", IEEE, 2011, 2867-2870.A270.
Gong, J., et al., "Portable Digital Microfluidics Platform with Active but Disposable Lab-On-Chip", Technical Digest, 17th, Maastricht, Netherlands, Jan. 25-29, 2004, pp. 355-358.
Final Office Action for U.S. Appl. No. 14/777,194, "Systems and Methods for Mobile Device Analysis of Nucleic Acids and Proteins", dated Oct. 10, 2018.
Search Report for Russian Application No. 2015144109, "Systems and Methods for Mobile Device Analysis of Nucleic Acids and Proteins", dated Feb. 20, 2018.
EPO Examination Report, Application No. 14722884.5, dated Dec. 16, 2019.
IEEE International Conference on Micro Electro Mechanical Systems, Technical Digest, 17th, Maastricht, Netherlands, Jan. 25-29, 2004, pp. 355-358.
"Final Office Action received for U.S. Appl. No. 11/128,301, dated Jun. 5, 2008", 16 pages.
"Final Office Action received for U.S. Appl. No. 11/790,071, dated Jan. 14, 2015", 18 pages.
"Final Office Action received for U.S. Appl. No. 11/790,071, dated Jun. 29, 2010", 15 pages.
"Final Office Action received for U.S. Appl. No. 14/106,399, dated May 29, 2020", 20 pages.
"Final Office Action received for U.S. Appl. No. 14/106,399, dated Nov. 9, 2018", 32 pages.
"Final Office Action received for U.S. Appl. No. 14/777,194, dated Jan. 18, 2019", 22 pages.
"Final Office Action received for U.S. Appl. No. 15/860,205, dated Oct. 17, 2019", 13 pages.
"Non-Final Office Action received for U.S. Appl. No. 11/790,071, dated Jul. 14, 2014", 20 pages.
"Non-Final Office Action received for U.S. Appl. No. 11/790,071, dated Nov. 17, 2009", 11 pages.
"Non-Final Office Action received for U.S. Appl. No. 11/790,071, dated Sep. 2, 2015", 16 pages.
"Non-Final Office Action Received for U.S. Appl. No. 12/321,825, dated Jun. 29, 2010", 18 pages.
"Non-Final Office Action received for U.S. Appl. No. 14/106,399, dated Feb. 22, 2016", 19 pages.
"Non-Final Office Action received for U.S. Appl. No. 14/106,399, dated Sep. 3, 2019", 33 pages.
"Non-Final Office Action received for U.S. Appl. No. 15/860,205, dated Apr. 11, 2019", 10 pages.
"Non-Final Office Action Received for U.S. Appl. No. 11/128,301, dated Aug. 22, 2007", 22 pages.
"Notice of Allowance received for U.S. Appl. No. 12/321,825, dated Sep. 16, 2013", 11 pages.
"Notice of Allowance Received for U.S. Appl. No. 11/128,301, dated Dec. 30, 2008", 14 pages.
Marcus, C.M. , "Feedback control of a quantum dot", To appear in the Proceedings of the 4th Experimental Chaos Conference, Boca Raton, FL 1998 (World, Singapore, 1998), pp. 1-10 (https://arxiv.org/ftp/cond-mat/papers/9807/9807380.pdf) (in particular abstract and intro).
Mayr, O. , "The Orgins of Feedback Control"MIT Press Cambridge, 1970.
Xia, et al., "Clinical Molecular Diagnostics", p. 23, Zhongzhan University Press, Jul. 2012.

* cited by examiner

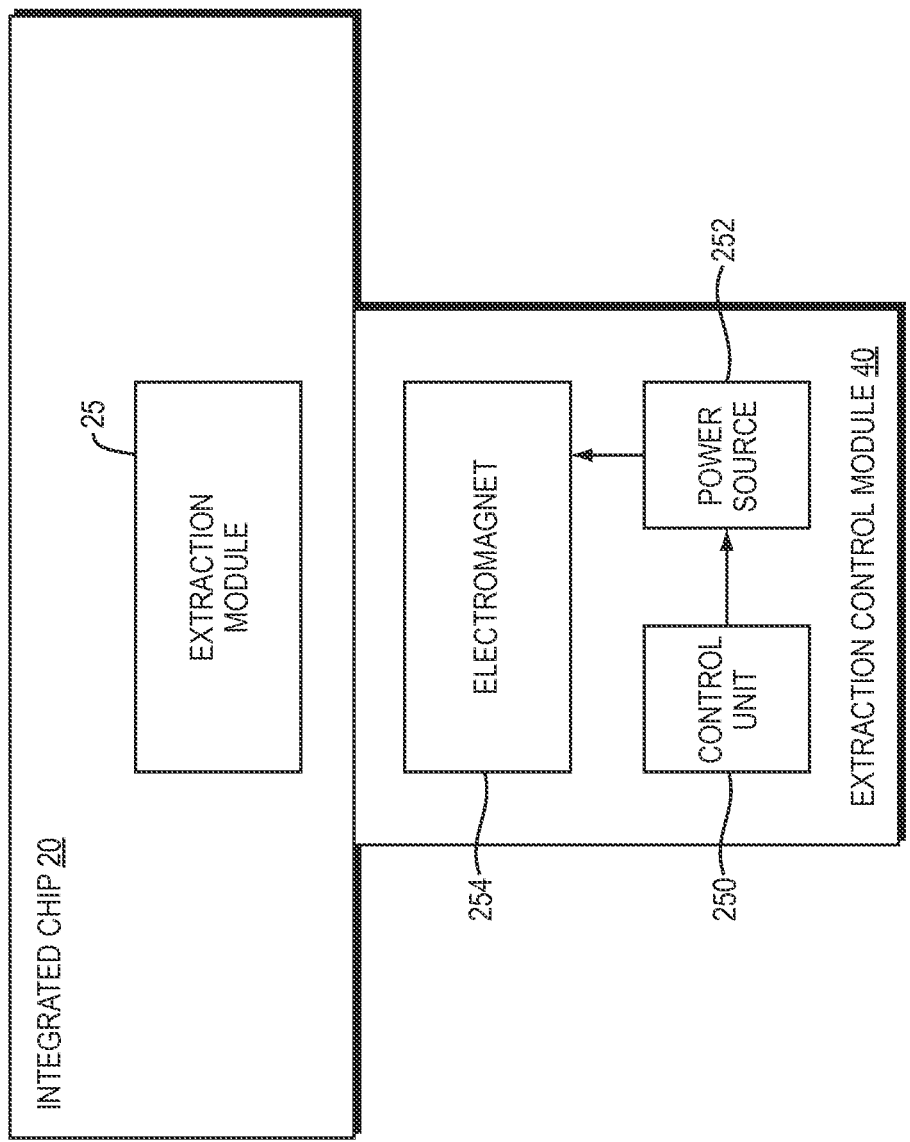

| TIME | EXTRACTION | AMPLIFICATION | DETECTION | DATA PROCESSING | SAMPLE-TO-ANSWER |
|---|---|---|---|---|---|
| | 4 MIN. | 4 MIN. | 4 MIN. | 5 MIN. | < 20 MIN. |
| IMPLEMENTATION | 35g INTEGRATED CHIP | | | 25g APPLICATION-SPECIFIC INTEGRATED CIRCUIT | ~60g CARTRIDGE |

FIG. 3

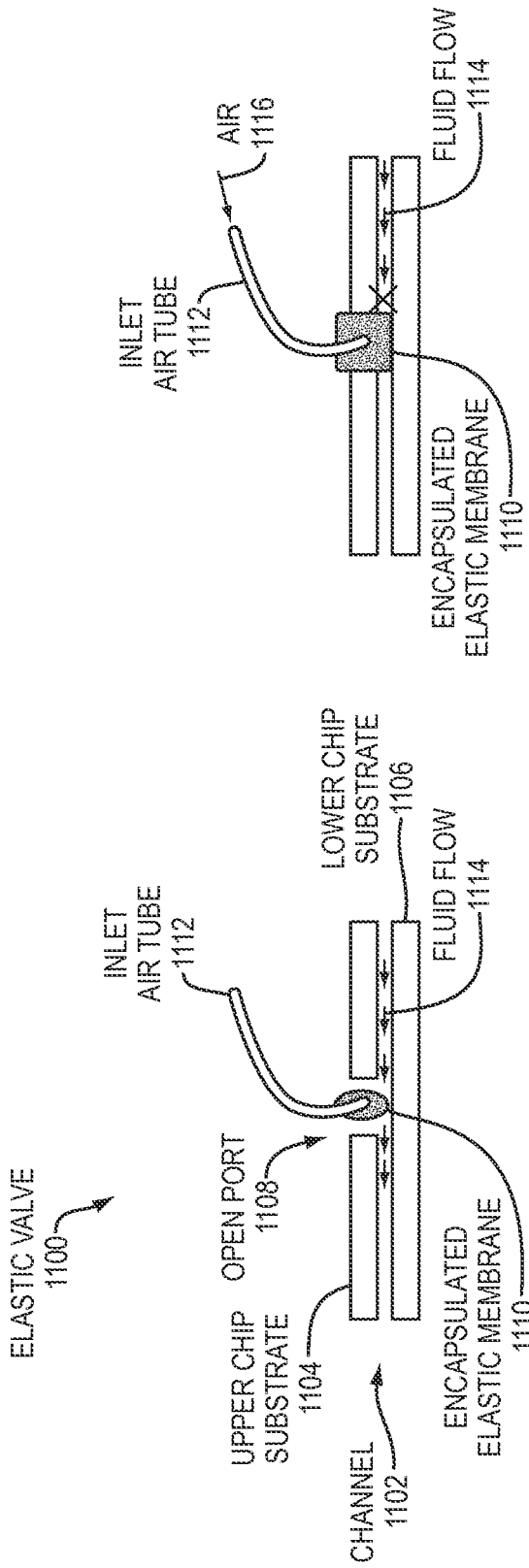

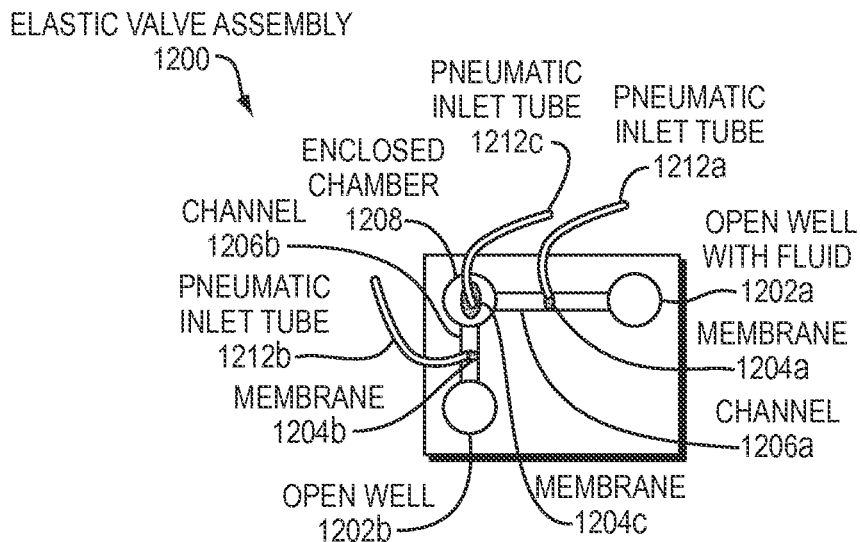
FIG. 16A
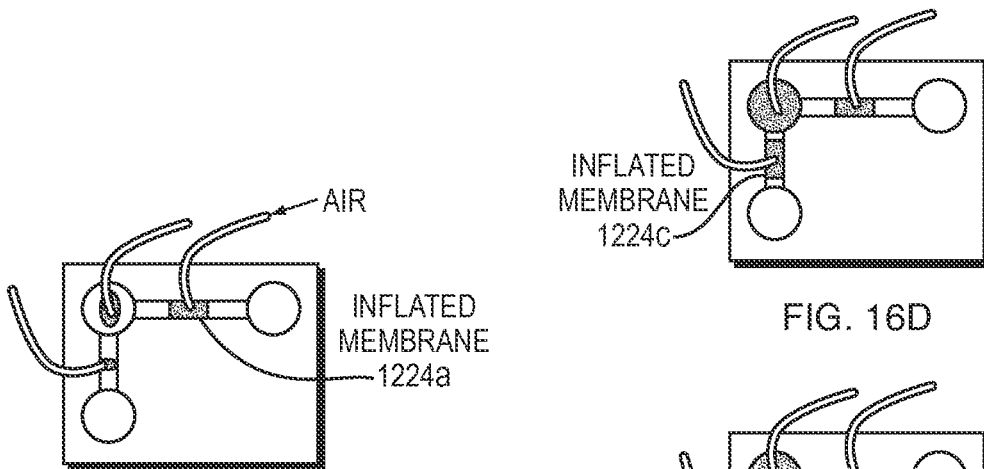
FIG. 16B
FIG. 16D
FIG. 16E
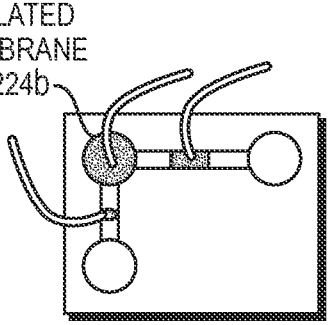
FIG. 16C
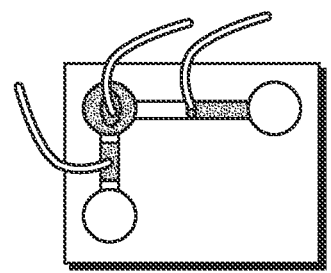
FIG. 16F

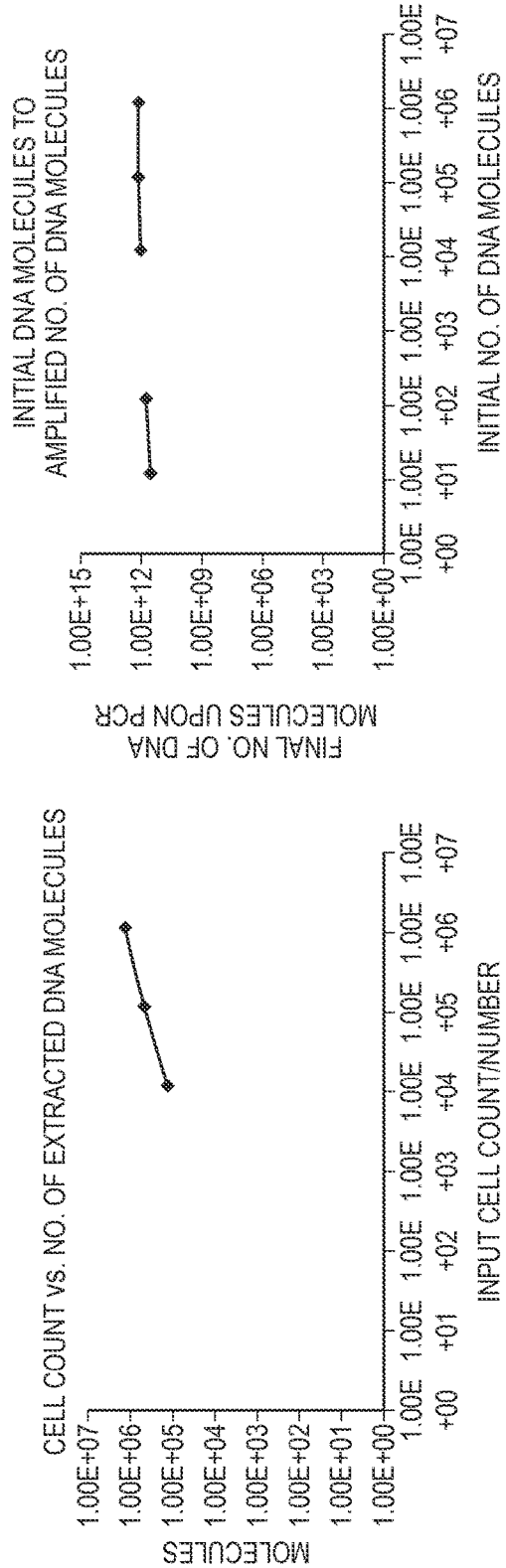
FIG. 19A
FIG. 19B
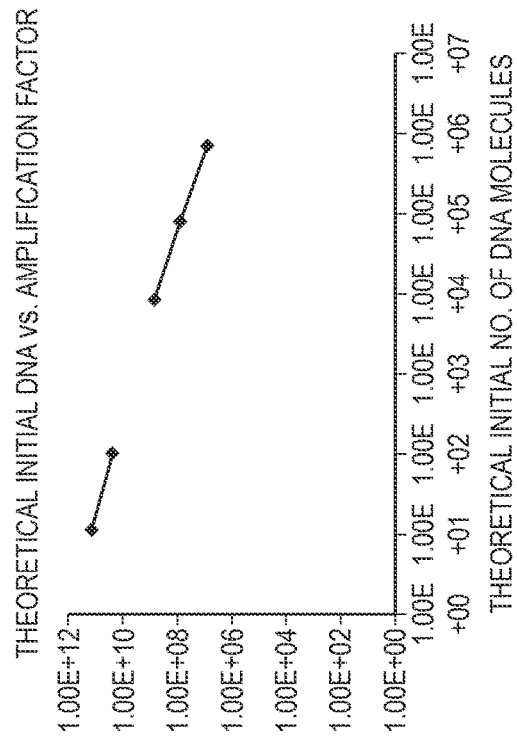
FIG. 19C
FIG. 19D

SYSTEMS AND METHODS FOR MOBILE DEVICE ANALYSIS OF NUCLEIC ACIDS AND PROTEINS

RELATED APPLICATION(S)

This application claims the benefit of U.S. Provisional Application No. 61/790,354, filed on Mar. 15, 2013. The entire teachings of the above application(s) are incorporated herein by reference.

BACKGROUND OF THE INVENTION

Detection and analysis of genetic material of a biological organism can be employed for pathogen identification, genotyping, biomarker identification, personalized medicine, companion diagnostics, drug monitoring, and pharmacogenetics. The identity of a species in a biological sample can be ascertained by comparing the nucleic acid present in the sample to the nucleic acid in a known reference sample. Before making this comparison, however, the nucleic acids must be extracted from the sample, amplified, and then detected. Typically, the extraction, amplification, and detection steps take place over the course of hours, days, or weeks in a laboratory or a hospital. For example, amplification usually involves the polymerase chain reaction (PCR) as described U.S. Pat. Nos. 4,683,202 and 4,683,195. To amplify the nucleic acids using conventional PCR, the nucleic acids must be repeatedly heated and cooled in the presence of enzymes, nucleotides, primers, and buffers.

The existing methods and devices for extraction, amplification, and detection of nucleic acids are not typically robust enough to be performed in a mobile setting outside a specialized lab infrastructure. Extraction and amplification alone takes hours if not days, depending on the type of organism, the length of the nucleic acid strand, and the number of cycles. In addition, commercially available devices and methods require skilled labor, running water, and electricity. Furthermore, the temperature, pH, and buffer ingredients must be tightly controlled. Contaminants can inhibit or interfere with the nucleic acid polymerase enzymes used in replication, reducing the efficiency and fidelity of the amplification process. Similar restrictions apply to conventional techniques for extracting and detecting nucleic acids. Therefore, the need exists for a compact, robust, rapid and easy-to-use device and method for detecting and identifying nucleic acids.

SUMMARY OF THE INVENTION

The present invention relates to a system and method for rapid analysis, quantification, and identification of nucleic acids or proteins.

The present invention provides a portable or mobile or point-of-care (POC) system for extracting, optionally amplifying, and detecting nucleic acids or proteins using a compact integrated chip in combination with a portable system or mobile device for analyzing detected signals, and comparing and distributing the results via a wireless network. Swappable modules may be used for one or more of extraction, amplification and detection.

The present invention possesses a number of advantages. The present invention is faster, cheaper, and more precise than existing methods for detecting and analyzing nucleic acids or, in some embodiments, proteins. Unlike conventional methods, which take hours to weeks to characterize or analyze even large samples, the present invention typically produces measurements in under an hour, or under half an hour, for example, in minutes. The present invention is sensitive enough to detect nucleic acids extracted from a sample that contains a few cells (see Exemplification). Unlike the standard diagnostic devices and methods which require bench top equipment in a laboratory or a clinic, highly trained technicians, electricity, water, and, often, refrigeration of samples and reagents, the present invention can be implemented in a portable or mobile device employing an optionally disposable compact integrated chip. Results may be distributed via one or more communications networks such as a wireless network and/or the Internet. The system of the present invention does not require skilled labor, and can work outside of hospital or lab infrastructure. The system of the present invention is robust to various environmental variables and can function at wide range of pH, temperatures, and, optionally, without refrigeration.

The present invention can be employed to detect and distinguish nucleic acid molecules or proteins from a single biological organism or other source or a plurality of organisms or sources. Not only can the present invention detect and analyze an unknown nucleic acid but the methodology is sensitive enough to distinguish between species within a genus, or to distinguish point mutations and/or biomarker sequences and/or disease susceptibility alleles. In the embodiments of the present invention that employ disposable integrated chips, there is also a significant cost cutting effect when compared to the cost of the existing diagnostic assays.

Furthermore, in the embodiments of the present invention that employ a non-thermal nucleic acid amplification processes disclosed in U.S. Pat. No. 7,494,791 (the entire disclosure of which is hereby incorporated herein by reference), error rates of less than about $1 \times 10^{-7}$ errors/base pair or better (e.g., less than $10^{-10}$ errors/base pair) can be achieved. Even with "difficult sequences" (a sequence on which a polymerase enzyme has the tendency to slip, make errors, or stop working; examples of difficult sequences include repeating sequences, poly-A sequences, GC-rich sequences, trinucleotide repeat sequences, etc.) error rates of less than $1 \times 10^{-3}$ errors/base pair or better (e.g., less than $10^{-6}$ errors/base pair) can be achieved. The disclosed non-thermal nucleic acid amplification methods can be used to amplify sequences of up to 20,000 base pairs long, employing reagents that can survive more than 100 cycles of nucleic acid replication. Other isothermal methods of amplification may be used, for example a Loop Mediated Isothermal Amplification (LAMP) technique, such as those set forth in T. Notomi, et al., Nucleic Acids Research, 28, e63 (2000)); a Helicase-Dependent Amplification (HDA) technique, such as those set forth in Vincent M, Xu Y, Kong H. (2004), "Helicase-dependent isothermal DNA amplification," EMBO Rep 5 (8): 795-800; a Strand Displacement Amplification (SDA) technique, such as those set forth in G. T. Walker, et. al., Proc. Natl. Acad. Sci. USA, 89, 392-396 (1992); the entire teachings of all of which references are hereby incorporated herein by reference. Bridge, rolling circle and any other methods of amplification (thermal or isothermal) may be used.

In one embodiment according to the invention, there is provided a system for rapid analysis of biological samples. The system comprises a mobile device that receives at least one integrated chip. The mobile device processes the integrated chip to analyze a biological sample loaded thereon. The mobile device and the integrated chip together are configured to perform at least one of manipulation and control of a molecule or a fluidic system on the integrated chip. The mobile device and integrated chip together are configured to precision control at least one parameter that governs at least one of a plurality of steps of the analysis of the biological sample to within plus or minus 10%, plus or minus 1%, plus or minus 0.1%, plus or minus 0.01%, plus or minus 0.001% or plus or minus 0.0001%.

In another embodiment according to the invention, there is provided a system for rapid analysis of biological samples. The system comprises a portable control assembly that receives at least one compact integrated chip. The integrated chip comprises an extraction module; optionally a nucleic acid amplification module, in fluid communication with the extraction module; and a biological sample detection module, in fluid communication with the nucleic acid amplification module or extraction module. The portable control assembly processes the integrated chip to analyze a biological sample loaded thereon by employing: an extraction control module; a nucleic acid amplification control module operably connected to the extraction control module; and a biological sample detection control module operably connected with the nucleic acid amplification module and the extraction module.

In another embodiment according to the invention, there is provided a system for rapid analysis of biological samples. The system comprises a portable control assembly that receives at least one compact integrated chip. The integrated chip comprises an injection port for loading a biological sample and, optionally, one or more reagents, onto the integrated chip; an extraction module; a nucleic acid amplification module, in fluid communication with the extraction module; and a detection module, in fluid communication with the nucleic acid amplification module. The portable assembly comprises an extraction control module, comprising a magnetic particles capturing means for capturing magnetic particles introduced into the biological sample loaded onto the integrated chip; a nucleic acid amplification control module operably connected to the extraction control module, said nucleic acid amplification means comprising a thermoelectric heating means for heating/cooling the nucleic acid amplification module of the integrated chip; and a detection control module operably connected with the nucleic acid amplification module and the nucleic acid extraction module. The detection control module comprises a fluorescence detection means for detecting nucleic acids or proteins; and a capillary electrophoresis (CE) control means operably connected to the fluorescence detection means, said CE control means further including a high voltage control unit for applying voltage across the nucleic acid detection module of the integrated chip, said voltage being sufficient for effecting separation of nucleic acids or proteins; and a fluid pressure generating means for moving the biological sample and/or nucleic acids through the integrated chip.

In another embodiment according to the invention, there is provided a method for rapid analysis of biological samples. The method comprises (1) providing at least one integrated chip, said integrated chip comprising: a nucleic acid extraction module; a nucleic acid amplification module, in fluid communication with the nucleic extraction module; and a nucleic acid detection module, in fluid communication with the nucleic acid amplification module, (2) loading the at least one biological sample onto the at least one integrated chip; (3) operably connecting a portable control assembly with at least one integrated chip, said portable control assembly comprising: a nucleic acid extraction control module; a nucleic acid amplification control module operably connected to the nucleic acid extraction control module; and a nucleic acid detection control module operably connected with the nucleic acid amplification module and the nucleic acid extraction module; and (4) activating the portable control assembly to effect extraction, amplification and detection of nucleic acid from the biological sample loaded onto said integrated chip.

In another embodiment according to the invention, there is provided a method for rapid analysis of biological samples. The method comprises (1) providing at least one integrated chip, said integrated chip comprising: a protein extraction module; and a protein detection module, in fluid communication with the protein extraction module, (2) loading the at least one biological sample onto the at least one integrated chip; (3) operably connecting a portable control assembly with at least one integrated chip, said portable control assembly comprising a protein extraction control module; and a protein detection control module operably connected with the protein extraction module; and (4) activating the portable control assembly to effect extraction and detection of protein from the biological sample loaded onto said integrated chip.

In another embodiment according to the invention, there is provided an integrated chip for rapid sequential extraction, amplification and separation of nucleic acid in a biological sample. The integrated chip comprises a housing having integrated therein microfluidic channels in sequential fluid communication with a nucleic acid extraction module, a nucleic acid amplification module and a nucleic acid separation module; at least one sample inlet port for injecting biological samples and reagents in fluid communication with the nucleic acid extraction module; wherein the nucleic acid extraction module comprises at least one extraction chamber for extracting nucleic acids from the biological samples, said extraction chamber connected to the sample inlet port by at least one sample transport channel; wherein the nucleic acid amplification module comprises at least one amplification chamber for amplifying nucleic acids, said nucleic acid amplification chamber connected to the extraction chamber by at least one nucleic acid transport channel; and wherein the nucleic acid separation module comprises at least one detection channel for separating and detecting the nucleic acids, said detection channel connected to the nucleic acid amplification chamber by at least one amplification product transport channel.

Embodiments can perform protein separation such as by electrophoresis.

Further related systems and methods are provided.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2A illustrates an embodiment of a modular design of an extraction control module.

FIG. 3 is an illustrative example of a flow chart of a method for detecting and analyzing nucleic acids.

FIGS. 15A and 15B illustrate different views of a microfluidic valve of a compact integrated chip based on an inflatable encapsulated elastic membrane.

FIGS. 16A-16F illustrate different views of a microfluidic valve assembly of a compact integrated chip based on inflatable encapsulated elastic membranes.

FIGS. 19A, 19B, 19C, and 19D show the results of the on-chip DNA purification and amplification.

DETAILED DESCRIPTION OF THE INVENTION

Figure 1:
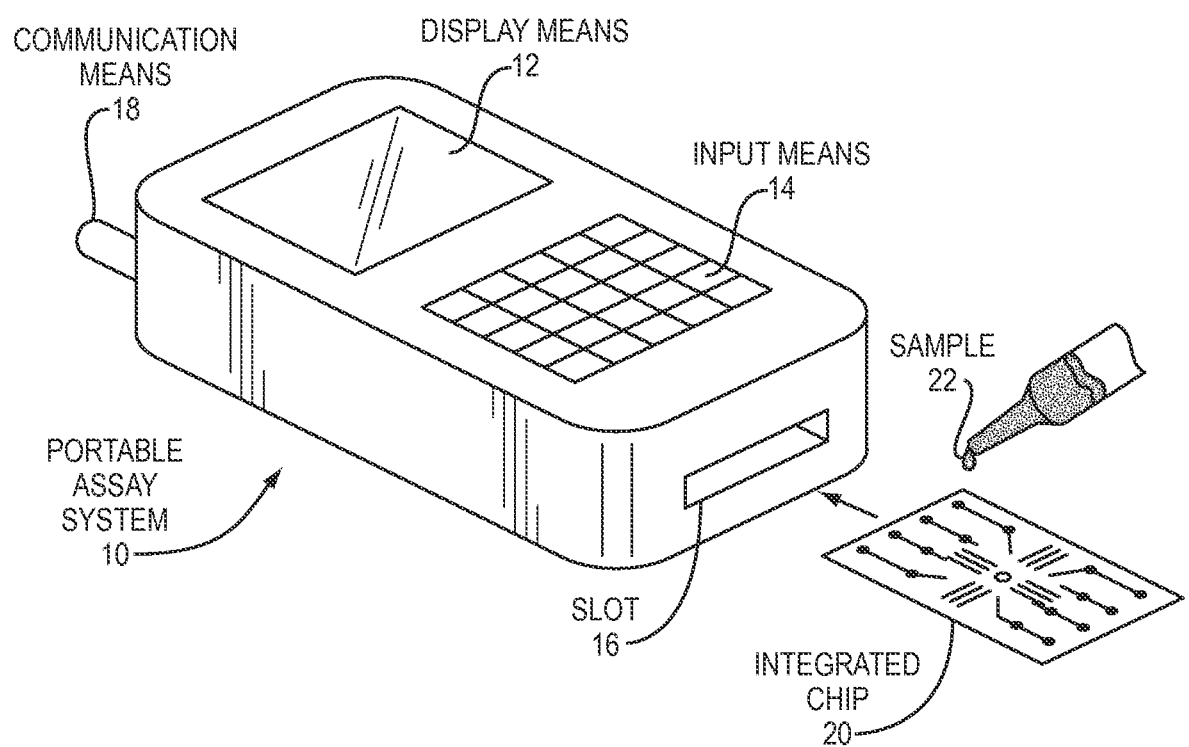
FIG. 1 illustrates one embodiment of a portable assay or mobile system with a compact integrated chip for detecting and analyzing nucleic acids.

A description of example embodiments of the invention follows.

As used herein, the term "fluid" refers to both a gas or a liquid.

As used herein, the term "microfluidic" refers to a device and/or methods operating at or with relating to volumes of fluids from 0.1-100 µL, and preferably between 1 and 10 µL.

As used herein, the term "fluidic system" means a system flowing fluid, for example flowing fluid in at least one channel, at least one chamber, at least one well and/or at least one port, each of which may be microfluidic.

As used herein, "nucleic acid" refers to a macromolecule composed of chains (a polymer or an oligomer) of monomeric nucleotide. The most common nucleic acids are deoxyribonucleic acid (DNA) and ribonucleic acid (RNA). It is further understood that the present invention can be used to detect and identify samples containing artificial nucleic acids such as peptide nucleic acid (PNA), morpholine, locked nucleic acid (LNA), glycol nucleic acid (GNA) and threose nucleic acid (TNA), among others. In various embodiments of the present invention, nucleic acids can be derived from a variety of sources such as bacteria, virus, humans, and animals, as well as sources such as plants and fungi, among others. The source can be a pathogen. Alternatively, the source can be a synthetic organism. Nucleic acids can be genomic, extrachromosomal or synthetic. Where the term "DNA" is used herein, one of ordinary skill in the art will appreciate that the methods and devices described herein can be applied to other nucleic acids, for example, RNA or those mentioned above. In addition, the terms "nucleic acid," "polynucleotide," and "oligonucleotide" are used herein to include a polymeric form of nucleotides of any length, including, but not limited to, ribonucleotides or deoxyribonucleotides. There is no intended distinction in length between these terms. Further, these terms refer only to the primary structure of the molecule. Thus, in certain embodiments these terms can include triple-, double- and single-stranded DNA, as well as triple-, double- and single-stranded RNA. They also include modifications, such as by methylation and/or by capping, and unmodified forms of the polynucleotide. More particularly, the terms "nucleic acid," "polynucleotide," and "oligonucleotide," include polydeoxyribonucleotides (containing 2-deoxy-D-ribose), polyribonucleotides (containing D-ribose), any other type of polynucleotide which is an N- or C-glycoside of a purine or pyrimidine base, and other polymers containing nonnucleotidic backbones, for example, polyamide (e.g., peptide nucleic acids (PNAs)) and polymorpholino (commercially available from Anti-Virals, Inc., Corvallis, Oreg., U.S.A., as Neugene) polymers, and other synthetic sequence-specific nucleic acid polymers providing that the polymers contain nucleobases in a configuration which allows for base pairing and base stacking, such as is found in DNA and RNA.

As used herein, a "protein" is a biological molecule consisting of one or more chains of amino acids. Proteins differ from one another primarily in their sequence of amino acids, which is dictated by the nucleotide sequence of the encoding gene. A peptide is a single linear polymer chain of two or more amino acids bonded together by peptide bonds between the carboxyl and amino groups of adjacent amino acid residues; multiple peptides in a chain can be referred to as a polypeptide. Proteins can be made of one or more polypeptides. Shortly after or even during synthesis, the residues in a protein are often chemically modified by posttranslational modification, which alters the physical and chemical properties, folding, stability, activity, and ultimately, the function of the proteins. Sometimes proteins have non-peptide groups attached, which can be called prosthetic groups or cofactors.

As used herein, a "biological sample" includes a sample of any material that contains nucleic acids and/or proteins that can be extracted, analyzed and detected. Preferably, the material is in liquid or gaseous form, or can be dissolved or suspended in a liquid or gas, or can be liquefied or turned into a gaseous form, or otherwise prepared for analysis by the device and method of the present invention. Solid samples like stool or soil samples could be placed in water and then loaded onto the chip, for example. Aerosol biological samples may be used. The "biological sample" may be, or may be part of, a tissue sample, a biofluid sample, an environmental sample or another type of sample. Preferably, the biological sample is derived from a biological fluid, such as but not limited to blood, saliva, semen, urine, amniotic fluid, cerebrospinal fluid, synovial fluid, vitreous fluid, gastric fluid, nasopharyngeal aspirate and/or lymph. The biological sample can also be a material or fluid that is contaminated with a nucleic acid and/or protein source. The biological sample can be a tissue sample, a water sample, an air sample, a food sample or a crop sample. Preferably, a biological sample analysis detects any one or more of water-born pathogen, air-born pathogen, food-born pathogen or crop-born pathogen.

As used herein, the term "biological analysis" refers to the implementation of biochemical assays in which samples such as cells, nucleic acid, proteins or other biological molecules are used as starting material to extract information for the purposes of diagnosis, species identification, distinguish point mutations and/or disease susceptibility alleles, qualitative analysis, quantitative analysis (e.g., to ascertain viral load), and for other purposes taught herein. An example of an application of this technology is pathogen detection by extracting genetic information from cells. As used herein, the "steps" of a "biological analysis" refers to the steps of extraction, optionally amplification, and detection.

General Description

As one skilled in the art will appreciate, the present invention can include a hardware portion, a software portion and/or a combination of software and hardware portions. In one embodiment, the present invention is a portable processing means that interfaces with a compact integrated chip to, in one embodiment, extract, amplify, and detect nucleic acids in a biological sample according to computer-useable instructions embodied on a computer-readable medium, or in another embodiment to separate proteins such as by electrophoresis. The system may use swappable modules, as discussed further below in connection with FIG. 2.

As used herein, the term "compact" refers to a microfluidic device layout design that minimizes space used by the fluid channels, chambers, wells and ports, as discussed below, such as achieved, for example, by a microfluidic device layout. In one embodiment, the use of intersecting fluid channels and shared wells exemplifies a compact design. As used herein, the term "integrated" refers to a microfluidic device layout design in which fluid channels, chambers, wells and ports used for various purposes are assembled on/in the same microfluidic device. For example, the embodiment of the chip shown in FIG. 4 comprises nucleic acid extraction chambers used for nucleic acid extraction, nucleic acid amplification chambers, used for nucleic acid amplification, and detection channels used for separating and detecting nucleic acids. Although the chambers and channels discussed in the preceding sentence are specified in the plural, it should be appreciated that they could be "at least one" such chamber or channel. In addition, it should be appreciated that as used herein, one or more "modules" may share a common chamber, for example one or more of an extraction, amplification and detection modules may share one or more common chambers. As used herein, the term "portable" refers to a system or device or mobile device that can be easily carried or conveyed by hand by a person. As used herein, the term "mobile device" refers to a small portable device, typically having a display screen with touch input and/or a miniature keyboard and weighing less than about 10 kg, including for example a smart phone, tablet, laptop or other portable medical device.

The system can store the indications pertaining to the detected nucleic acid in the computer-readable medium or cloud and compare those indications to records stored in genomic databases, which may be stored in the computer-readable medium or in a remote location. In alternative embodiments, the information pertaining to a reference standard is stored in a computer-readable memory disposed within the system. In yet another embodiment, a nucleic acid standard is included in an integrated chip that can be employed with the system of the present invention.

The processor means may comprise, for example, a minicomputer, a microcomputer, a UNIX machine, a personal computer such as one with an Intel processor or similar device, microprocessor or other appropriate computer. It also usually comprises conventional computer components (not shown) such as a motherboard, a central processing unit (CPU), random access memory (RAM), disk drives, and peripherals such as a keyboard and a display. The RAM stores an operating system such as Windows CE or other operating system and appropriate software for processing signals pertaining to detected nucleic acids or proteins.

Portions of embodiments of the present invention described herein can be implemented using one or more computer systems. For example, the embodiments may be implemented using hardware, software or a combination thereof. When implemented in software, the software code can be stored on any form of non-transient computer-readable medium and loaded and executed on any suitable processor or collection of processors, whether provided in a single computer or distributed among multiple computers.

Further, it should be appreciated that a computer may be embodied in any of a number of forms, such as a laptop computer, a tablet computer, or a computer embedded in a device not generally regarded as a computer but with suitable processing capabilities, including a Personal Digital Assistant (PDA), a smart phone or any other suitable portable or mobile electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, at least a portion of the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a non-transient computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

In one embodiment, the portable assay system 10 is about the size of a mobile wireless device, as shown in FIG. 1. The user interfaces with the portable assay system 10 using a display means 12 (e.g., a liquid crystal display) and an input means 14 (e.g., a keyboard). To use the portable assay system 10, the user places a sample 22 on an integrated chip 20 (described in greater detail below), then inserts the integrated chip 20 into a slot 16 in the system itself.

Once the user loads the integrated chip 20, the portable assay system 10 extracts, amplifies, and detects nucleic acids in the sample 22 using methods described below, or depending upon other modules used such as electrophoresis. A microprocessor (not shown) processes the detected signal, which may be presented to the user via the display means 12 and transmitted to other users via a communication means 18. The communication means 18 may be used to transmit and receive modulated data signals pertaining to the biological sample 22.

The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communication media include: wired media, such as a wired network or direct-wired connection, and wireless media such as acoustic, infrared, radio, microwave, spread-spectrum, and other wireless-media technologies.

The present invention can include a genomic database for storing a plurality of genomic profiles or target biomarker sequences. In one embodiment, the present invention can include a signal profile of a single reference sample. The device of the present invention can also connect to a remotely located genomic database, such as those maintained by the National Institutes of Health, Center for Disease Control, etc. Such connection would facilitate tracking and coordinating responses to outbreaks of disease at widely dispersed analysis sites. Exemplary analysis sites include hospitals, border crossings, refugee camps, farms, quarantine zones, disaster sites, homeless shelters, nursing homes, meat-packing plants, and food processing centers. Those skilled in the art will appreciate still other analysis sites to which the present invention is applicable.

The present invention need not connect directly to genomic databases, although it may if need be. In other embodiments, the device can connect to genomic databases through various networks, public or private, such as Local-Area Networks (LANs), Wide-Area Networks (WANs), or the Internet. In one embodiment, genomic databases are accessible across a public network such as the Internet. Data is communicated in a secure means, such as via Secure Socket Layer (SSL) or secure copy.

Figure 1A:
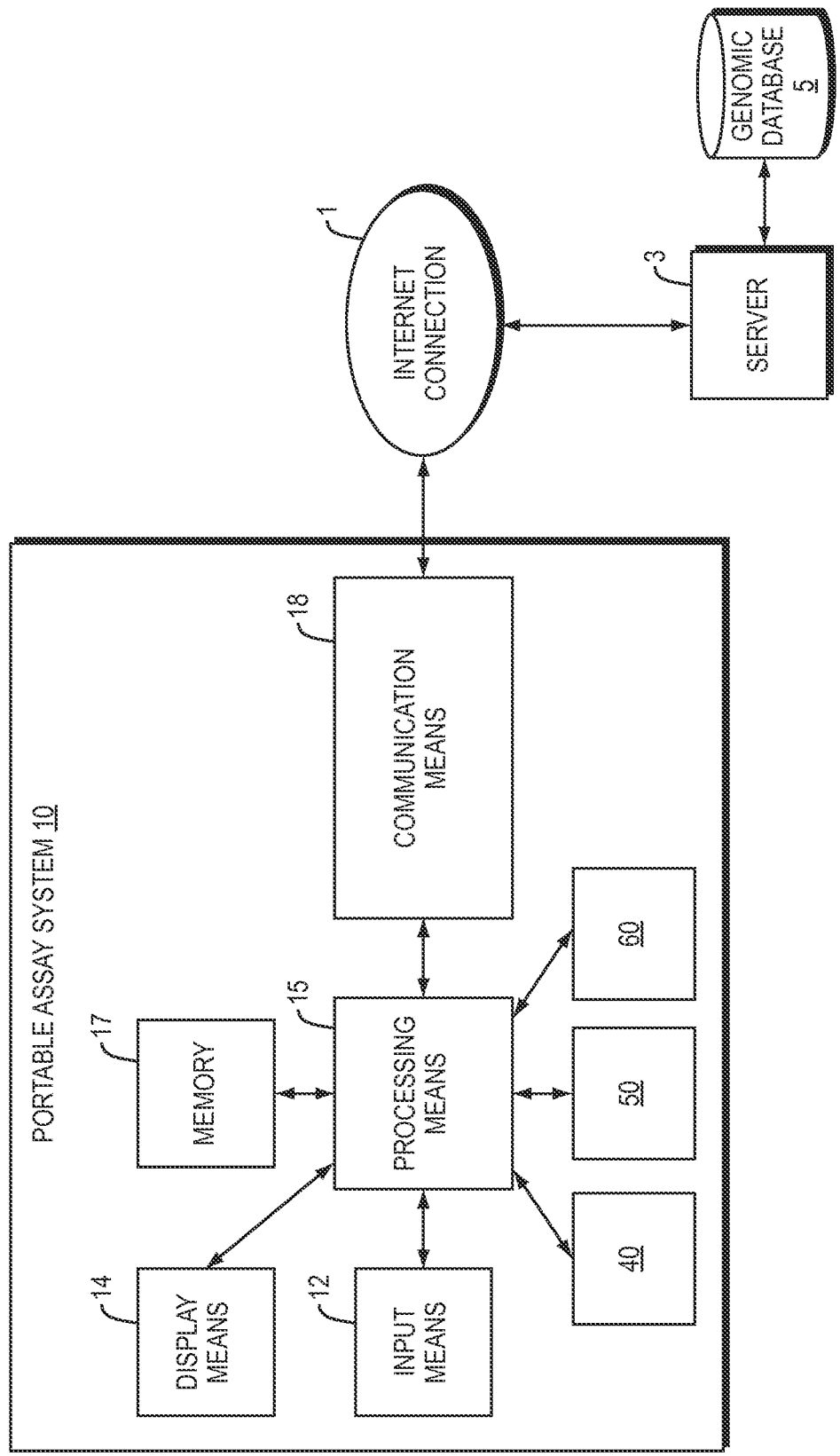
FIG. 1A illustrates an embodiment of a modular design of a portable assay system in communication with a genomic database.

In the embodiment shown in FIG. 1A, the portable assay system 10 communicates with a genomic database 5 via an internet connection 1 and a server 3. A processing means 15 in the portable assay system 10 transmits and receives data held in a memory 17 to and from the genomic database 5 using communication means 18, which may be an antenna, ethernet connection, or other suitable means for communicating. The processing means 15 controls the collection and processing of DNA data using the extraction, amplification, and detection modules 40, 50, 60. The processing means 15 stores the collected data in the memory 17 and presents it to the user via display means 12; it receives commands and queries from the user via an input means 12.

In some versions of the invention, the device is mobile, or POC and optionally handheld.

Extraction-Amplification-Detection Modules

The portable assay system 10 (FIG. 1) uses a combination of modules to extract, amplify, and detect nucleic acids from the sample 22 (FIG. 1). The entire process, including any data processing 70 of the detected signal, typically takes under 20 minutes, as shown in FIG. 3, and may take under 60 minutes, under 30 minutes, under 20 minutes, under 10 minutes, under 5 minutes or under 1 minute.

Figure 2:
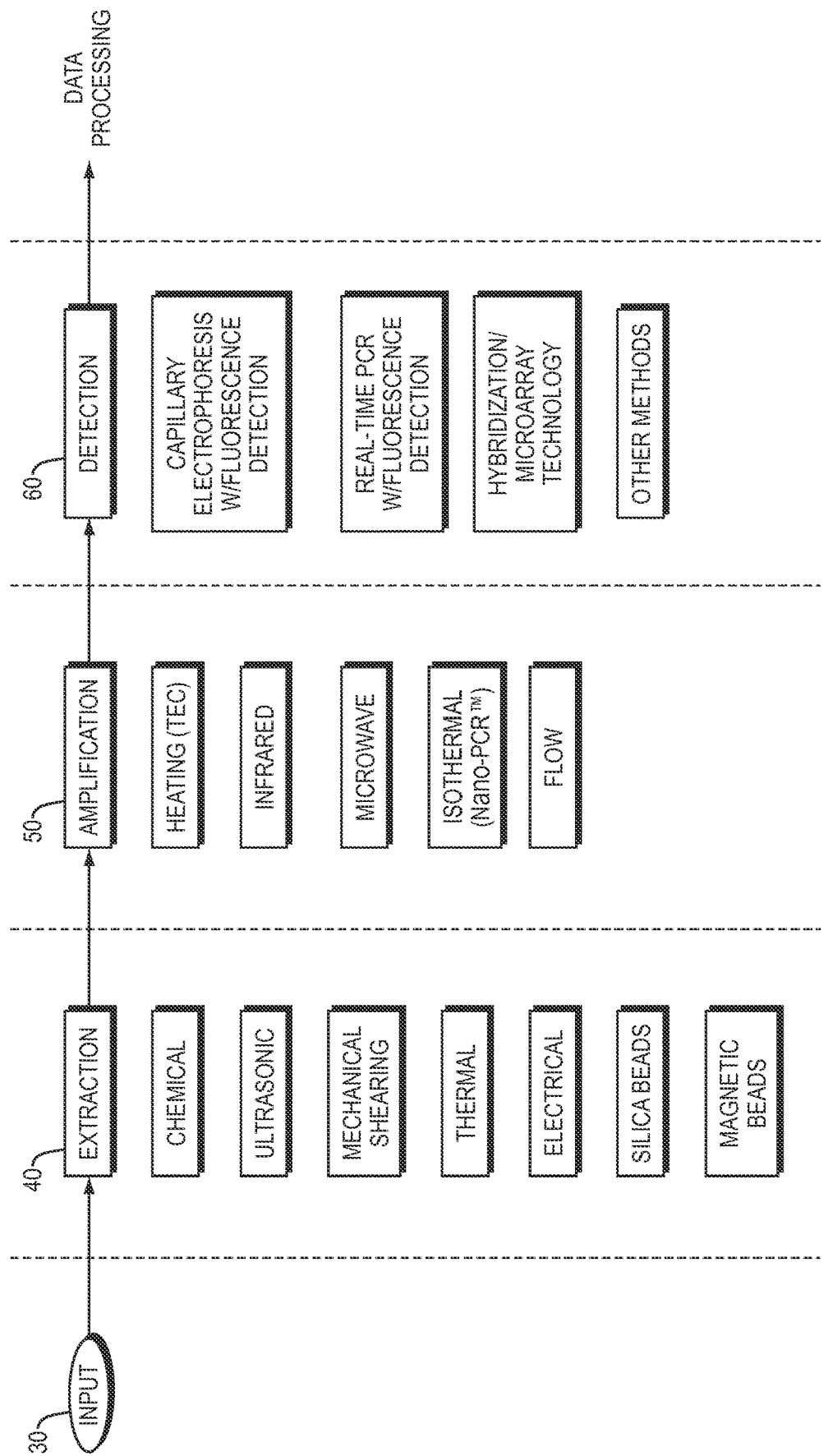
FIG. 2 is an illustration of an embodiment of a modular design of the system and device of the present invention.

Each of the modules may comprise one of various implementations and combinations, as shown in FIG. 2.

Figure 4:
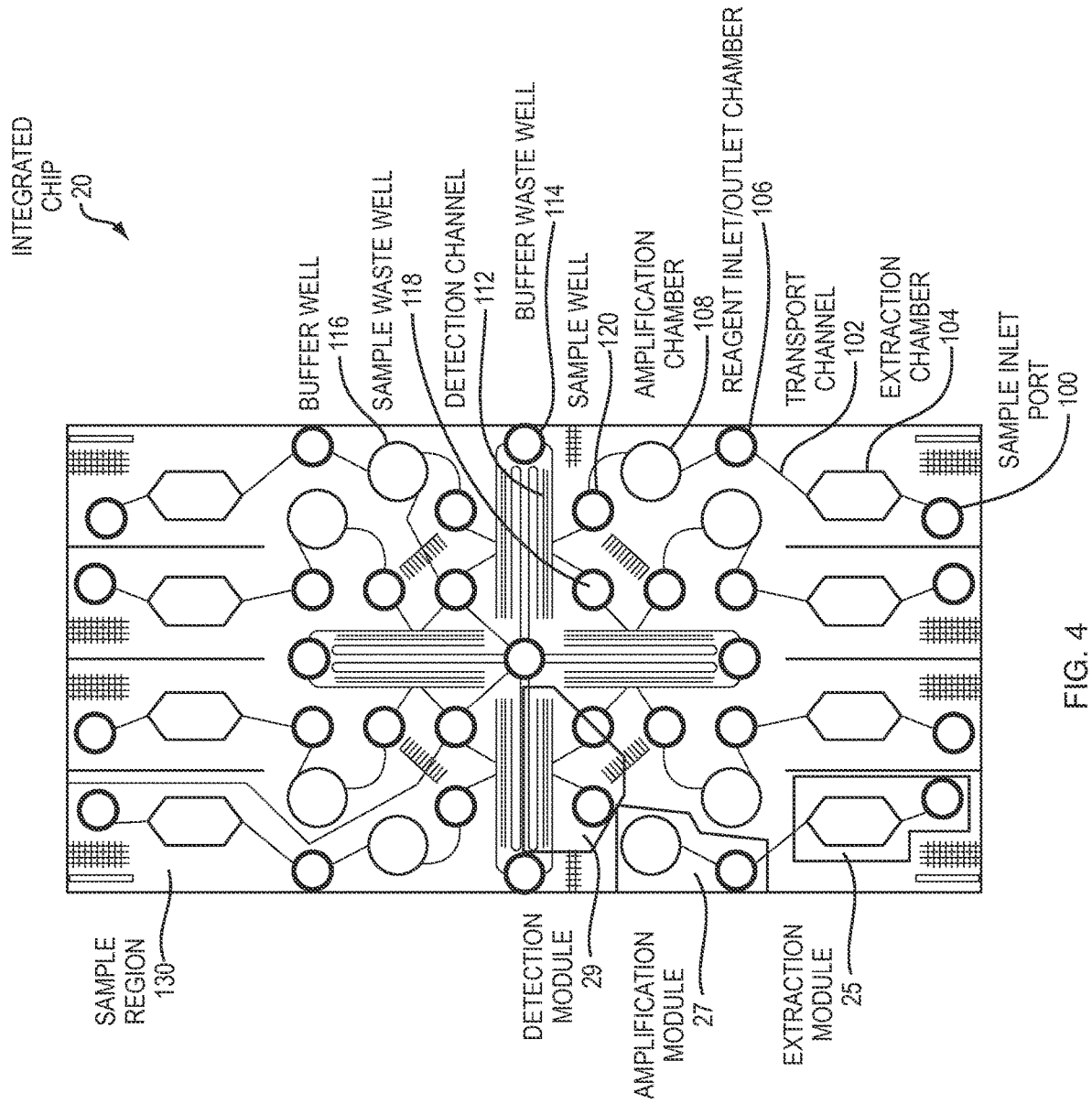
FIG. 4 is an illustration of an embodiment of a compact integrated chip that can be used with the device and method of the present invention.

Biological sample 22 (FIG. 1) is loaded onto integrated chip 20 (FIG. 1 and FIG. 4). The loading of the biological sample can be accomplished manually, through sample inlet port 100 (FIG. 4) or through an automated loading means within the portable system 10. For example, the inlet port 100 can be loaded with a manually or automatically operated loading device, such as a pipette. Alternatively, in embodiments destined for field use, the inlet port 100 can be loaded directly with a swab or a pricked finger by pressing the pricked finger onto inlet port 100. Capillary action causes blood to flow from the prick to into the inlet port 100.

Nucleic acids are extracted in the nucleic acid extraction module 25 of the integrated chip 20 (FIG. 4) under the control of the nucleic acid extraction control module 40 (FIGS. 2 and 3). For example, and referring to FIG. 2, a nucleic acid extraction control module 40 can comprise any of the suitable means for implementing the methods listed below or any other suitable means for extracting nucleic acids from biological samples: chemical extraction (WO 2005/073691), ultrasonication (WO 1999/33559), mechanical shearing, including microfabricated protrusions disposed on the integrated chip (U.S. Pat. No. 5,635,358 and WO 2006/029387), thermal means of disrupting cell membranes (see, e.g. WO 2005/011867), electroporation, including means for applying variable voltage to biological sample loaded onto the integrated chip, said voltage sufficient to disrupt cells in the biological sample (U.S. Pat. No. 6,783,647), silica beads, optionally having a nucleic acid probe attached thereto, optionally, covalently (WO 2005/073691 and WO 2003/104774), or magnetic beads having a nucleic acid probe attached thereto, optionally, covalently (U.S. Pat. No. 6,344,326). All of the references listed above are incorporated herein by reference in their entirety. Preferably, in the embodiment in which magnetic beads are used, a magnetic particle capturing means, such as a magnet, is included in the nucleic acid extraction module 40.

In one embodiment, magnetic beads can have a nucleic acid probe attached thereto, optionally, covalently. In this embodiment, a small electromagnet may be used to control the magnetic beads in the extraction module. Magnetic beads that can be employed are any of the commercially available magnetic beads nucleic acid purification kits available from such vendors as Agencourt Bioscience, Cosmo Bio Co., Ltd. Invitek GmbH, Polysciences, Inc., Roche Applied Science, B-Bridge International, Dynal Biotech, Novagen, or Promega. The use of magnetic beads for DNA purification is described, for example in Caldarelli-Stefano et al., "Use of magnetic beads for tissue DNA extraction and IS6110 *Mycobacterium tuberculosis* PCR", Mol Pathol. 1999 June; 52(3): 158-160.

As shown in FIG. 2A, the extraction control module 40 can include a control unit 250, a power source 252, and an electromagnet 254. Upon instruction from the extraction control module 40, the control unit 250 applies power from the power source 252 to the electromagnet 254, applying a magnetic field (not shown) to the extraction module 25. This causes magnetic beads (not shown) in the extraction module 25 to cluster along the interior wall of the extraction chamber (not shown) in the extraction module 25. The control unit 250 releases the magnetic beads by deactivating the power source 252, which causes the electromagnet 254 to stop applying the magnetic field.

The extracted nucleic acids can be amplified within the nucleic acid amplification module 27 of the integrated chip 20 (FIG. 4) under the control of the nucleic acid amplification control module 50 (FIGS. 2 and 3). Amplification can be accomplished using any suitable amplification technique, including conventional PCR techniques disclosed in U.S. Pat. Nos. 4,683,202 and 4,683,195, both of which are incorporated herein by reference in their entirety. The nucleic acids may also be amplified using isothermal techniques, such as the technique taught in U.S. Pat. No. 7,494,791, incorporated herein by reference in its entirety.

In some embodiments, nucleic acid amplification includes reverse transcription polymerase chain reaction (RT-PCR).

Figure 2B:
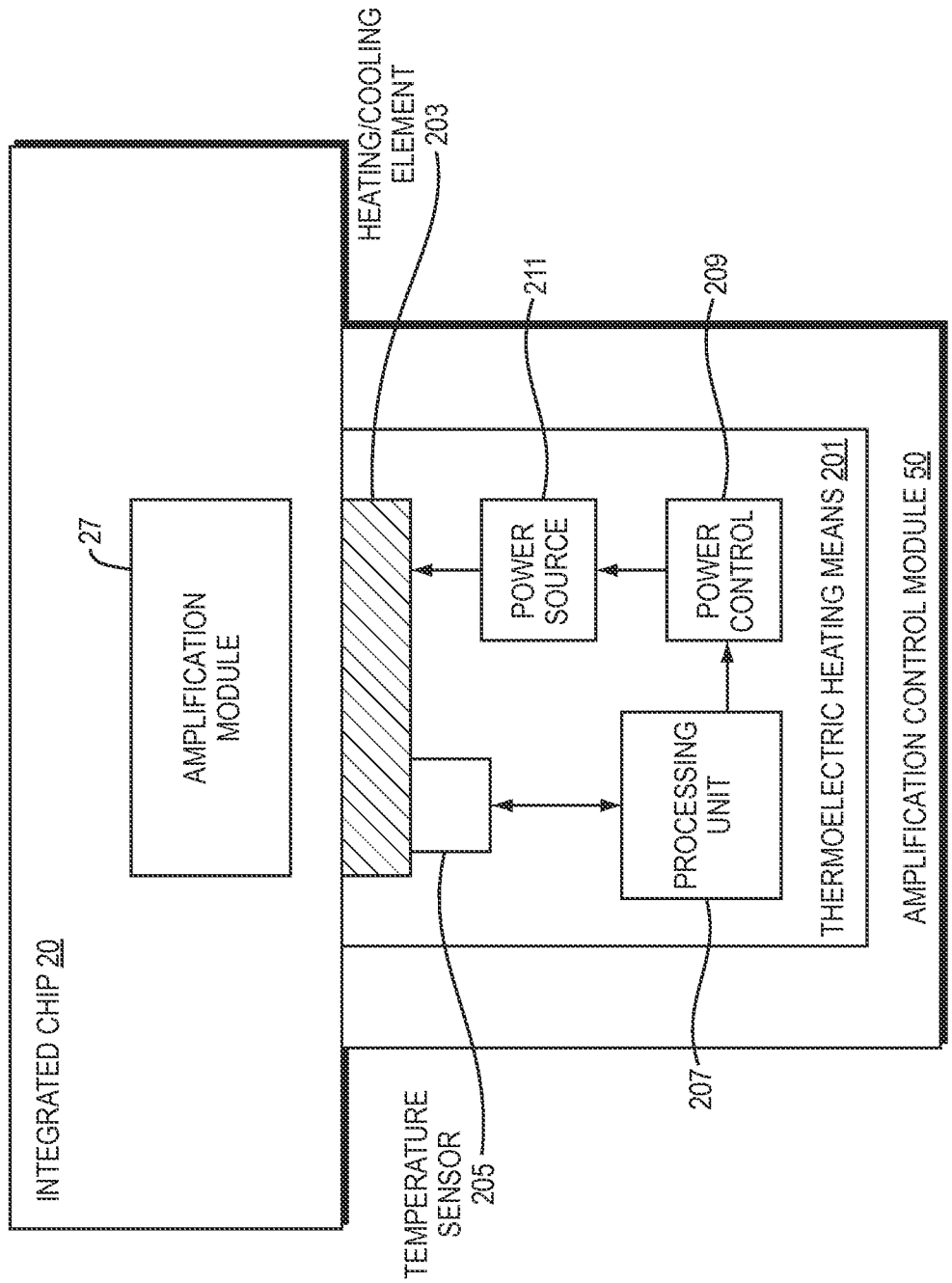
FIG. 2B illustrates an embodiment of a modular design of an amplification control module.

Referring to FIG. 2, the nucleic acid amplification control module 50 can comprise any of a suitable means for implementing nucleic acid amplification (i.e. increase in the number of nucleic acid template copies). Amplification can be either linear or exponential. In one embodiment, module 50 includes a means for well-based nucleic acid amplification. As shown in FIG. 2B, such means can include a thermoelectric heating means 201 for heating/cooling a nucleic acid amplification module 27 of the integrated chip 20. Examples of the thermoelectric heating means 201 for heating/cooling of the nucleic acid amplification module of the integrated chip include Peltier devices (WO 1998/50147, incorporated herein by reference in its entirety) and thin-films-based devices. In other embodiments, the means for heating the nucleic acid amplification module of the integrated chip (see FIG. 4, element 25) can include infrared heating means (WO 1996/41864, incorporated herein by reference in its entirety) or microwave radiation heating means.

As shown in FIG. 2B, the thermoelectric heating means 201 can include a heating/cooling element 203, a temperature sensor 205, a processing unit 207, a power control unit 209, and a power source 211. Upon instruction from the amplification control module 50, the processing unit 207 initiates heating/cooling by directing the power control unit 209 to supply power from the power source 211 to the heating/cooling element 203. The processing unit 207 monitors the temperature of the heating/controlling element 203 by means of a temperature sensor 205 and adjusts its instructions to the power control unit 209 as needed to maintain the desired temperature for the amplification module 27.

In another embodiment, the module 50 (see FIGS. 2 and 3) includes a means for fluid-based nucleic acid amplification (see, e.g. U.S. Pat. No. 7,041,481 incorporated herein by reference in its entirety). Such means can include a fluid flow generating means for generating a flow of buffers through the nucleic acid amplification module of the integrated chip, said fluid flow generating means operably connected to a temperature controlling means for controlling the temperature of the nucleic acid amplification module of the integrated chip.

In other embodiments, the module 50 (see FIGS. 2 and 3) includes a means for a real-time polymerase chain reaction (PCR) control means for effecting nucleic acid amplification (see, e.g., U.S. Pat. No. 7,315,376, incorporated herein by reference in its entirety).

In other embodiments, the module 50 (see FIGS. 2 and 3) comprises a means for applying controlled tension to nucleic acid strands within the nucleic acid amplification module of the integrated chip (see FIG. 4, element 25). Detailed description of such means is provided in U.S. Pat. No. 7,494,791, incorporated herein by reference in its entirety.

As used herein, the term "tension", when used in the context of nucleic acid amplification, processing and/or detection, refers to an alternative to thermal cycling or thermal denaturation of double-stranded nucleic acid or to a non-thermally driven process of nucleic acid amplification or denaturation or annealing or primer extension. Application of "tension" to nucleic acids is a result of applying a physical force, other than derived solely from thermal energy, to nucleic acid strands. Tension can be "precision controlled" (as defined elsewhere herein), and/or adjustably controlled and/or variable.

The precision controlled tension can be mechanical tension, hydrodynamic tension, electromagnetic tension or a combination thereof. Furthermore, in some embodiments, the means for applying controlled tension to the nucleic acid strands are configured to operate isothermally. As used herein in the context of nucleic acid amplification, processing and detection, the term "isothermal" refers to a method of nucleic acid amplification in which no thermal cycling is necessary, and, preferably, a process of amplification all steps of which can be performed at substantially the same temperature.

The embodiments that employ the means for controlled tension to nucleic acid strands within the nucleic acid amplification module of the integrated chip (see FIG. 4, element 25) have important advantages over the means for conventional (thermocycling methods) of nucleic acid amplification. These advantages include superior accuracy in general, and when amplifying "difficult" sequences (e.g., GC-rich sequences) in particular, length of amplified sequences, reaction yield, and reaction speed (overall time of the amplification reaction). Other important advantages include higher amplification efficiency and ability to improve fidelity of amplification, for example by inducing proofreading exonuclease activity through use of tension (see teachings of U.S. Pat. No. 7,494,791, the entire teachings of which are incorporated herein by reference).

The embodiments employing means for applying controlled tension to nucleic acid strands include a mechanism for applying a variable and controlled amount of tension to the nucleic acid molecules retained within the nucleic acid amplification module of the integrated chip (see FIG. 4, element 25). Such a mechanism can comprise a first surface and a second surface with means for anchoring nucleic acid molecules thereon, wherein said first and second surfaces are configured for moving relative to each other. Alternatively, such a mechanism can comprise at least one surface with means for anchoring nucleic acid molecules thereon, the device further comprising a mechanism for providing a controlled and variable fluid flow over said nucleic acid molecules. In yet another embodiment, such a mechanism can comprise at least one surface with means for anchoring nucleic acid molecules thereon further comprises passages for fluid flow distributed between the means for anchoring said nucleic acid molecules. In other embodiments, such a mechanism can comprise mechanism for providing a controlled and variable fluid flow over said nucleic acid molecules configured to create a velocity gradient in laminar fluid flow. Alternatively, such a mechanism can comprise fluid flow channels configured to provide a velocity gradient in laminar fluid flow, a stagnation point within a fluid flow, counter propagating fluid flows, or a combination of these. In other embodiments, such a mechanism can comprise an array of optical, electrical, or magnetic manipulators (e.g., optical tweezers, individually controllable magnetic beads, etc.) configured to manipulate particles bound to the nucleic acid molecules. The means for retention of nucleic acids within the nucleic acid amplification module of the integrated chip (see FIG. 4, element 25) can include activatable primers comprising complexing groups for immobilizing extension products obtained during nucleic acid amplification. Alternatively, nucleic acid polymerases can be immobilized or otherwise retained on the surface of the integrated chip 20.

The amplified nucleic acids are detected in the nucleic acid detection module 29 of the integrated chip 20 (FIG. 4) under the control of the nucleic acid detection control module 60 (FIGS. 2 and 3).

Figure 9A:
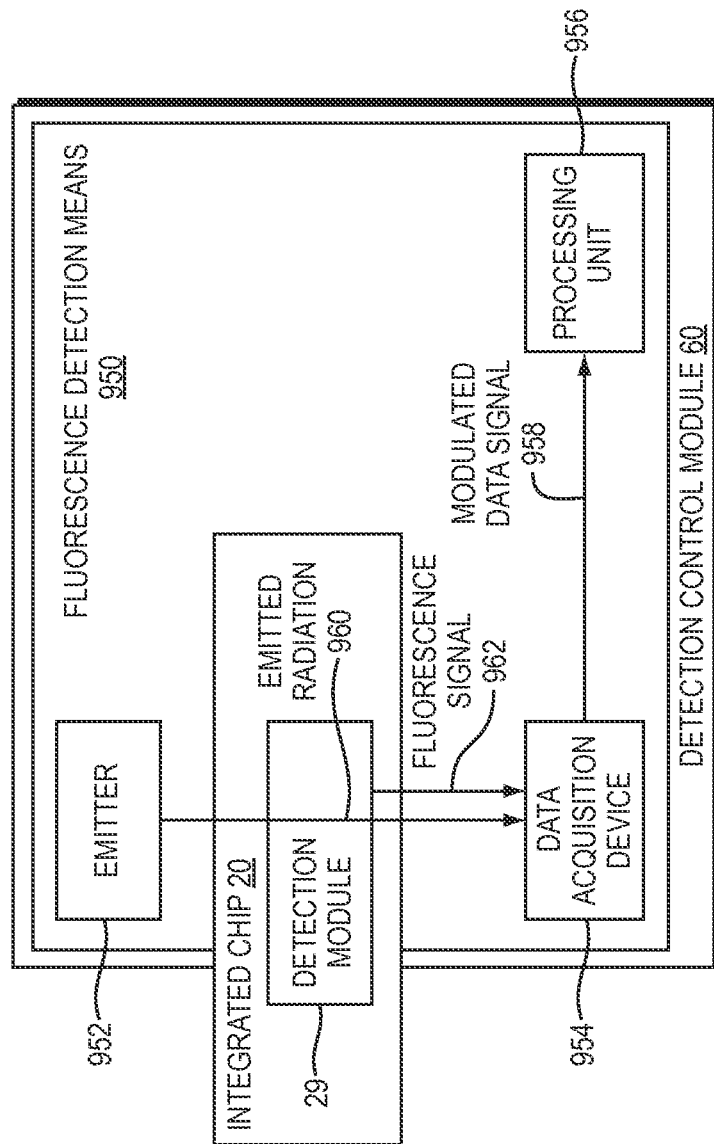
FIG. 9A illustrates an embodiment of a modular design of an fluorescence detection control module.

In various embodiments, module 60 can comprise a fluorescence or electro-optic detection means 950 for detecting nucleic acids as shown in FIG. 9A. The fluorescence detection means 950 can include an emitter 952 such as a light-emitting diode and/or a laser diode, a data acquisition device 954 such as a photodetector, photo-multiplier tube (PMT) or a charge-couple device (CCD), and a processing unit 956 for storing and processing the acquired data. In one embodiment, the emitter 952 excites the sample with emitted radiation 960 to produce a fluorescence signal 962 sensed by the data acquisition device 954. In the embodiment shown in FIG. 9A, the emitted radiation 960 illuminates the detection module 29 in a transmission geometry, although it should be understood that reflection and other geometries may be used as well. The data acquisition device 954 transduces the fluorescence signal 962 into a modulated data signal 958 that the processing unit 956 detects and records.

The amplified nucleic acids may be separated and detected using capillary electrophoresis as disclosed in U.S. Pat. No. 6,261,431, incorporated herein by reference in its entirety. In some embodiments, module 60 can comprise a capillary electrophoresis (CE) control means for effecting separation of nucleic acids, said CE control means operably connected to the fluorescence detection means. The CE control means can further include a high voltage control unit for applying voltage across the nucleic acid detection module 60 of the integrated chip 20, said voltage being sufficient for effecting separation of nucleic acids.

Referring to FIG. 4, in one embodiment, CE is performed in detection channels 112, which can be filled with an appropriate buffer and, optionally, pre-filled with a sieving matrix such as agarose, hydroxypropyl cellulose, or polyacrylamide, among others. In certain embodiments, the end user can fill the detection channels 112 (FIG. 4) with a sieving matrix at a point of use.

In alternative embodiments, the nucleic acid detection control module 60 further comprises a hybridization microarray such as GeneChip® microarrays, available from Affimetrix, Santa Clara, Calif.

In one embodiment, the nucleic acid detection control module 60 comprises an electrochemical means for detecting nucleic acids. An example of an electrochemical means for detecting nucleic acids is provided in U.S. Pat. App. Pub. US 2008/0081329, incorporated herein by reference in its entirety. Briefly, such means implement a method for determining the presence or absence of a target substrate in a test sample. The means include an electrode having a conductive surface, and a probe that is bound to the conductive surface and is capable of binding to a target substrate. The conductive-surface bound probe is contacted with the test sample to form a surface-bound target complex. The surface-bound target complex further comprises a first redox complex. The surface-bound probe or the surface-bound target complex, if present, are contacted with a fluid medium comprising a second redox complex, wherein one of the first or the second redox complex is a redox transition metal complex that is capable of undergoing an oxidation-reduction reaction and the other of the first or the second redox complex is a redox-catalyst complex that is capable of catalyzing the oxidation-reduction reaction of the redox transition metal complex. The redox transition metal complex does not undergo any significant amount of oxidation-reduction reaction in the absence of the redox-catalyst complex. The oxidation-reduction reaction of the redox transition metal complex that is catalyzed by the redox-catalyst complex is detected.

In another embodiment, the nucleic acid detection control module 60 comprises an impedance-measuring means for detecting nucleic acids. An example of an impedance-measuring means for detecting nucleic acids is described, for example, in U.S. Pat. No. 7,169,556, incorporated herein by reference in its entirety. Briefly, the method comprises contacting a nucleic acid having a first portion and a second portion with a substrate having oligonucleotides attached thereto, the oligonucleotides being located between a pair of electrodes, the oligonucleotides having a sequence complementary to a first portion of the sequence of said nucleic acid, the contacting taking place under conditions effective to allow hybridization of the oligonucleotides on the substrate with said nucleic acid. After hybridization of a nucleic acid and an oligonucleotide has occurred, the nucleic acid bound to the substrate is contacted with a first type of conductive particles (e.g., metal beads), the conductive particles being made of a material which can conduct electricity, the conductive particles having one or more types of oligonucleotides attached thereto, at least one of the types of oligonucleotides having a sequence complementary to a second portion of the sequence of said nucleic acid, the contacting taking place under conditions effective to allow hybridization of the oligonucleotides on the conductive particles with the nucleic acid so as to form a test substrate having conductive particles complexed thereto. After the second hybridization has occurred, the test substrate is contacted with an aqueous salt solution having a salt concentration effective to sufficiently dehybridize and remove non-specifically bound conductive particles. Hybridization/dehybridization results in a detectable change in impedance between the electrodes resulting from the presence of specifically bound conductive particles.

In accordance with an embodiment of the invention, any one of many different possible techniques for extraction, amplification and detection may be used in combination; or indeed one or more of extraction, amplification and detection may be omitted altogether from the combination of extraction, amplification and detection. For example, in the modular system of FIG. 2, any one of the possible types of modules shown under extraction module 40 may be used for extraction, or another type of extraction module; and such extraction module(s) 40 may be used in combination with any one of the possible types of modules shown under amplification module 50, or another type of amplification module; and further, such extraction module(s) 40 and amplification module(s) 50 may be used in combination with any one of the possible type of modules shown under detection module 60, or another type of detection module. Depending on the target to be detected, different combinations of such modules may be used. First, a biological sample such as blood, saliva, etc., may be used as the biological sample to be analyzed; or a solid sample (e.g. a stool sample), or an aerosol sample, may be used. In the extraction module 40, the target nucleic acid or protein is separated from the rest of the biological sample. Amplification may then occur in the amplification module 50. In another case, if the target is a protein, then it may be passed directly to the detection module 60, such as a capillary electrophoresis module, or any of the other detection modules shown in FIG. 2, or another type of detection module, including, for example, a melting curve analysis module, a chemi-luminescence module, a quantum dot module, a module using nanoparticles such as gold nanoparticles, or a detection module based on the use of radiation. In another case, if the initial biological sample to be analyzed is a nucleic acid, then the extraction module 40 may not need to be used, and the sample can be sent directly to the detection module 60. For the amplification module 50, in addition to the types of modules shown in FIG. 2, other possible modules to be used are a Loop Mediated Isothermal Amplification (LAMP) module, a Helicase-Dependent Amplification (HDA) module, a SDA (Strand Displacement Amplification) module or a bridge amplification module. A LAMP technique may be used such as those set forth in T. Notomi, et al., Nucleic Acids Research, 28, e63 (2000)); an HDA technique may be used such as those set forth in Vincent M, Xu Y, Kong H. (2004), "Helicase-dependent isothermal DNA amplification," EMBO Rep 5 (8): 795-800; an SDA technique may be used such as those set forth in G. T. Walker, et. al., Proc. Natl. Acad. Sci. USA, 89, 392-396 (1992); the entire contents of all of which references are hereby incorporated herein by reference. In one particular embodiment, the portable assay system 10 comprises an extraction control module 40 configured to use magnetic beads for extraction of nucleic acids, an amplification control module 50 that uses thermocycling PCR methods employing a Peltier device, and a detection control module 60 that uses capillary electrophoresis and fluorescent signal detection to separate and detect nucleic acids.

In accordance with an embodiment of the invention, different integrated chips may be able to be analyzed by a single mobile device, with each of the different possible integrated chips implementing a different functionality that is recognized and performed by the single mobile device. For example, one chip may be used for analyzing nucleic acids, and another chip may be used in the same mobile device for analyzing proteins.

A diagram of a typical flow of material and data through the system of the present invention, such as the modular system depicted in FIG. 2, is shown in FIG. 3. The extraction, amplification, and detection modules 40, 50, 60 typically run for about 4 minutes each, compared to hours to weeks using conventional techniques. In embodiments according to the invention, the detection may occur in less than 2 hours, less than 1 hour, less than 30 minutes, less than 1 minute or less than 1 second from commencing analysis of the sample. In an embodiment, the integrated chip 20 that houses the extraction, amplification, and detection modules 40, 50, 60 typically weighs about 35 g, whereas the application-specific integrated circuit (ASIC) used to process the detected signal weighs about 25 g, bringing the total cartridge weight to about 60 g. The modules are located on the integrated chip and controlled by corresponding control modules (not shown) in the portable assay system 10.

Likewise, a Peltier device or thin film heater can be used to heat and cool the nucleic acid amplification chamber 108 (FIG. 4), while a thermocouple monitors the temperature of the chamber 108. The capillary electrophoresis process may be controlled by a detection control module that controls the strength and persistence of an electric field applied across the channels used for capillary electrophoresis.

In some embodiments, the system 10 (FIG. 1) can include a fluid pressure generating means for moving a biological sample and/or nucleic acids through the integrated chip. Fluid pressure can be generated by peristaltic pumps, piston pumps or any other suitable means. Alternatively, pressure may be applied to the microfluidic channels in the chip by means of a hand-pumped syringe coupled to an appropriate inlet port, e.g., sample inlet port 100, reagent addition port 108, sample well 120, buffer well 116, or buffer waste well 114 (FIG. 4).

Means for controlling valves (such as valves shown in more detail in FIGS. 7 and 8A and 8B and discussed below) can be incorporated into the system 10 (FIG. 1). The valves control the flow of fluid between the different modules and along the various transport channels. Any number of valve technologies may used, including passive plug valves, mechanically actuated valves, electromagnetically actuated valves, ferrofluidic valves, pneumatic valves, or any other suitable valves.

In some embodiments, the system 10 (FIG. 1) comprises a data processing means for storing, classifying, quantifying and transferring data acquired by analyzing the biological sample. The data processing means can include a means for wireless data transfer.

In certain embodiments, the signal intensity versus time may be analyzed to give an indication of the types and quantities of the nucleic acid species present in the biological sample 22 (FIG. 1). For example, plotting the detected signal against a signal produced by a reference sample allows the user to determine whether or not pathogens present in the reference sample are present in the sample under test, as identical pathogens will produce signal peaks at the same moment in time (given the same analysis conditions). The data processing means further include a viral load computing means for computing viral loads (e.g., by integrating an area under a curve indicating the fluorescence signal as a function of time).

In other embodiments, the system 10 further comprises a data displaying means for outputting data.

The portable assay system 10 interfaces with the integrated chip 20 through electrical, thermal, and mechanical interfaces. Clamps and/or catches hold the chip in place with sufficient steadiness to ensure that vibrations do not cause electrodes, detectors (such as photodetectors), or heater to become misaligned. A heater (and optionally a cooling element like an inkjet cooler) (not shown) positioned under, above or on the amplification control module 40 heats and/or cools certain sections of the chip, as described below. Similarly, electrodes positioned near the detection control module 60 can be used to control the separation and flow of fluid through the chip, as described below. Because the chip 20 is transparent, electromagnetic beams, such as infrared or electromagnetic beams for heating or optical beams for interrogating fluorescent tags, can be used to probe wells, chambers, and channels in the chip 20.

Integrated Chip

While the description below refers to specific embodiments of the integrated chip 20 (FIG. 1 and FIG. 4), it is understood that other chip designs can be employed with the portable assembly system 10 (FIG. 1) of the present invention.

In one embodiment, the present invention is a compact integrated chip for use with a system for rapid analysis of biological samples.

The integrated chip 20 may be formed of glass, any plastic with good optical properties including but not limited to, Polyethylene, Polypropylene, Poly(Urethane-Imide), poly (tetrafluoroethylene), polycarbonate, Cyclic Olefin Copolymer (COC), polyamides, Cyclic Olefin Polymer (COP), poly(methyl methacrylate), polyacrylamide, polystyrene, PMMA, or any other suitable material or combination of materials.

The integrated chip comprises at least one sample inlet port for injecting biological samples and reagents; a nucleic acid extraction module, comprising at least one extraction chamber for extracting nucleic acids from the biological samples, said extraction chamber connected to the sample inlet port by at least one sample transport channel; a nucleic acid amplification module, comprising at least one amplification chamber for amplifying nucleic acids, said nucleic acid amplification chamber connected to the extraction chamber by at least one nucleic acid transport channel; and a nucleic acid detection module, comprising at least one detection channel for separating and detecting the nucleic acids, said detection channel connected to nucleic acid amplification chamber by at least one amplification product transport channel. Preferably, the at least one sample inlet port, the at least one extraction chamber, the at least one amplification chamber, and the at least one detection channel are arranged to minimize the utilization of space. As discussed above in connection with FIG. 2, swappable modules may be used.

Preferably, the nucleic acid amplification module further includes at least one reagent addition port in fluid communication with at least one nucleic acid transport channel. In certain embodiments, the nucleic acid detection module further comprises at least one sample well in fluid communication with at least one amplification product transport channel. In some embodiments, the nucleic acid detection module further comprises at least one sample waste well in fluid communication with at least one detection channel; a buffer waste well in fluid communication with at least one detection channel; and a buffer well in fluid communication with at least one detection channel. Preferably, the integrated chip of the present invention comprises at least two sample inlet ports; at least two nucleic acid extraction chambers, each said nucleic acid extraction chamber connected to one of the at least two sample inlet ports by a respective sample transport channel; at least two nucleic acid amplification chambers, each said nucleic acid amplification chamber connected to one of the at least two extraction chambers by a respective nucleic acid transport channel; and at least two detection channels, each said detection channel connected to a respective nucleic acid amplification chamber by a respective amplification product transport channel.

In embodiments, at least two detection channels intersect. In one embodiment, shown in FIG. 4, detection channels 112 intersect at right angles. It is understood that any angle of intersection can be selected, depending on the general shape of the integrated chip 20, the number of detection channels, and the desired layout of the integrated chip. It is preferable that the layout be compact. Referring to FIG. 4, the intersection of the detection channels 112 provides an advantage of a compact design in that the sample waste wells 118 and buffer well 116 can be shared by several (or all) detection channels 112. Additionally, the embodiment in which a user loads detection channels 112 with a molecular sieve, intersecting detection channels 112 at buffer well 116 offers an advantage of loading all detection channels simultaneously.

The integrated chip can further comprise at least two reagent addition ports, each said reagent addition port in fluid communication with a respective nucleic acid transport channel; at least two sample wells, each said sample well in fluid communication with a respective amplification product transport channel. Preferably, at least two sample wells are configured for use for addition and/or disposal of additional reagents.

In certain embodiments, the integrated chip further comprises at least one sample waste well, each said at least one sample waste well connected with at least two detection channels by at least two sample waste channels. Preferably, at least one sample waste well is configured for use for addition and/or disposal of additional reagents.

In other embodiments, the integrated chip further comprises at least one buffer waste well, each said buffer waste well in fluid communication with at least two detection channels; and a buffer well in fluid communication with at least two detection channel. Preferably, at least one buffer waste well and the buffer well are configured for use for addition and/or disposal of additional reagents.

In one embodiment, the buffer well is disposed at the point of intersection of at least two detection channels, and wherein the buffer well is in fluid communication with said intersecting detection channels.

Preferably, wherein each sample waste channel connects to the detection channel downstream from the at least one amplification product transport channel, thereby effectively increasing the cross-section of the intersection of the at least one amplification product transport channel and the at least one amplification product transport channel (see FIGS. 8A-8C and the description below). As used herein, the term "downstream" is defined as the direction in which the nucleic acids travel through the detection channel during separation.

In some embodiments, the integrated chip further including microfabricated protrusions (posts) disposed in at least one nucleic acid extraction chamber and/or in at least one sample transport channel. As discussed earlier, microfabricated protrusions disposed on the integrated chip can be used for mechanical shearing of cells in the biological sample, as described, for example, in U.S. Pat. No. 5,635,358 and WO 2006/029387, incorporated herein by reference in their entirety.

The integrated chip can further be provided with at least two electrodes for applying voltage across the at least one detection channel. In other embodiments, the integrated chip can include additional electrical contacts for providing power and/or control signals to electrically-actuated mechanism that can be disposed within the integrated chip.

Figure 5:
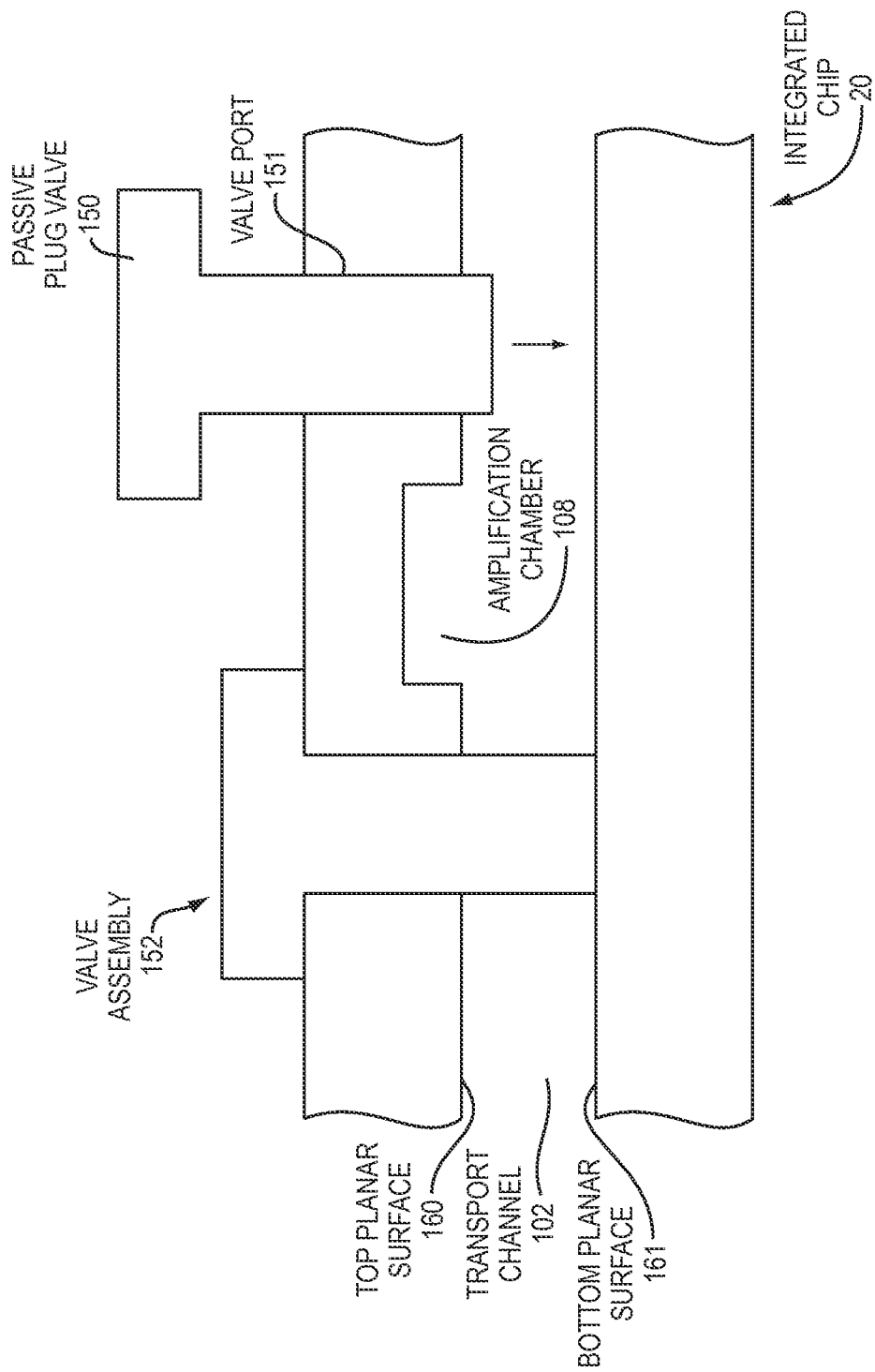
FIG. 5 illustrates exemplary passive plugs for controlling fluid flow on an integrated chip.
Figure 6A:
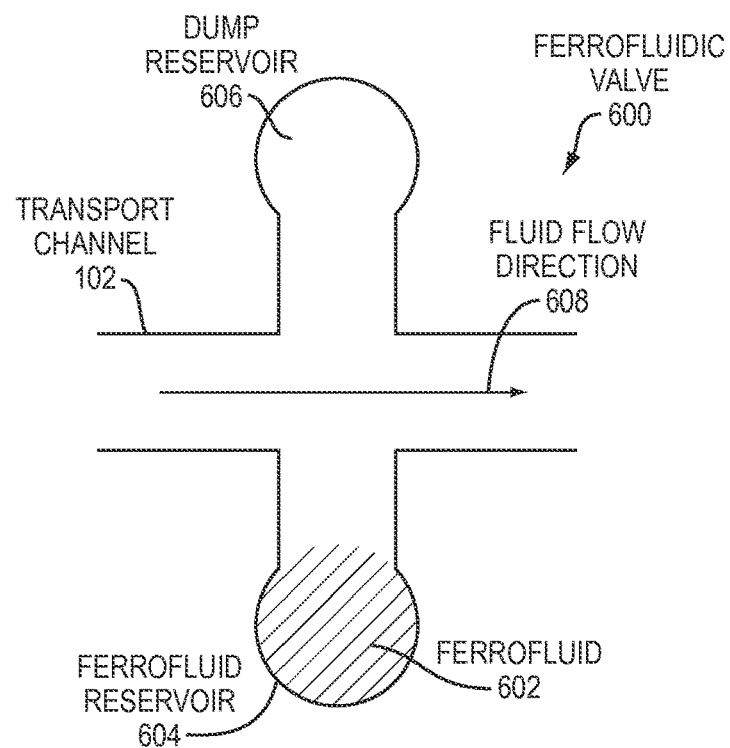
FIGS. 6A and 6B illustrate an exemplary electromagnetically controllable valve and a method for controlling fluid flow through the integrated chip employed by the present invention.
Figure 6B:
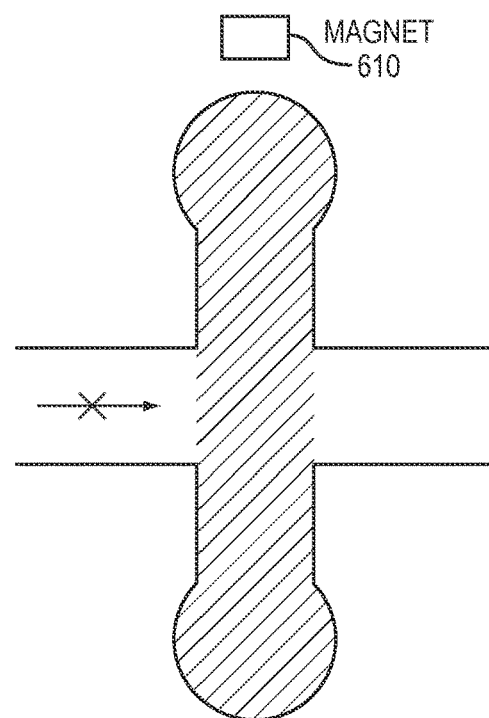

In one aspect, the present invention is a novel valve assembly as shown in FIG. 5 and FIGS. 6A and 6B, and as described below in greater details. Thus, in one embodiment, the present invention is a valve assembly in a microfluidic device.

In one embodiment, the valve assembly comprises a microfluidic channel for transporting fluid, said microfluidic channel formed between a top surface and a bottom surface and having a longitudinal axis; a valving port in the top surface for receiving a passive plug; and a passive plug configured for insertion into the valving port. Preferably, the portion of the bottom surface opposite the valving port has uniform depth along longitudinal axis. This arrangement simplifies the manufacturing process of the integrated chip by eliminating or reducing the stringency for alignment of the parts.

In another embodiment, the valve assembly comprises a transport channel for transporting fluid; a ferrofluidic channel intersecting said transport channel; a first ferrofluidic reservoir and a second ferrofluidic reservoir, said first and second ferrofluidic reservoirs connected by the ferrofluidic channel; ferrofluid in either one or both ferrofluidic reservoirs; and a permanent magnet or an electromagnet for filling the ferrofluidic channel with the ferrofluid. Ferrofluids are typically colloidal mixtures comprising magnetic particles suspended in a liquid and further having a detergent/surfactant admixed to the liquid to prevent the particles from clumping together. (See also Berger, et al. (July 1999). "Preparation and properties of an aqueous ferrofluid". Journal of Chemical Education 76 (7): pp. 943-948), incorporated herein by reference in its entirety.) Any commercially available ferrofluids can be used, such as, for example, ferrofluid available from Ferrotec Corporation, Bedford, N.H.

Figure 7B:
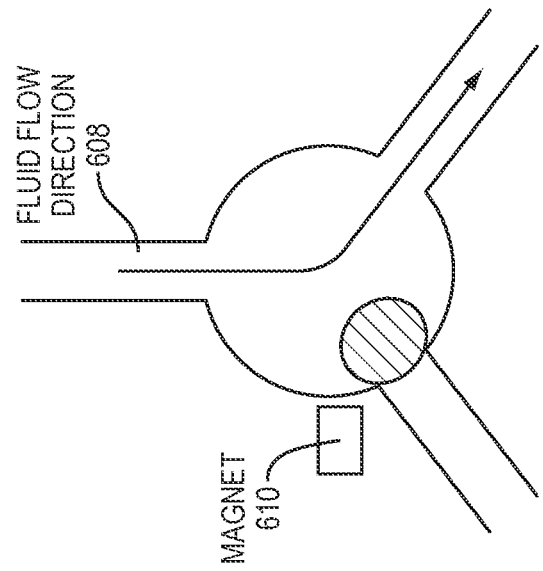
FIGS. 7A and 7B illustrate an exemplary method for controlling fluid flow to and from on-chip wells.
Figure 7A:
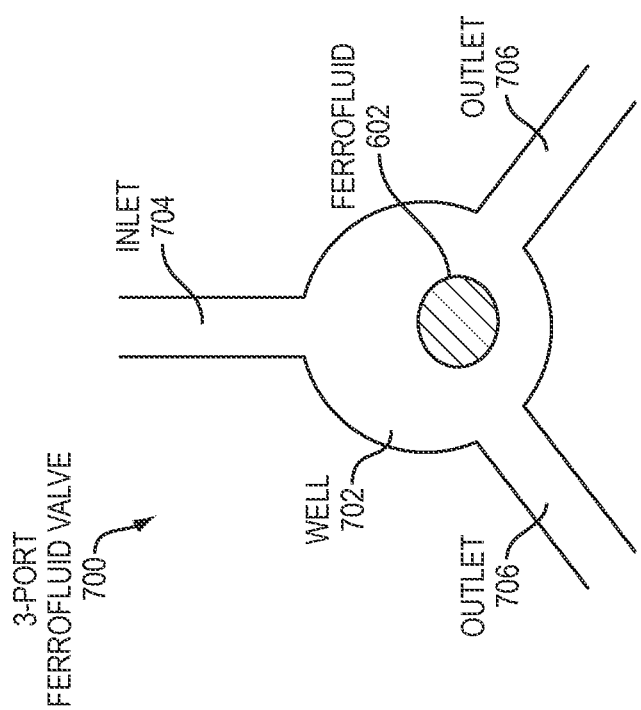

In yet another embodiment, and now referring to FIGS. 7A and 7B, the present invention is a valve assembly in a microfluidic device, comprising: a reservoir; an inflow transport channels for transporting fluid having an output end connected to the reservoir; a first and a second outflow channels for transporting fluid, each having an input end connected to the reservoir; ferrofluid disposed in the reservoir; and a magnet for controlling the position of the ferrofluid in the reservoir. During the operation of the valve assembly of FIGS. 7A and 7B, the ferrofluid within the reservoir is positioned to close either the output end of the inflow channel; or the input end of the first outflow channel, but not the input end of the second outflow channel; or the input end of the second channel, but not the input end of the first outflow channel; or neither the output end of the inflow channel, nor the input ends of the first and the second outflow channels.

In the embodiment shown in FIG. 4, the integrated chip 20 comprises eight sample regions 130, each of which comprises a nucleic acid extraction module 25, a nucleic acid amplification module 27, and a nucleic acid detection module 29. The chip may be made of glass, acrylic, or any other suitable material. Typically, the chip is about the size of a thick credit card. In one embodiment, the chip has a length from 1 to 4", a width from 1 to 4"; preferably, integrated chip 20 is about 2" wide by 4" long.

Each sample region 130 includes one sample inlet port 100, one extraction chamber 104, one amplification chamber 108 and one detection channel 112. It is understood that for each biological sample, there is a separate and discernable pathway from a respective sample inlet port to a respective extraction chamber, further to a respective amplification chamber and then to a respective detection channel. Thus, cross-contamination of sample is avoided and sample integrity is ensured. However, there are common wells (e.g. sample waste wells 118 and buffer wells 112) that are shared by several sample regions. This sharing reduces space required for the integrated chip layout and also reduces waste of material.

It will be understood that the chip may be configured with any number of sample regions (for example, 1, 12, 24, 256, 386 or 512), provided that the size of a sample region 130 is sufficient to extract, amplify, and detect nucleic acids. The sample regions 130 can be used to analyze multiple different samples for the same target biomarker sequence or pathogen, one sample for multiple different pathogens or biomarkers, or any suitable permutation or combination of samples and pathogens or biomarkers, providing suitable references are available.

The biological sample 22 (see FIG. 1), reagents used for extraction, amplification, and detection travel between different wells and reaction chambers through microfluidic transport channels 102, as shown in FIG. 4. In a particular embodiment, the transport channels 102 have a cross section of 10-1000 μm×10-1000 μm, and preferably of 200×100 μm, and are of sufficient size to accommodate a flow of the magnetic beads used in an embodiment of the extraction process. In one embodiment, ports and wells such as sample inlet ports 100, reagent inlet/outlet ports 108, buffer waste wells 114, buffer well 116, sample waste wells 118, and sample wells 120 are 0.5-10.0 mm in diameter, and preferably 0.9-5.0 mm in diameter, with depths determined by the thickness of the integrated chip 20. Nucleic acid amplification chambers 108, are generally 0.1-30.0 mm in diameter, and preferably 10.0 mm in diameter, and 10 µm to 19.0 mm deep, and preferably 0.5 mm deep. Nucleic acid extraction chambers 104 can be 1-25 mm long and 1-30 mm wide, more preferably 15 mm long and 10 mm wide. Nucleic acid detection modules 29 of the integrated chip 20 that use capillary electrophoresis typically have detection channels 112 that have cross sections of 10-200×10-200 µm, more preferably 50×10 µm.

Fluid flow through the channels, ports, wells, and chambers is controlled by a combination of valves and propulsions means, which may be a hand-pumped syringe coupled to the sample inlet port 100. Other propulsion means such as peristaltic pumps or piston pumps can also be used. The propulsion means propel fluids through channels and chamber unless a closed valve blocks the fluid flow. Valves may use any one of a number of technologies, including technologies such as manually actuated plugs, mechanically actuated plugs, electromagnetically actuated plugs, ferrofluidic valves, pneumatic valves, or any other suitable technology.

For example, FIG. 5 shows a valve assembly 152 comprising a passive plug valve 150, valve port 151, and a transport channel 102 formed by a top surface 160 and a bottom surface 161. The passive plug valve 150 can be inserted into valve port 151 to control fluid flow into a nucleic acid amplification chamber 108 via the transport channel 102. The valve 150 may be inserted manually or it may be mechanically actuated. In one embodiment, the inlet sample well 100, reagent inlet/outlet port 106, sample waste well 118, sample well 120, buffer waste well 114, and buffer well 116 may act as valve ports 151 for receiving passive plug valves 150.

FIGS. 6A and 6B show an alternative method of controlling fluid flow using ferrofluidic valves 600. Ferrofluids are typically colloidal mixtures comprising magnetic particles suspended in a liquid and further having a detergent/surfactant admixed to the liquid to prevent the particles from clumping together. (See also Berger, et al. (July 1999). "Preparation and properties of an aqueous ferrofluid". Journal of Chemical Education 76 (7): pp. 943-948, incorporated herein by reference in its entirety.) Any commercially available ferrofluids can be used, such as, for example, ferrofluid available from Ferrotec Corporation, Bedford, N.H. In-line ferrofluidic valves 600 comprise a ferrofluid channel 601 disposed across a transport channel 102. One end of the ferrofluid channel 601 ends in a ferrofluid reservoir 604 filled with ferrofluid 602, and the other end ends in a dump reservoir 606. In an "open" condition, the ferrofluid 602 remains in the ferrofluid reservoir 604, allowing fluid to flow through the transport channel 102 in a fluid flow direction 608, as shown in FIG. 6A. Placing a magnet 610 near the dump reservoir 606 draws the ferrofluid 602 through the ferrofluid channel 601, blocking the transport channel 102, as shown in FIG. 6B.

FIGS. 7A and 7B show how ferrofluid valves 600 may be used to control fluid flow into and out of multiport chambers and wells. In an embodiment shown in FIGS. 7A and 7B, fluid inters well 702 through inlet 704. A small amount of ferrofluid 602 rests inside a well 702. In a position in which both outlets 706a and 706b are open, the ferrofluid 602 rests in a stable position inside the well 702, as shown in FIG. 7A. The well 702 shown in FIGS. 7A and 7B has one inlet port 702 and two outlets ports 706a, 706b; in other embodiments, the well 702 may have plural inlet and output ports 704, 706.

Fluid enters the well 702 through an inlet 704. Fluid can exit the well 702 through either outlet port 706a or outlet port 706b, depending on the position of the ferrofluid 602. As shown in FIG. 7B, the ferrofluid 602 can be positioned to block an outlet 706a using a magnet 610, leaving another outlet 706b open for fluid egress. Similarly, outlet 706b cab be blocked, while outlet 706a is open. It is also understood that the inlet 704 can also be blocked. It is also understood that the direction of fluid flow can be reversed. In one embodiment, different fluids can enter well 702 through outlets 706a and 706b, while inlet 704 can serve as a fluid egress port.

Referring again the embodiment shown in FIG. 4, in one embodiment of the invention, the user loads magnetic beads coated with streptavidin (e.g., Applied Biosystems FMAT® Streptavidin Beads, 6-8 micron) into a sample region 130. The magnetic beads may be moved along a microfluidic transport channel 102 to a nucleic acid extraction chamber 104 under pressure from a syringe pump or any other suitable fluid pressure generating means. Alternatively, the magnetic beads may already be loaded in the extraction chamber 104. Next, the user loads the biological sample 22 into a sample region 130 through the sample inlet port 100. Once the biological sample 22 is loaded, it travels via the same transport channel 102 from the sample inlet port 100 to the extraction chamber 104. The magnetic beads (not shown) attach themselves via the streptavidin coating to the nucleic acids in the biological sample 22. Once the attachment process is complete, applying a magnetic field to the extraction chamber causes the magnetic beads (and the attached nucleic acids) to move in the direction of the magnetic field, extracting the nucleic acids from the biological sample 22.

The user completes the extraction process by flushing the extraction chamber 104 with a wash (not shown) injected through the sample inlet port. The wash flows through the extraction chamber 104 to a reagent inlet/outlet port 106, from which the user extracts the wash products. The user may repeat the wash cycle until the extracted nucleic acid is sufficiently free of contamination to be amplified and detected.

Once the extracted nucleic acid is free of contaminants, it is forced (e.g., by applying pressure from a syringe or a pump) downstream into a nucleic acid amplification chamber 108, which the user then loads with reagents via the reagent inlet/outlet port 106. The user then isolates the amplification chamber by closing the appropriate valves before initiating amplification by conventional amplification techniques. A thermoelectric heater (not shown) may be used to heat and cool the reagents in the amplification chamber 108. In one embodiment, reagents include primers, a DNA polymerase (such as Taq polymerase), deoxynucleotide triphosphates, buffer solution, and divalent cations.

Figure 8A:
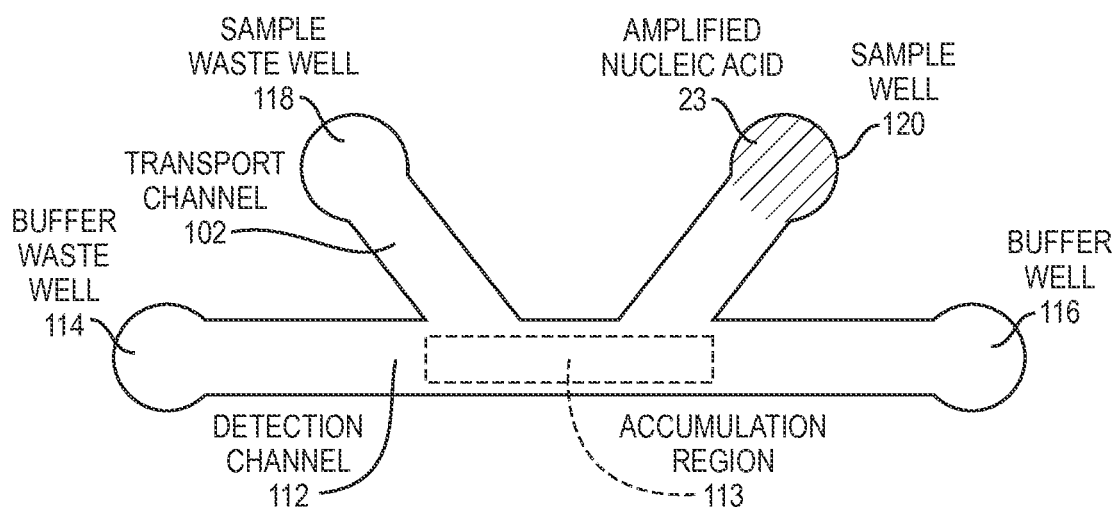
FIGS. 8A-8C illustrate an exemplary arrangement of the channels and methods of injecting a sample into the channels employed for capillary electrophoresis by an embodiment of the present invention.

Once the nucleic acid is sufficiently amplified, the valves isolating the amplification chamber 108 are opened and the amplified nucleic acids are flushed into a sample well 120, which is connected to a detection channel 112 via a transport channel 102 as shown in FIG. 8A.

In one embodiment, capillary electrophoresis is used to detect and identify nucleic acids present in the biological sample 22. Capillary electrophoresis involves running an electric current through an electrolyte, such as an aqueous buffer solution, mixed with the sample under test in a short (on the order of 50 µm long) channel such as the detection channel 112. The current causes the sample to migrate down the detection channel 112; however, the compounds separate as they migrate because their migration speeds depend on their molecular weights, the current, and the channel size, among other variables.

In one embodiment, the user adds electrolyte solution and, optionally, sieving matrix, to the detection channel 112 through a buffer well 116 (also shown in FIG. 4). In embodiments in which buffer well 116 is connected to multiple detection channels 116, such as shown in FIG. 4, simultaneous loading of all detection channels is achieved. Once the buffer well 116 is full, an electric field 130 applied to electrodes situated on or near the sample well 120 and the sample waste well 118 causes the amplified nucleic acid 23 to migrate from the sample well 120 to the sample waste 118 by way of a detection channel 112, as shown in FIG. 8B. Typically, the electric field 130 as about 400 V. The extracted nucleic acids accumulate in an accumulation region 113 situated in detection channel 112 between the intersection points of the transport channels 102 that connect the sample well 120 and sample waste well 118 to the detection channel 112. Waste from the sample well 120 continues on to the sample waste well 118.

Figure 8B:
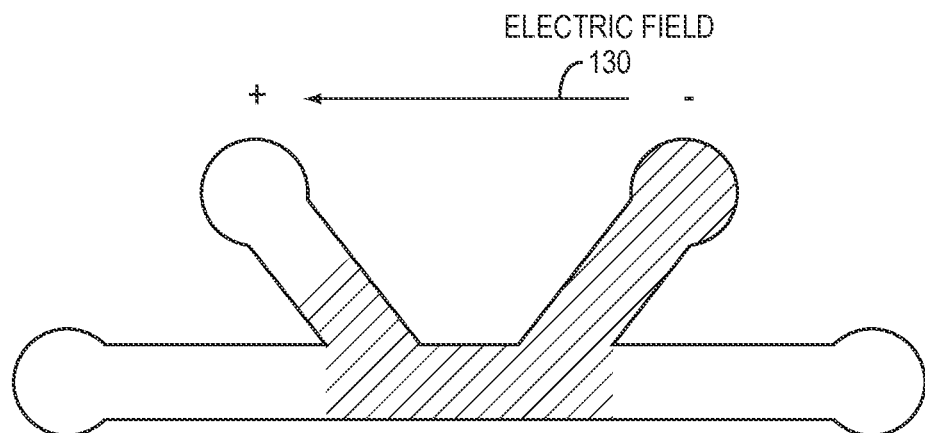
Figure 8C:
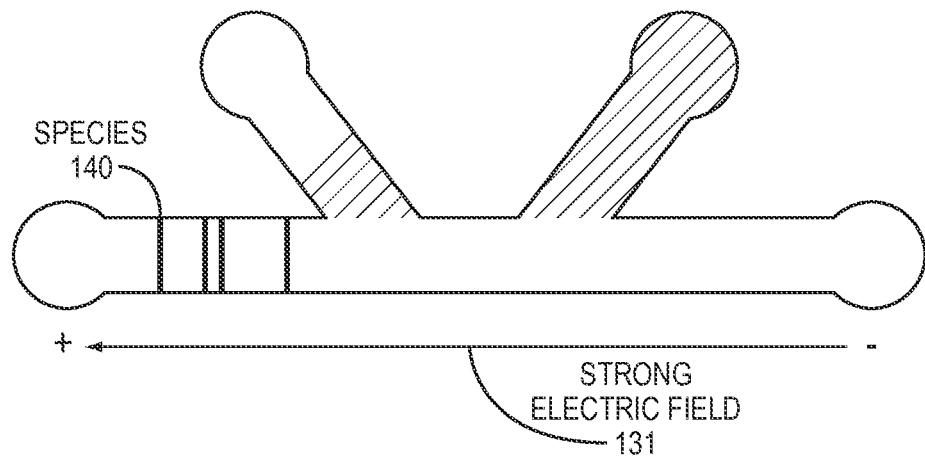

FIG. 8C shows how applying an electric field 131 from the buffer well 116 to a buffer waste well 114 across the detection channel 112 causes the amplified nucleic acid 23 sample to separate into species 140 according to molecular weight. Typically, the strong electric field 131 as about 6 kV. As amplicons from different target biomarker sequences or different pathogens have different molecular weights, the different biomarkers or pathogens travel down the detection channel 112 at different speeds. An unknown species can be identified by comparing its speed to the speed of a known reference (not shown) in the same detection channel 114 or an identical detection 112 under the same strong electric field 131.

Figure 9B:
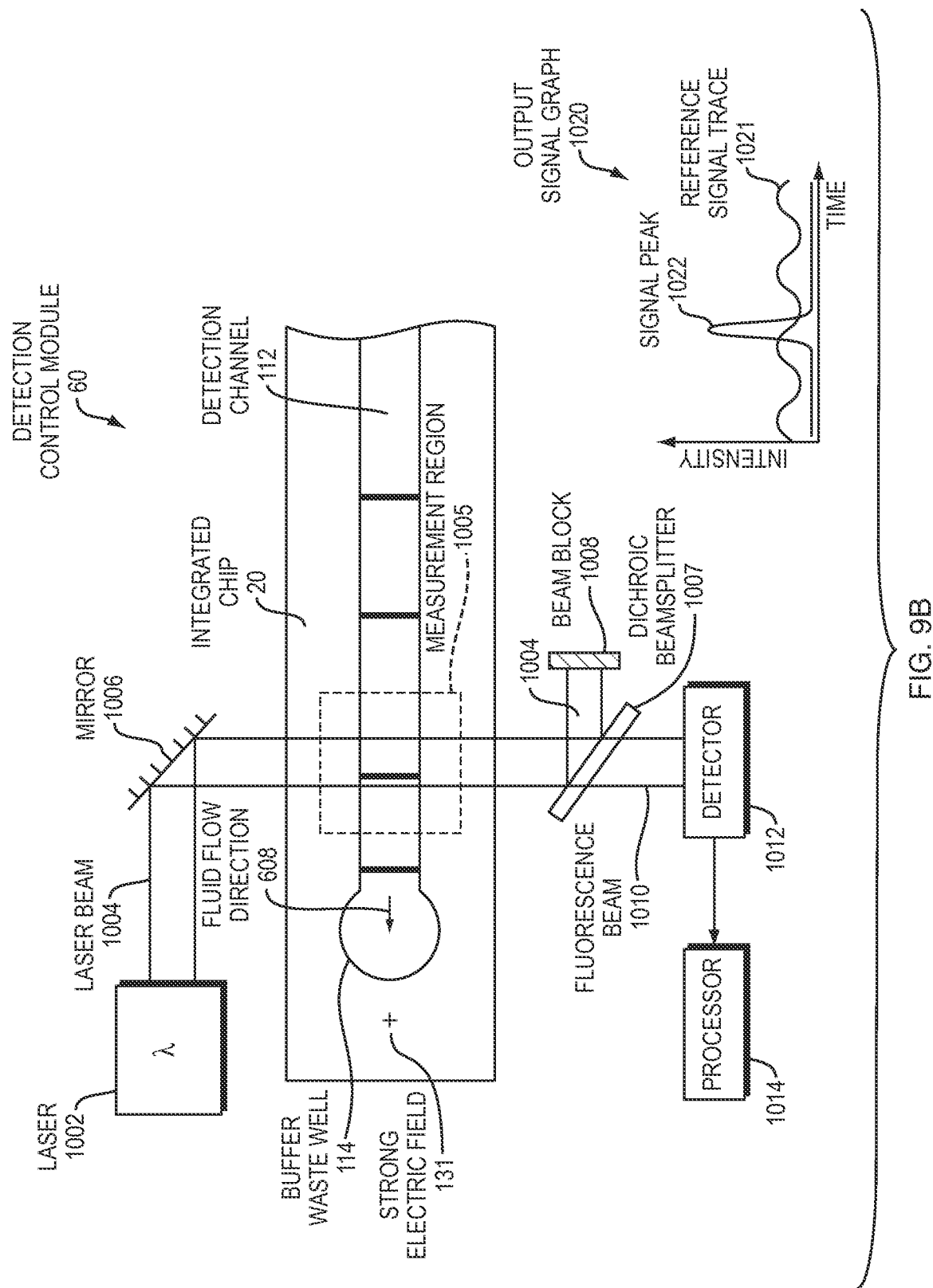
FIG. 9B illustrates an exemplary system and method for detecting fluorescence signals generated in the nucleic acid detection module of the integrated chip.

FIG. 9B illustrates the operation of an exemplary capillary electrophoresis detection control module 60. As described above, an electric field 131 draws the species 140 down the detection channel 112 towards the buffer waste well 114. As the species 140 travel down the detection channel 112, they pass through a measurement region 1005 one at a time, where they are interrogated by a laser beam 1004 or LED or other light source to produce a signal that may be interpreted to give an indication of the target biomarker sequence or pathogen type and quantify the corresponding load.

In an embodiment, the fluorescence signal 1010 is produced by illuminating the separated load 140 with a laser beam 1004 or LED or other light source of the appropriate frequency. A laser 1002 generates the laser beam 1004, which may be directed to the measurement region using a mirror 1006. Alternatively, the laser beam 1004 may be focused onto the sample with a lens. The beam may also be generated by light-emitting diode or other light source instead of a laser and it may or may not be coupled via fiberoptic cable. It will be understood that a variety of optical arrangements may be used to interrogate the species 140.

The laser beam 1004 excites the separated load 140 to produce a fluorescent beam 1010, which is separated from the laser beam 1004 with a dichroic beamsplitter 1007. In an embodiment, a detector 1012 produces a photocurrent (not shown) in response to the intensity of the fluorescent beam 1010. The photocurrent may be fed to a processor 1014, which may be used to analyze the detected fluorescent beam 1010. For example, the analysis might comprise comparing the detected signal to the reference signal trace 1021 from a known reference sample on an output signal graph 1020, where matching peaks in the traces indicate the presence of identical biomarker sequences or pathogens. Integrating the areas under the peaks gives an indication of the relative amounts of biomarkers or pathogen (i.e., the viral load) present in each sample. In embodiments, software correlates the output signal graph 1020 with the reference signal trace 1021 using standard correlation techniques to yield an output suitable for interpretation by a user.

Lab-On-A-Chip for Nucleic Acid or Protein Detection

Embodiments of the present invention include an integrated chip capable of performing the above mentioned biological assay in a single device, also referred to as an integrated microfluidic chip or lab-on-a-chip. The integrated chip is designed to sequentially perform the following three processes: (1) extraction from biological cells; (2) sequence specific nucleic acid amplification by PCR; and (3) size separation of amplified DNA by capillary electrophoresis combined with fluorescence detection of separated DNA.

It will be appreciated that a similar integrated microfluidic chip or lab-on-a-chip to that discussed in the present section may be used for protein detection, with appropriate modification of the techniques for use with protein detection. For example, in detection of a protein, one embodiment may use only an extraction module and a detection module without using amplification. Further, in some embodiments, only a detection module may be used.

In one embodiment, the invention set forth herein is an integrated chip for rapid extraction, amplification and separation of nucleic acid in a biological sample. The invention also comprises a hardware system that receives at least one integrated chip. The integrated chip is a microfluidic device that includes microfluidic channels in sequential fluid communication with functional modules: a nucleic acid extraction module, a nucleic acid amplification module and a nucleic acid separation module.

In one embodiment, a biological sample of interest is loaded onto the integrated chip and the nucleic acid is extracted from the biological sample within the extraction module. For example, the biological sample includes cells, and the cellular DNA is extracted from the cells. The extraction process, preferably, employs nucleic acid precipitation using magnetic beads. The extracted nucleic acid is then transported by fluid pressure into the nucleic acid amplification module, where the nucleic acid is amplified using a polymerase chain reaction (PCR). Preferably, the PCR employs thermal cycling. The amplified nucleic acid products are then transported by fluid pressure into the nucleic acid separation module, where the nucleic acids are separated and detected by employing capillary electrophoresis. Preferably, fluorescently nucleic acid primers are used and the nucleic acid products are detected using fluorescent detection. The three sequential processes described above occur within the same integrated chip.

The sequential process of extraction, amplification, separation/detection is controlled by a hardware system that includes a nucleic acid control module, a nucleic acid amplification control module, and a nucleic acid detection control module. Preferably, these modules respectively control: (1) application of magnet for the precipitation of the magnetic beads-attached nucleic acids, (2) thermal cycling during the PCR amplification of the extracted nucleic acids, and (3) electrophoretic separation and fluorescent-assisted detection of the nucleic acids.

Figure 10:
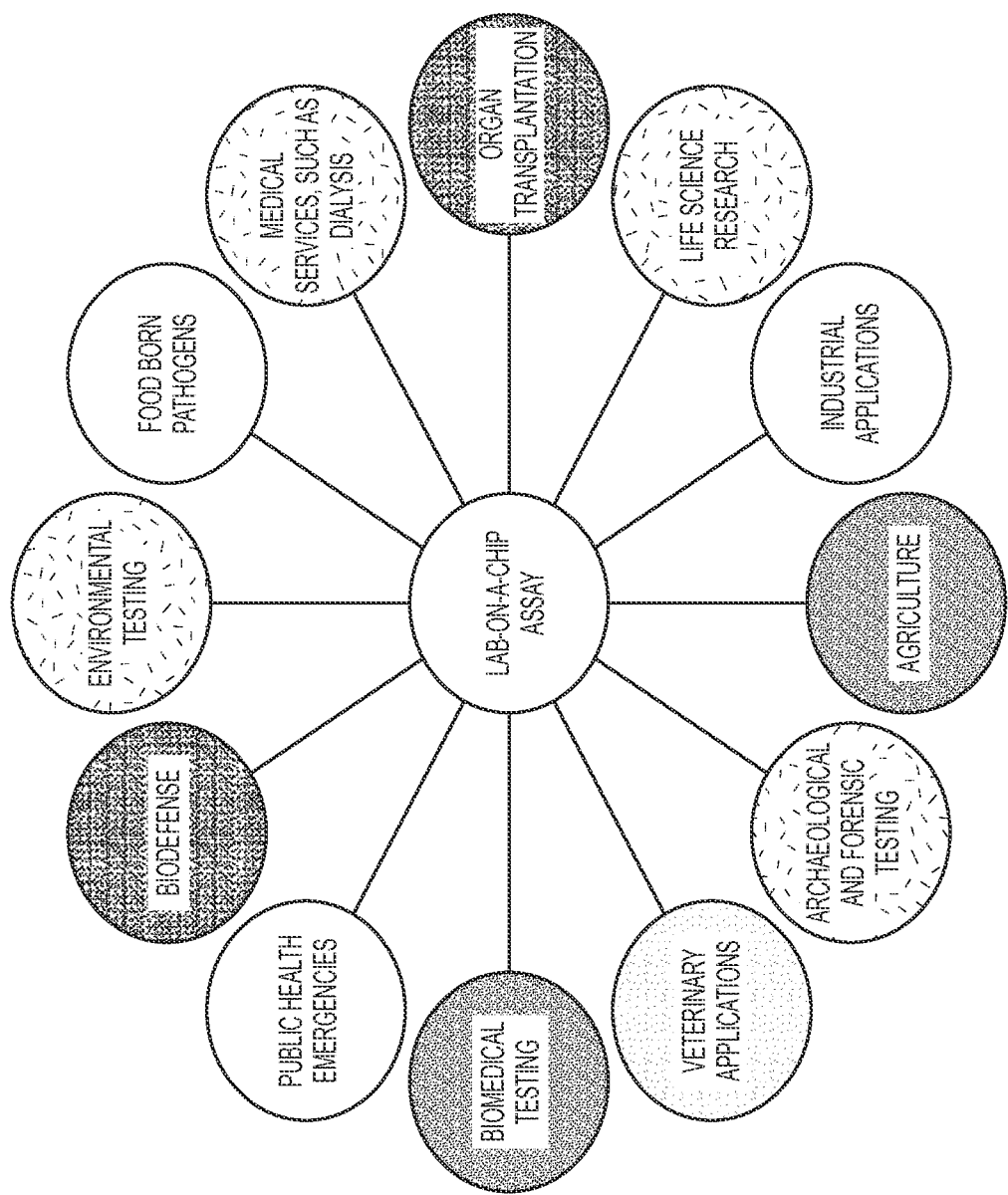
FIG. 10 is a flow chart that illustrates the utility of the present application in various applications.

With reference to FIG. 10, the present invention, in various embodiments, enables advances in health care and other industries. The integrated chip and the hardware system of the present invention, described in details below, can be used for analysis of biological samples in biodefense, environmental testing, testing for food-born pathogens, in medical services, in organ transplantation, in life science research, in industrial applications, in agriculture, in forensic testing, in veterinary medicine, and in biomedical testing in public health applications, including public emergencies.

Compact Integrated Chip Design

Returning to FIG. 4, that figure is an illustration of an integrated microfluidic chip 20 according to embodiments of the present invention having eight sample regions 130, each having an extraction module 25, an amplification module 27, and a separation module 29. In the integrated chip 20, the above processes are accomplished in enclosed chambers, open wells, and interconnecting channels, a combination of which constitutes a microfluidic chip. In this integrated chip 20, a multiplexed design to accommodate analysis of multiple samples is achieved by an architecture where each sample has an independent fluidic path in a separate sample region 130 from input to final detection, without any cross-contamination possibility. Each sample region 130 includes one sample inlet port 100, one extraction chamber 104, one amplification chamber 108, and one detection channel 112. There are common wells (e.g., sample waste wells 118 and buffer wells 116) that are shared by several sample regions 130. This sharing of common wells reduces space required for the integrated chip layout and also reduces waste of materials and reagents, such as capillary electrophoresis running buffer.

In the specific embodiment shown in FIG. 4, four sample input wells 100 (loading ports) are located on each extremity of the chip, hence accommodating eight samples. These wells 100 are then independently connected by channels 102 to a set of enclosed extraction chambers 104 designated for nucleic acid extraction. Each of these extraction chambers 104 is in turn connected to another set of open wells (reagent inlet/outlet ports 106) to enable fluidic flow-through across the extraction chamber 104, as required to implement the extraction assay. In preferred embodiments, fluid flow through the channels, ports, wells, and chambers is controlled by a combination of valves and propulsions means, described below. Suitable propulsion means include hand-pumped syringes coupled to the sample input wells 100, peristaltic pumps, or piston pumps.

The reagent inlet/outlet ports 106 are in turn connected to another set of enclosed amplification (PCR) chambers 108 designed for PCR amplification. Amplification chambers 108 are also connected to sample wells 120 on one side and the reagent inlet/outlet ports 106 (shared with respective extraction chambers 104) on the other side, again enabling fluid flow-through across the amplification chambers 108.

Finally, each of the fluidic paths is independently terminated to a set of individual separation/detection channels (CE channels) 112, in which electrophoresis separation is achieved prior to fluorescence detection towards the end of the CE channels 112. The electrophoresis module is once again uniquely designed to multiplex the injection and separation of all eight samples that were previously subjected to the extraction and amplification processes on-chip.

The wells 120 on the electrophoresis side of the PCR chambers 108 are open and are utilized as CE sample wells 120. Thus, each sample (or PCR product) has a separate CE sample well 120 leading from its respective PCR chamber 108. However, the buffer well 116 required for the CE assay is shared between samples (either all or between two adjacent sample paths) as shown in FIG. 4. This multiplexed design also reduces the complexity of high-voltage wiring: by relying on a common buffer well 116, fewer electrodes are required to operate the system since one electrode can be shared by several channels. For example, a single high-voltage (preferably, greater than 6 kV) electrode can be used for all eight of the samples subjected to CE. The CE operation of the chip 20 ensures that the shared buffer well 116 does not pose a danger for cross-contamination of samples. The CE operation, including loading and unloading of wells 114, 116, 118, and 120, and application of electric fields is discussed in greater detail below with reference to FIGS. 4 and 8A-8C.

Typically, the chip 20 is about the size of a thick credit card. In one embodiment, the chip 20 has a length from 2.5 cm to 25 cm, a width from 2.5 cm to 15 cm, and a thickness from 0.1 mm to 10 mm; preferably, the integrated chip 20 is about 5 cm wide by 10 cm long by 2 mm thick. One of skill in the art will appreciate that size and design of a specific chip will be a matter of design preference.

In a preferred embodiment, the chip 20 feature dimensions are 10-200 μm by 10-200 μm (e.g., 50 μm by 20 μm) for detection (CE) channels 112, and 10-1000 μm by 10-1000 μm (e.g., 200 μm by 100 μm) for all other channels. It will be appreciated that for the channels through which the magnetic beads will flow, a channel dimension is selected to ensure the unobstructed flow of the magnetic beads. The detection (CE) channels 112 can be 10-120 mm long (for example, 80 mm) long. Larger detection CE channels 112 size require higher voltages for CE analysis. The sizes of the other channels, such as transport channels 102, as well as the channels connecting extraction chambers 104 and reagent inlet/outlet ports 106, reagent inlet/outlet ports 106 and amplification chambers 108, amplification chambers 108 and sample wells 120, sample wells 120 and detection channels 112, are not critical.

In preferred embodiments, the circular wells and chambers, such as the buffer wells 116, are 5-15 mm (for example, 10 mm) in diameter and 0.05-1 mm (for example, 0.5 mm) deep. Hexagonal chambers, such as the extraction chambers 104, may be 5-25 (for example, 15 mm) long (tapered edges) and 5-15 mm (for example, 10 mm) wide. This sort of hexagon design facilitates easy fluid flow in the extraction chambers 104, particularly because the process involves high volume fluid flow. Other embodiments can accommodate circular chambers that are 0.1-30 mm in diameter and 0.01-19 mm deep and hexagonal chambers that are 1-25 mm long (tapered edges) and 1-30 mm wide.

Preferred embodiments of the access wells and inlet ports, such as the inlet wells 100, are 0.9-5 mm in diameter, with depths determined by the thickness of the plastic used to make the chip 20. Alternative embodiments can accommodate access wells with diameters of 0.5-10 mm. Again, well depth is determined by the thickness of the plastic used, and is typically between 0.5-2 mm.

Compact Integrated Chip Fabrication

Embodiments of the microfluidic chips fabricated for the purpose and application described here are manufactured of plastic, polymers, or biodegradable polymers; hence these chips are cost efficient to produce and can be used as disposable devices. The disposable aspect thus ensures that issues such as carry-over contamination, a typical problem associated with reuse of biological processing tools, are minimized to the extent of elimination. These chips can also be manufactured with glass, silicon and other materials.

The fabrication process associated with the manufacturing of these chips involves microfabrication of structures in silicon (Si) or glass or aluminum (Al) or other such material to create a master with the desired microfluidic structures. This creates negative microfluidic structures on the microfabricated Si/glass device. The process then involves molding a rubber based mold on this microfabricated Si/glass device to form a positive mold. Hot embossing of the rubber mold on a plastic plaque forms the microfluidic structure identical to the initial Si/glass microfabricated device. In this process, the plastic plaque is heated and pressed onto the positive rubber mold, causing the plaque to become malleable. This malleability makes the plastic of the plaque conforms to the pattern on the rubber mold, forming a negative structure in the plastic plaque identical to the negative structure of the initial Si/glass microfabricated device. The plastic plaques having the negative structure embossed thereon are finally drilled and bonded to another unprocessed plastic plaque to form closed fluidic structures.

For the embossing and bonding, plastic materials such as Polyethelene, Polypropylene, Poly(Urethane-Imide), poly (tetrafluoroethylene), polycarbonate, polyimides, Cyclic Olefine Copolymer (COC) and Cyclic Olefine Polymer (COP), poly(methyl methacrylate), polyacrylamide, polystyrene, or other such materials, can be utilized depending on the customization that the particular application demands.

The above process of hot embossing to manufacture plastic microfluidic chips enables production of low cost devices suitable for disposable use. Furthermore, since plastic manufacturing is generally scalable in a non-linear cost ratio, it is also possible to greatly reduce the cost of production by batch processing these microfluidic devices. The manufactured plastic microfluidic chips can be used to perform biological assays as described below.

Modular Design

Referring to FIG. 4, the chip 20 includes three modules, namely, the DNA extraction module 25, the PCR amplification module 27, and the electrophoresis separation module 29, involved in biological analysis or a diagnostic assay. In general, the entire process of extraction, amplification and separation occurs within the same chip, the sample being transported by fluid flow from one module to the next module.

This integrated process involves lysis of cells, magnetic bead binding to nucleic acid, resuspension/elusion of nucleic acid bound beads, amplification of the extracted nucleic acid and detection of the amplified nucleic acid. During the extraction process, the sample is incubated and washed to produce extracted DNA in an extraction chamber 104. In PCR amplification, which occur in a amplification module 27, extracted DNA is loaded into an amplification chamber 108 along with PCR master mix. The DNA and the PCR master mix are sealed in the amplification chamber 108, which is heated and cooled according to an appropriate thermal protocol. Once the protocol is complete, the amplified sample is transferred to a sample well 120 for subsequent separation and detection. Sieving matrix/gel, buffer, and optionally molecular size standards are loaded into the appropriate CE wells and buffer wells (wells 114, 116, 118, and 120), and a first electric field is applied, causing the sample to enter a detection (CE) channel 112. Applying a second electric field to the detection channel 112 causes the sample to separate into species that propagate past a detection area, where fluorescent tags attached to the species can be stimulated and detected. Extraction, amplification, and detection are described in greater detail below.

Nucleic Acid or Protein Extraction Module

It will be appreciated that a similar extraction module to that discussed below in the present section may be used for protein extraction, with appropriate modification of the below-described nucleic acids techniques for use with protein extraction.

The nucleic acid extraction method incorporated in this integrated chip utilizes magnetic beads, wherein nucleic acid from chemically lysed cells are captured by the magnetic beads. Magnetic beads can be coated with any suitable ligand that would bind to the target being isolated. Examples of the coatings include streptavidin (for use with biotinylated targets), antibodies against the desired target, protein A, protein G, oligo-dT (for use with mRNA).

These beads can be retained within the chamber for optional subsequent PCR amplification directly from the beads with the DNA attached or by eluting the DNA from the beads prior to PCR. To implement the extraction assay, initially a combination of lysis buffer and the streptavidin coated magnetic beads (available from, e.g., Dynal Direct®, available from Invitrogen, or prepared by the end-user according to protocols well known in the art) are mixed with the cell sample and the extraction process performed as per the protocol described below. The components and specification of buffers and beads used in the extraction protocol are also detailed in the following protocol.

An exemplary protocol for the extraction procedure for use with compact integrated chips, including the chip 20 shown in FIG. 4, includes: lysis of cells, magnetic bead binding to nucleic acid, resuspension/elusion of nucleic acid bound beads, and detection of nucleic acid. Loading of on-chip extraction chambers via sample input wells 100 (see FIG. 4) with about 0.01-10 μL of cell sample can be performed using a pipette or a syringe.

Next, the magnetic beads/lysis solution is loaded into the extraction chamber, which contains the earlier dispensed cell sample, via the wells 100. Dispensing the bead solution into the extraction chamber causes mixing of the cells with the bead solution during flow.

As used herein, the term "lysis buffer" refers to any buffer that is used for the purpose of lysing cells for use in experiments that analyze the compounds of the cells. Typically, a lysis buffer includes a detergent that causes cell membrane to break up. Examples of such detergents include Triton X-100, NP40 or Tween-20. Other components of a lysis buffer can include protease inhibitors, DNAses; magnesium salts, lysozime, disulfide reducing agents such as ß-mercaptoethanol, ion chelating agents such as EDTA, and preservatives such as sodium azide. One of ordinary skill in the art will appreciate that the specific buffer used is determined based on the starting material and the target being analyzed.

Once the extraction chambers 104 are filled, the magnetic bead loading is stopped. The filled extraction chamber is incubated at room temperature for a few minutes to permit binding of the target, e.g. DNA, to the ligands coated onto the magnetic beads.

Upon completion of the incubation, a magnet is placed (or engaged, if an electromagnet is used) under the extraction chamber 104 of chip 20 (FIG. 4) under the extraction chamber 104. The magnet forces the magnetic beads to precipitate and permits the retention of the magnetic beads in the extraction chamber 104 as the cellular debris is being washed. Typically, magnet used exerts a field of about 12,000-13,000 Gauss on the extraction chamber. It will be appreciated that the strength of a magnet depends on the size of the beads, the size of the samples and other factor and can be adjusted accordingly.

With the magnet still engaged, the crude extract is washed from the extraction chamber. The washing solution is loaded into the same well on-chip as the earlier loadings. Examples of a washing solution include Tris/EDTA (TE) buffer, a phosphate buffer ($NaH_2PO_4$, NaCl, pH 8), or other standard washing buffers well known in the art.

The washing step can be repeated for a number of times sufficient to ensure that the target being purified (e.g. DNA) is free of the lysis solution and cell debris. Those skilled in the art will be able to readily ascertain the number of washing cycles needed to achieve this. The trapped target molecules (e.g., DNA) can now be eluted off into the extraction chamber 104 by using standard elution buffers, as is well known in the art.

The solution flowing through the extraction chamber 104 will be removed through the reagent inlet/outlet port 106 on the other end of the extraction chamber by a pipette, syringe, a pump, or any other suitable means. This waste solution is periodically removed through reagent inlet/outlet port 106.

DNA/RNA amplification by thermal PCR may be performed in two alternative ways. The first method involves adding the magnetic beads, which are not known to inhibit PCR, with the DNA/RNA attached to the beads, directly to a PCR master mix.

As used herein, the term "master mix" refers to a solution that contains a polymerase (e.g., Taq DNA Polymerase, reverse transcriptase), magnesium chloride and a mix of deoxyribonucletide (dNTPs) in a reaction buffer (e.g. an aqueous solution of $(NH_4)_2SO_4$, TrisHCl, Tween-20, pH 8.8). Those of skill in the art will appreciate that a specific master mix is selected based on the target being amplified, test condition and the preferred polymerase.

The second method involves eluting the DNA or RNA from beads, followed by re-suspending the DNA in any standard buffer known in the art that does not inhibit PCR.

If beads with the nucleic acids attached are used directly in the PCR, then the PCR master mix is loaded into the amplification chamber 108. The magnet below the extraction chamber 104 is then disengaged, allowing the magnetic beads to float freely in the extraction chamber. To prevent the magnetic beads (and the DNA attached to the beads) from flowing out of the extraction chamber 104, the ports 106 and wells 120 on either side of the extraction chamber 104 are sealed. For example, the reagent inlet/outlet ports 106 and wells 120 can be sealed with plug valves or the channels 102 connecting the inlet/outlet ports 106 and wells 120 to the extraction chamber 104 can be sealed using elastic or ferrofluidic valves. Thus the beads can move freely within the extraction chamber 104 but are prevented from exiting the extraction chamber 104. The extraction is complete and the chip is ready to be subjected to thermal PCR.

Otherwise, if beads with DNA attached are not used, the extraction chamber is flushed with a re-suspension buffer. The re-suspension buffer is loaded into the extraction chamber 104 until it completely refills the extraction chamber 104, displacing and unloading the washing buffer from the extraction chamber 104. Then the magnet below the extraction chamber 104 is disengaged and the wells 100 and reagent inlet/outlet ports 106 are sealed using appropriate valving.

Next, the chip is heated to 50-90° C. (e.g., 70° C.) on a Peltier device or other appropriate source of heat typically used as a means to control or adjust the temperature, such as a thermocycler for PCR. This causes the elution of DNA from the magnetic beads.

After heating, the valves blocking fluid transport from the extraction chambers 104 to the amplification chambers 108 through the transport channels 102 are open. Then the magnet is re-engaged under the extraction chamber 104, securing the magnet beads in the chamber. Finally, the extracted DNA/RNA/protein is flushed from the extraction chamber 104 into amplification chamber 108.

The DNA/RNA/protein extraction process is complete, and the extracted DNA, whether attached to the magnetic beads or not, is ready for on-chip amplification as detailed below. Depending on the volume of DNA/RNA solution required for PCR (i.e., concentration of DNA), a portion of the eluted DNA/RNA can be unloaded from the extraction chamber and the PCR master mix added.

PCR Amplification Module

The extracted DNA/RNA from the extraction module and a PCR master mix are mixed in the amplification module 108. The PCR master mix contains (apart from other standard reagents detailed later) a set of sequence specific forward and reverse primers to amplify a genetic sequence of interest (typically a unique characteristic of the species) in the extracted DNA/RNA.

Once the desired quantity of PCR master mix is loaded in the amplification chamber 108, thermal cycling is performed at the desired DNA denaturation temperature (70-100° C.) and primer annealing temperatures (40-70° C.).

In one embodiment, the PCR is achieved by placing the integrated chip in a thermocycler (e.g., a BioRad DNA engine) and repeating a temperature cycle protocol. (See, for example, the protocol for amplification of a 700 bp DNA fragment characteristic of the *E. coli* DH10B cells described in Exemplification section.) A skilled person can readily ascertain the number of cycles based upon the starting concentration of the sample and the desired concentration of the final amplification product.

In one embodiment, the PCR is performed using the hardware module described in details below.

In certain embodiments, one of ordinary skill in the art will add 10° C. to the above temperatures and add an additional minute to each incubation time.

The completion of the thermal cycling results in the amplification of DNA/RNA sequence as designed in the primers, ready for analysis using the method described subsequently.

Capillary Electrophoresis (CE) Module

In certain embodiments, upon completion of PCR thermal cycling, resulting in the amplification/replication of a specific DNA sequence, the replicated/amplified DNA molecules are subjected to size separation and then fluorescence detection in the separation module 29 of the chip 20, shown in FIG. 4. The electrophoresis based detection is accomplished as follows.

Referring again to FIG. 4, the detection (CE) channels 112 are loaded with a sieving matrix (also referred to herein as a "gel") of polyacrylamide (e.g., GenceScan polymer, ABI, or homemade polyacrylamide solutions suitable for use in capillary electrophoresis). This is achieved by dispensing the sieving matrix into all of the eight multiplexed separation modules 29 simultaneously from the center buffer well 116 on the integrated chip 20. Next, a CE running buffer (any standard buffer known to one of ordinary skill in the art that is suitable for use in capillary electrophoresis) is loaded in all but one of the CE wells (i.e., the buffer is loaded CE buffer well 116, CE buffer waste well 114, and CE sample waste wells 118, but not in the CE sample well 120). The CE sample well 120 is first loaded with the PCR product by pressure driving the sample from the PCR chamber 108 into the CE sample well 120. Then, the running buffer is added to the PCR product in the CE sample well 120.

Those skilled in the art will also appreciate that different gel media can be used for electrophoresis separation. For example, polyacrylamide or agarose gel (e.g., varying concentrations 0.1% to 20%) may be used for DNA and RNA separation. Sodium dodecyl sulfate (SDS) polyacrylamide gel or agarose gel may be used for protein separation. In protein analysis, low acrylamide concentrations can be used to separate high molecular weight proteins (e.g., 5% for 40-200 kDa), while high acrylamide concentrations can be used to separate proteins of low molecular weight (e.g., 15% for 10-40 kDa). Similarly, low agarose concentrations can be used for separating high molecular weight nucleic acid (e.g., 0.5% for 1-30 kbp) and high agarose concentrations to separate low molecular weight nucleic acid (e.g., 1.5% for 0.1-2 kbp).

Examples of a buffer suitable for use in capillary electrophoresis include the Tris/Borate/EDTA (TBE) buffer (e.g. for nucleic acids being separated on an agarose matrix), Tris/glycine/SDS (e.g., for proteins being separated on a polyacrylamide gel). A skilled person will appreciate that the choice of a running buffer will depend on the target being analyzed.

Alternatively, if size standards are also to be used to verify the size of the PCR product, the size standards (e.g., Gene Scan TAMRA or ABI) can be added to the PCR product and the running buffer loaded atop. The running buffer and the amplified DNA can be mixed to form a homogenous suspension within the well 120. In this case, to enable fluorescence detection of the DNA, primers labeled with a fluorophore similar to the size standards (e.g., VIC, ABI) will result in the labeling of the amplified DNA, as can be expected by the PCR amplification process.

Any molecular weight standards suitable for nucleic acid separation can be used. Examples include GelPilot® molecular weight marker, available from QiaGen, and a Molecular Weight Ladder available from New England Biolabs.

Fluorescently labeled nucleic acid primers are commercially available (e.g. from Sigma-Aldrich) or can be synthesized by one of ordinary skill according to known protocols. (See, for example, Prudnikov er. al. Nucleic Acids Res. 1996 Nov. 15; 24(22): 453 54542, or the protocol available online at the URL info.med.yale.edu/genetics/ward/tavi/n_label. The entire teachings of both of these publications are incorporated herein by reference.) Examples of fluorescent labels include fluorescein, 6-Carboxyfluorescein, 5-tetrachlorofluorescein, Texas Red (sulforhodamine 101 acid chloride), quantum dots, and fluorescently tagged nanoparticles.

FIGS. 8A-8C illustrate the CE process as performed in the detection (CE) channels 112. Once the reagents are loaded in the wells 114, 116, 118, and 120, a platinum electrode grid (not shown) is lowered onto the chip 20 (FIG. 4), immersing the tip of the electrode into all the wells 114, 116, 118, and 120. As shown in FIG. 8B, an electric field 130, such as a short-duration, relatively low, injection voltage (e.g., about 400 V), is applied between the sample well 120 and sample waste well 118. This causes the PCR product (amplified nucleic acid 23) to move along the portions of the transport channel 102 and the detection (CE) channels 112 that connect sample well 120 and sample waste well 116. Next, as shown in FIG. 8C, a strong electric field 131, such as a high voltage of about 6 kV, is applied between the buffer well 116 and the buffer waste well 114. This results in the movement of the amplified nucleic acid 23 trapped in the transport channels 102 and the detection (CE) channels 112 along the path that connects these wells.

The application of the strong electric field 131 causes the separation of DNA molecules based on molecule size. Further down the detection channels 112 from the initial positioning of the DNA in the CE channel 112 (for example, 75 mm from the point where the DNA 23 was trapped in the path between the buffer well 116 and buffer waste well 114), fluorescence can be stimulated by suitably illuminating separated species 140 with a laser source or LED or other light source with a wavelength matched with the excitation wavelength of the fluorophore attached to the species 140. The skilled person can readily ascertain the appropriate wavelength to be used based upon the fluorophore selected.

As is described below with reference to FIG. 11, a detection control module 406 of the hardware module 400 senses the fluorescence of the excited fluorophores tagged to the amplified DNA or size standards.

The separation module 29 of the chip 20 (FIG. 4) can be advantageously used as an independent module for a number of other applications, including DNA, RNA, and protein analysis. To tailor the chip for a specified application, a combination of the flowing parameters may need to be manipulated to attain the desired level analysis data (i.e., high resolution in separation).

In any embodiment described herein, the length of the detection channel 112 can be adjusted from a few centimeters to many meters to accommodate separation of a many number of independent molecules. This improves the ability to resolve separated molecules.

Similarly, the applied electric fields (e.g., electric field 130 and strong electric field 131) can be changed from millivolts to many thousands of volts to attain the desired level of fragment (DNA/RNA/proteins) separation. This also improves the ability to resolve separated molecules. The skilled person will be able to ascertain the electric field to be applied based upon length of detection channels 112 (FIG. 4), desired resolution and molecules of interest.

Those skilled in the art will also appreciate that different gel media can be used for electrophoresis separation. For example, polyacrylamide or agarose gel (e.g., varying concentrations 0.1% to 20%) may be used for DNA and RNA separation. Sodium dodecyl sulfate (SDS) polyacrylamide gel or agarose gel may be used for protein separation. In protein analysis, low acrylamide concentrations can be used to separate high molecular weight proteins (e.g., 5% for 40-200 kDa), while high acrylamide concentrations can be used to separate proteins of low molecular weight (e.g., 15% for 10-40 kDa). Similarly, low agarose concentrations can be used for separating high molecular weight nucleic acid (e.g., 0.5% for 1-30 kbp) and high agarose concentrations to separate low molecular weight nucleic acid (e.g., 1.5% for 0.1-2 kbp).

In addition, non-optical detection strategies, such as electrochemical detection strategies, may be used, alleviating the need to fluorescently label the molecules to be detected by separation.

Kits and Preloaded Integrated Chips

In an example embodiment, different integrated chips can be prepared for analyzing different pathogens, diseases, and biological samples.

End-users of the integrated chip described herein can deploy the chip and the hardware system (described below) at the respective locations to analyze a variety of biological samples, as described above with reference to FIG. 10. To further enable this capability, the integrated chips of the present invention can be included in a kit comprising additional components, such as reagents, including various buffers described above, molecular markers, molecular weight standards, magnetic beads, oligonucleotides, fluorescent dyes, CE sieving matrices, and the like. Alternatively, many of these components can be preloaded onto the integrated chip.

Referring to FIG. 4, the integrated chip 20 can be fabricated having at least one extraction chamber 104 include magnetic beads, which can be coated by, e.g., streptavidin. In some embodiments, at least one extraction chamber 104 can include reagents for cell lysis and nucleic acid extraction (e.g., the lysis buffer described above). In some embodiments, at least one extraction chamber 104 can include microfabricated protrusions disposed in and/or in the at least one transport channel 102, which can serve to mechanically shear and lyse the cells in the biological sample. At least one amplification chamber 108 can be preloaded with magnetic beads, oligonucleotides, optionally fluorescently labeled, PCR master mix, and the like. At least one detection channel 112 can be preloaded with a CE sieving matrix and/or running buffer and/or molecular weight standards. In another embodiment, at least one detection channel 112 includes a hybridization microarray for identification of the nucleic acid targets amplified by the PCR.

In other embodiments, the integrated chip of the present invention can include at least two electrodes for applying voltage across the at least one detection channel 112. In other embodiments, the integrated chip can include at least one flow control valve for controlling fluid flow through the at least microfluidic channel. The valves can be passive plugs or can be any of the valving system described in details below.

Precision Control

An embodiment according to the present invention exploits nanomanipulation and precision control of molecules at the nanoscale. By precision controlling molecules or fluidic systems with ultra high precision, an embodiment according to the invention can dramatically improve the overall quality produced by the chemical and biochemical reactions conducted under highly controlled and tunable conditions on nano-engineered chips or precision engineered chips. Therefore, by exploiting nanotechnology an embodiment according to the invention can improve not only on at least one step of the integrated process, but can also dramatically improve the overall signal to noise ratio, increasing the ability to detect trace amounts of biological targets such as pathogenic nucleic acids, biomarker sequences or proteins in a fluid sample. The precision control elements in nano-engineered chips according to an embodiment of the invention, and in a platform device according to an embodiment of the invention, tighten the overall Gaussian spread in the products produced by on-chip reactions, enabling orders of magnitude improvement across several critical performance metrics, including rapidity, accuracy, deployability, adaptability, and robustness.

An embodiment according to the invention permits precision or nanoscale control of nucleic acids and proteins. A nanoscale or precision reactor permits an unanticipated improvement in time, cost, speed and infrastructure required to perform analysis of biological samples as compared with conventional, larger scale systems. For example, tension can be applied to a nucleic acid such as by an electromagnetic field exerted in a reaction chamber, which can cause a nucleic acid, such as a 2 nm wide DNA molecule, to stretch in a given direction. This speeds up the tendency of a reaction to occur, for example by opening the DNA. Thus, small scale control of the molecule is realized. Control on such a small scale permits the achievement of a greater signal to noise ratio, an improved yield and reduces the time for equilibration in a reaction chamber. Various forces may be used to control at the nanoscale, for example mechanical, electromagnetic forces and/or hydrodynamic forces, and using types of tension taught in U.S. Pat. No. 7,494,791, the entire disclosure of which is incorporated herein by reference.

As used herein, the term "precision control" of a parameter refers to the ability to control the parameter such that repeated measurements of the parameter under unchanged conditions show the same results, to within the degree of precision, and further refers to the ability to adjust the parameter to a new value of the parameter, with such a degree of precision. For example, in accordance with an embodiment of the invention, a parameter that governs at least one step of a reaction used to analyze a biological sample may be precision controlled to within a degree of plus or minus 10%, plus or minus 1%, plus or minus 0.1%, plus or minus 0.01%, plus or minus 0.001% or plus or minus 0.0001%, and may be adjustable to a new value of the parameter, with such a degree of precision. Such precision control can be performed in many ways, including for example by using controlled fluid flow or by applying tension, including both for proteins and nucleic acids.

As used herein, applying tension to a nucleic acid or protein includes direct and indirect application of force to a nucleic acid or protein that tends to stretch or elongate the nucleic acid or protein. As examples, tension can be applied to a nucleic acid or protein by direct application of mechanical tension, by hydrodynamic stresses in a fluid flow, or electromagnetic fields, whether acting on the nucleic acid or protein molecules themselves and/or on surfaces, substrates, or particles and the like that are bound to the nucleic acid or protein.

In accordance with an embodiment of the invention, tension that tends to stretch a nucleic acid may be applied in at least one cycle. Further, tension that tends to stretch the nucleic acid may be applied and optionally varied during each cycle of the following steps (a)-(e) in a nucleic acid amplification method:
  (a) contacting one or more template strands of single-stranded nucleic acid with one or more oligonucleotide primers complementary to a portion of the one or more template strands;
  (b) annealing at least one primer of the one or more primers to the portion of the one or more template strands to which the primer is complementary;
  (c) contacting the one or more template strands with a nucleic acid polymerase and at least four different nucleoside triphosphates;
  (d) extending the at least one annealed primer by the nucleic acid polymerase thereby forming one or more extension products bound to the one or more template strands;
  (e) separating the one or more extension products from the one or more template strands; and
  (f) repeating steps (a), (b), (c), (d) and (e) to amplify the nucleic acid,
  wherein at least one of the one or more extension products in step (e) is used as template strands in a subsequent cycle of steps (a)-(e),
  wherein, for the last cycle, step (e) is optional.

In addition, at least one cycle of steps (b) or (d) comprises applying tension that tends to stretch the nucleic acid to the one or more template strands. In some versions, the process can be performed isothermally.

In accordance with an embodiment of the invention, precision control may be achieved using, for example, hydrodynamic focusing, such as that taught in Wong et al., "Deformation of DNA molecules by hydrodynamic focusing," J. Fluid Mech., 2003, vol. 497, pp. 55-65, Cambridge University Press; and/or using mechanical force, such as using techniques taught by Liphardt et al., "Reversible Unfolding of Single RNA Molecules by Mechanical Force," Science, 2001, vol. 292, pp. 733-737, American Society for the Advancement of Science; the entire teachings of both of which references are hereby incorporated herein by reference. Other techniques may be used.

The level of precision control may be on the scale of nanometers, given that, for example, DNA is 2 nm in diameter and proteins may be 10 nm in diameter. In accordance with an embodiment of the invention, control of the translational position or rotational orientation of a molecule may be achieved to within less than 100 nm, less than 10 nm, or less than 1 nm. In addition, the reaction chambers themselves may be on a small scale, such as less than 10 mm, less than 1 mm, less than 100 microns, less than 10 microns, less than 1 micron, less than 100 nm, less than 10 nm or less than 1 nm in largest dimension. Further, the temperature, pressure, diffusion rate, tension, chemical concentration, salt concentration, enzyme concentration or other parameters that modulate or govern the reaction may be varied within a tightly controlled range, for example by plus or minus 10%, plus or minus 1%, plus or minus 0.1%, plus or minus 0.01%, plus or minus 0.001% or plus or minus 0.0001%.

As used herein, where a system is "configured" to perform precision control of a parameter, such precision control of parameters may be performed, for example, using one or more software or hardware modules implemented under the control of a computer processor in a mobile device according to an embodiment of the invention. The computer processor may include one or more control modules, which receive digitally encoded signals corresponding to values of one or more parameters to be controlled, and which are specially programmed to perform closed loop control of those parameters to be controlled. For instance, the control module may receive a value of the parameter, and, based on the value of the parameter, may adjust one or more forces or other conditions applied to a molecule being analyzed (for example using application of tension). As a result of the adjustments implemented by the control module, the parameter will then change, and a closed feedback loop may therefore be formed under which the control module performs closed loop control of the one or more parameters to be controlled. In addition to receiving digitally encoded signals from one or more other computer modules, the control module may also receive one or more sensor inputs from one or more sensors, which sense values of parameters to be controlled; for example a temperature or pressure sensor may provide a temperature or pressure sensor input to the control module.

Hardware System

As described above, the compact integrated chip with biological assay is intended to be disposable. The instant invention also includes a hardware system that comprises mechanical, electrical and electronic devices, as well as computer-readable instructions for controlling these devices. A skilled person will appreciate that such hardware system can be configured to accommodate various designs of chips utilizing the above biological processing modules (e.g., nucleic acid extraction, PCR-based amplification, laser-based fluorescence detection, and CE separation).

Figure 11:
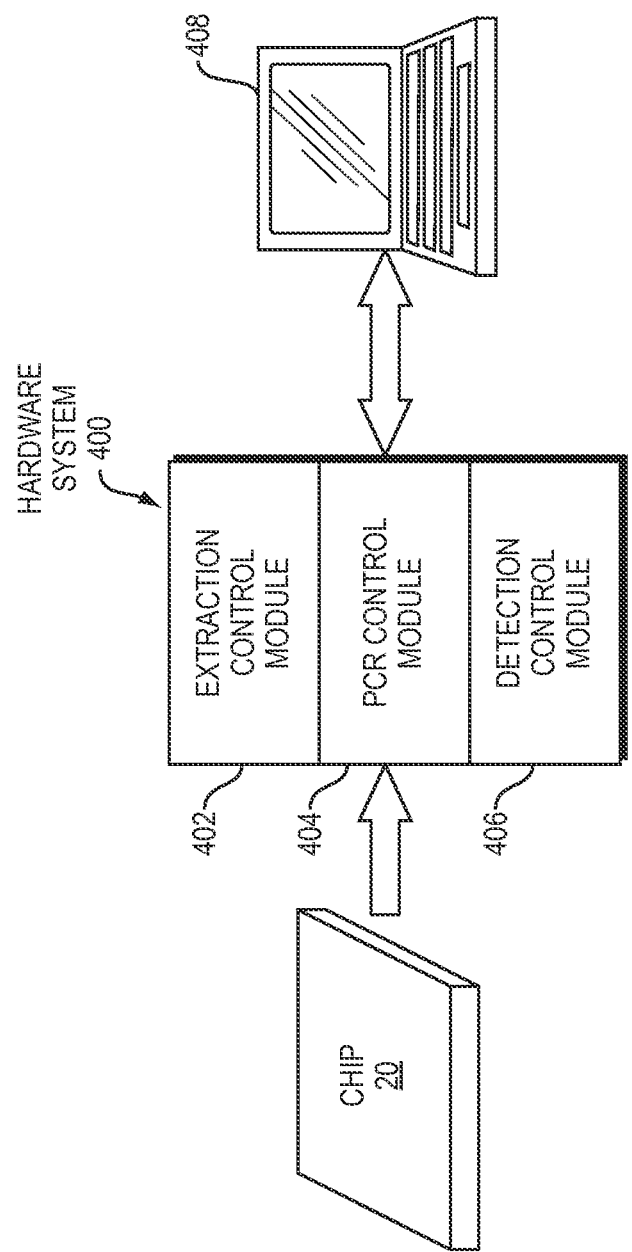
FIG. 11 illustrates a hardware module for use with compact integrated chips in accordance with embodiments of the present invention.

FIG. 11 is a block-diagram of a hardware system 400 that is included in the present invention. The details of construction of the hardware system 400 are further described below in detail with reference to FIG. 14.

Referring to FIG. 11, the chip 20 (which can be disposable) is typically inserted into a hardware module 400, which is controlled by a microprocessor/computer interface 408. As shown in FIG. 11, the hardware module 400 has an extraction control module 402, PCR control module 404, and detection control module 406. The centrally controlled hardware module 400 can be operated to accommodate the sequential processes on the chip 20, or the modules 402, 404, and 406 can be individually controlled to execute operations of any one or a combination of two modules. The individual features of each of the hardware module 400 are described below.

The microprocessor/computer interface 408 means may comprise, for example, an appropriate computer such as any taught herein, and conventional computer components such as any taught herein; and may comprise RAM storing an operating such as any taught herein and appropriate software for processing signals pertaining to detected nucleic acids.

Extraction Control Module

Referring again to FIG. 11, a magnet or electromagnet of 12,000-13,000 Gauss in the extraction module 402 is energized below or above the extraction chamber (chambers 104 shown in FIG. 4) as required. The application of the magnetic field can be controlled for as little as a second to many tens of minutes to enable aggregation and retention of the magnetic beads as desired by the protocol. As described in the extraction protocol, if desired, heat may be used to elute the DNA from the beads. Hence, in addition to the application of magnetic field, the application of heat at about 50-90° C. during PCR amplification for any suitable length of time can be achieved by the hardware system 400, using the same heat module used by the subsequently described PCR amplification module 704.

PCR Control Module

In FIG. 11, the temperature in the PCR amplification module 404 is cycled between about 40-95° C. for PCR-based thermal cycling. This is achieved using a Peltier device or any other suitable heating/cooling device that can be used for PCR amplification. Three thermal cycling temperatures for the desired time interval and repeated cycling enables the process of DNA denaturing (70-100° C.), primer annealing (about 40-80° C.), and an extension temperature (50-90° C.), creating exponential DNA amplification. The designated amplification chamber on the chip 20 is positioned above the Peltier device capable of the temperature cycling.

Figure 12:
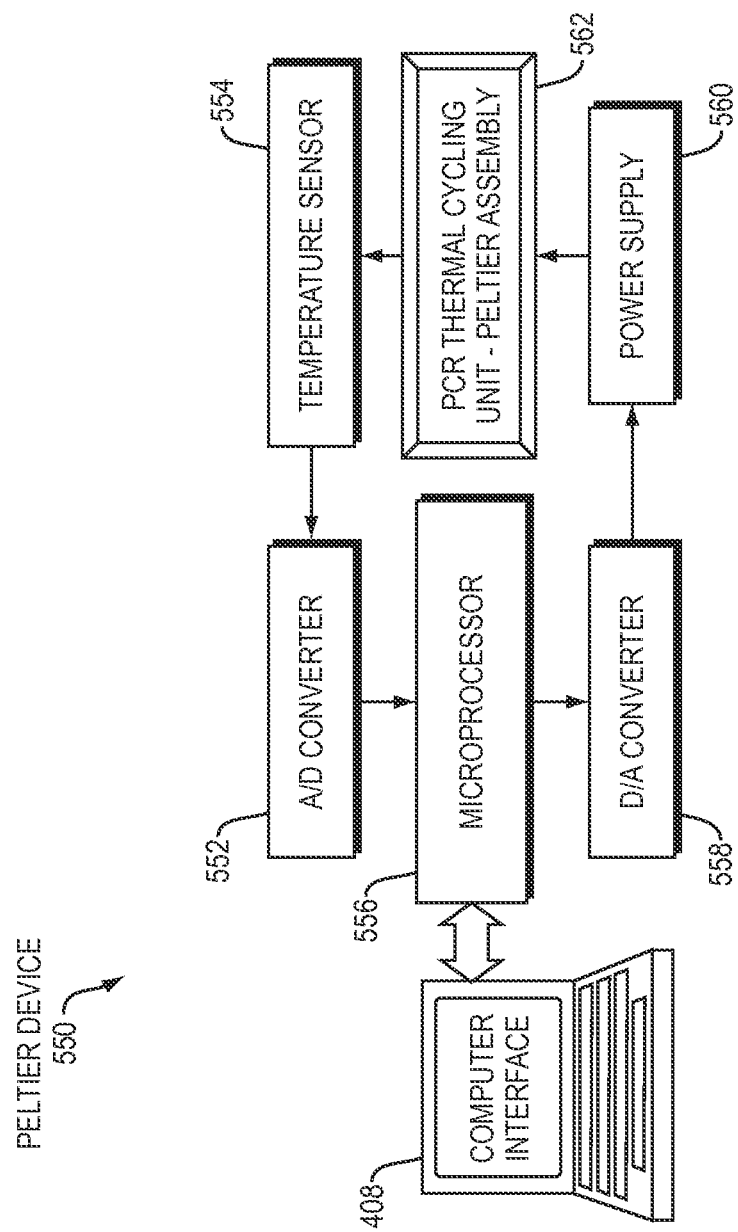
FIG. 12 illustrates a Peltier heating device for use with the hardware module of FIG. 11.

FIG. 12 shows a block diagram of an example embodiment of the Peltier device 550 that is employed by the PCR control module 404 (FIG. 11). The computer interface 408 controls a microprocessor 556 that implements digital proportional/integral/derivative (P/I/D) feedback control over a PCR thermal cycling unit 562. A digital-to-analog (D/A) converter 558 translates a digital value from the microprocessor 556 into an analog voltage or current applied to a power supply 560, which is coupled to the thermal cycling unit 562. Adjusting the analog voltage or current causes the power supply 560 output to change, which, in turn, causes the temperature of the thermal cycling unit 562 to change. Because the chip (not shown) is coupled to the thermal cycling unit 562, changes in the temperature of the thermal cycling unit 562 heat or cool the chip accordingly. A temperature sensor 554 monitors the temperature of the chip and/or the thermal cycling unit 562 and provides an analog signal parameter, such as an analog voltage, to an analog-to-digital (A/D) converter 552. The A/D converter 552 translates the analog signal parameter into a digital value suitable for use by the microprocessor 556.

Detection Control Module

Figure 13:
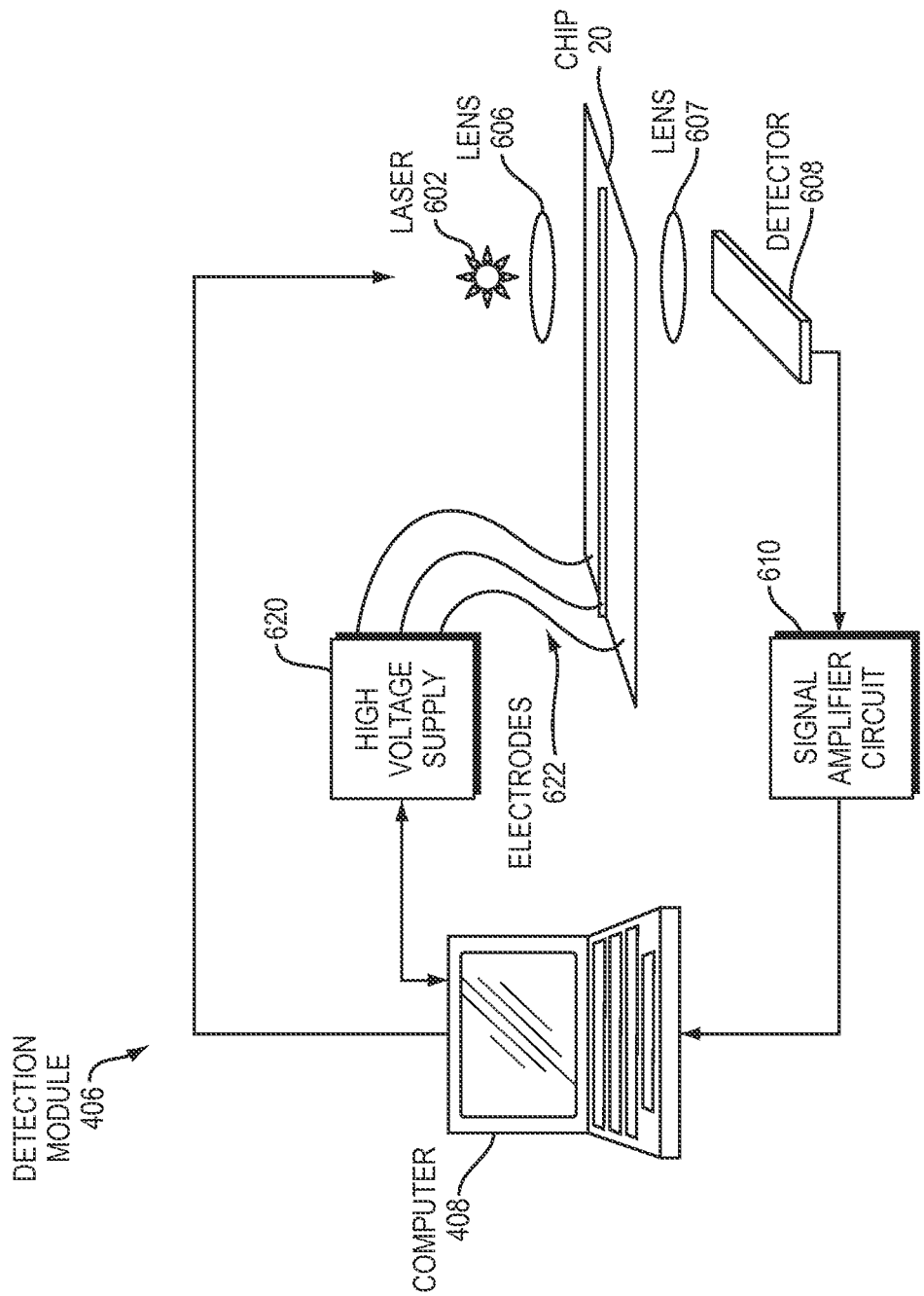
FIG. 13 illustrates a detection system for use with a compact integrated chip.

FIG. 13 shows a block diagram of a detection control module 406 according to embodiments of the present inventive system. For the detection of the amplified DNA, or, in some embodiments, separated proteins, laser-induced fluorescence combined with high voltage electrophoresis is utilized. The detection control module 406 uses a programmable high-voltage supply 620 to impart the necessary voltage signals (400 V to 10 kV) via electrodes 622 along specified channels on the chip 20. A safety feature is incorporated to shut down the high-voltage supply 620 if the enclosure (not shown) housing the electronics and chip is not closed and grounded.

A laser source 602 with the desired wavelength and a suitable filter arrangement (not shown) illuminates a selected portion of the chip 20 via a lens 606. The illumination excites fluorophores attached to the DNA or proteins, causing the fluorophores to emit radiation (not shown) at a wavelength other than the laser wavelength. Filters block the laser light and transmit the emitted radiation, which is collected with a lens 607. The lens 607 focuses the filtered radiation onto a detector 608, such as a photomultiplier tube, avalanche photodiode, charge-coupled device, or other suitable detector. The detector emits a signal, such as a photocurrent, that is amplified (and filtered, if necessary) by a signal amplifier circuit 610. A computer 408 records and processes the amplified signal; the computer 408 may also be used to control the high-voltage supply 620 and laser 602 with a software interface as described below. Those skilled in the art will appreciate that alternative arrangements of optical components may be used to interrogate the fluorescent markers attached to the DNA.

Detailed Construction of Hardware System 400

Figure 14:
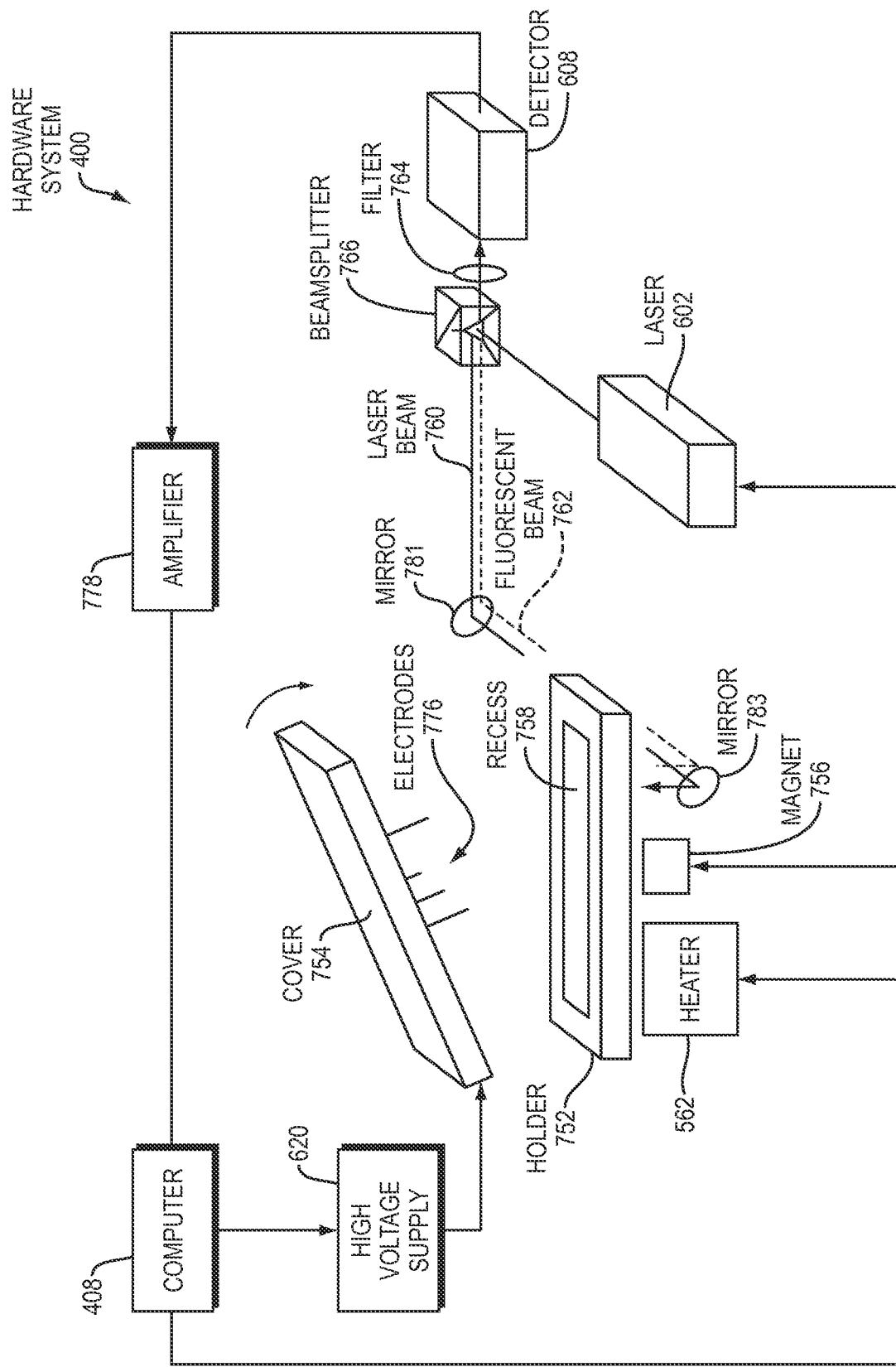
FIG. 14 illustrates a hardware system for use with compact integrated chips in accordance with embodiments of the present invention.

FIG. 14 illustrates a block diagram of the hardware system 400 according to embodiments of the present invention. A holder 752 accommodates a compact integrated chip (not shown), such as chip 20 of FIG. 4, in a recess 758. The chip may be secured in the holder 752 using adjustable clamps or any other suitable holding means. A heater 562 (a Peltier assembly 562 of FIG. 12), and a magnet 756 are situated beneath the holder 752 such that they are next to the appropriate portions of the chip held in the holder 752. In preferred embodiments, the heater 562 and magnet 756 can be moved to accommodate chips of different size or configuration.

A cover 754 can be positioned with a hinge or other suitable mechanism over the chip held in the recess 758 of the holder 752. Positioning the cover 754 over the chip causes electrodes 776 to be inserted into appropriate wells of the chip (e.g., CE wells 114, 116, 118, and 120 of chip 20 in FIG. 4). The electrodes 776, which are coupled to a high-voltage supply 620 controlled by a computer 408, can apply electric fields of varying strengths (e.g., 400-6000 V) across corresponding sections of the chip, such as the CE channels 112 shown in FIGS. 4 and 8A-8C.

The hardware system 400 also includes a detection system similar to the one shown in FIG. 13. A laser 602 produces a laser beam 760 (solid line) that reflects off a beamsplitter 766 and two mirrors 781 and 783 to illuminate the portion of the chip containing fluorescently tagged nucleic acid, such as the detection channels 112 shown in FIGS. 4 and 8A-8C. When illuminated by the laser beam 760, the fluorescent tags emit an fluorescent radiation. A portion of this fluorescent radiation forms a fluorescent beam 762 (dotted line) that propagates along the path of the laser beam 760, but in the opposite direction. A portion of the fluorescent beam 762 propagates through the beamsplitter 766 and through a filter 764 that filters away light at wavelengths other than the fluorescence wavelength. The filtered fluorescent beam 762 illuminates a detector 608 (e.g., a photomultiplier tube, avalanche photodiode, charge-coupled device, linear array, or other suitable detector) that transmits a corresponding signal, such as a photocurrent, to an amplifier 778. The amplifier 778 boosts the signal from the detector 608 and transmits it to the computer 408, which can record, process, and display results associated with fluorescence measurement.

Software Interface

Embodiments of the present invention include a software module configured to control each of the three biological hardware modules (that is, the extraction control module 402, the amplification control module 404, and the detection control module 406 of the hardware system 400, shown in FIG. 11 and described above) independently using a graphical user interface (GUI).

The GUI allows a user to control the extraction module through user input or pre-programmed initiation of the magnetic field. In some embodiment, the magnetic field can be applied discontinuously for specified time intervals, as specified by the protocol described above. The GUI also allows the user to specify the temperature application for specified periods of time.

The GUI allows the user to set user-specified temperatures (typically 3 different temperatures, as specified earlier) and resident time intervals for each temperature. The user can also specify the desired number of thermal cycles, repeating the above input temperatures and time parameters. The GUI enables the user to set microprocessor/computer data acquisition of chip/sample temperature from the hardware setup; the resulting data can be displayed in a real-time temperature versus time graph.

In addition, the GUI gives the user the ability to: (1) choose and energize any pair of electrodes to configure for application of high-voltage signals; (2) specify in sequence the above selection for a given time interval, as desired by the user; (3) obtain feedback monitoring of the applied voltage across any of the energized pair of electrodes and graphically represent this data as a function of time; (4) obtain feedback monitoring of current from any of the energized pair of electrodes and graphically represent this data as a function of time; (5) graphically represent the acquired fluorescence signal as a function of time; and (6) identify/distinguish a fluorescence signal (peak/intensity) from size standard signals. These features can be used to confirm the PCR based amplification to identify the presence (or absence) of a sequence in the DNA.

The hardware system and the computer-readable instructions of the present invention can also facilitate comparison of data obtained by analyzing the biological sample using the integrated chip described herein to a genomic database that stores a plurality of genomic profiles.

Microfluidic Valving

Microfluidic valves and pumps are typically utilized in a chip, such as chip 20 of FIG. 5 (which, in one embodiment, can be chip 20 of FIG. 4) to attain controlled flow and for retention of fluid and vapor within the chip.

For example, and referring to FIG. 4, rubber plugs can be used as valves in some embodiments of the present invention. Such rubber plugs are inserted, for example, into the sample input well 100 and into the reagent inlet/outlet port 106 of the chip 20 during the extraction of nucleic acids to seal off the extraction chamber 104. Similarly, during the PCR amplification, the amplification chamber 108 can be sealed off by inserting rubber plugs into the reagent inlet/outlet port 106 and into the sample well 120.

In other embodiments, various valving systems can be used. Such systems are described elsewhere herein, for example with reference to FIGS. 5, 6A-6B and 7A-7B.

Still other embodiments of the integrated microfluidic chip include a valve technology termed "elastic valves," examples of which are shown in FIGS. 15A and 15B. As shown in FIGS. 15A and 15B, an elastic valve 1100 uses an inflatable elastic encapsulated membrane 1110, similar to a catheter used in medical surgery, to seal fluidic paths within the chip. Fluidic paths include channels 1102 formed between an upper chip substrate 1104 and a lower chip substrate 1106. The inflation or actuation of the membrane 1110 can be achieved with an inlet air tube 1112 connected to the membrane 1110 as shown in FIGS. 15A and 15B (i.e., the membrane 1110 is pneumatically actuated and controlled). When the deflated membrane 1110 is placed in an open port 1108, as shown in FIG. 15A, fluid flow 1114 across the channel 1102 is feasible. However, when the elastic valve is inflated by air 1116, as shown in FIG. 15B, it expands and seals the open port 1108 and hence restricts fluid flow 1114 across the open port 1108 in the channel 1102. In an integrated chip, a series of such valves 1100 can be utilized to achieve flow control as required.

In another configuration of operation, the above-described elastic valves can be embedded in the chip, rather than inserted or operated with an external interface, to achieve higher levels of automation. An example of such a configuration would involve a fabrication process where the elastic membranes are sandwiched between the two layers of the chip along any channel that requires flow control. The inlet air tube that is utilized to actuate the elastic membrane valve is also embedded in the chip and brought to the periphery of the chip for external air pressure line connection. Both the embedded and external valving and pumping systems can effectively be used to valve/pump volumes ranging from nanoliters to many milliliters.

FIGS. 16A-16F show an elastic valve assembly 1200 that includes a series of elastic valves, such as the elastic valves 1100 shown in FIGS. 15A and 15B, configured to enable pumping operations similar to those of a parasitic pump. The valve assembly 1200 includes an open well 1202a loaded with fluid connected to an enclosed chamber 1208 via a channel 1206a. The enclosed chamber 1208 is connected to a second open well 1202b via a second channel 1206b. Elastic membranes 1204a and 1204b control the flow of fluid in channels 1206a and 1206b, respectively, according to the principles described above. A third elastic membrane 1204c disposed in the enclosed chamber 1208 controls whether or not fluid enters and exits the enclosed chamber 1208. Pneumatic inlet tubes 1212a-1212c coupled to the elastic membranes 1204a-1204c, respectively, allow the membranes 1204a-1204c to be inflated and deflated.

As shown in FIG. 16A-16F, fluid can be drawn from the open well 1202a into the enclosed chamber 1208 by sequentially inflating and deflating the three membranes 1204a-1204c. First, fluid is loaded into the open well 1202a, as shown in FIG. 16A. The elastic membranes 1204a-1204c are then inflated in sequence, as shown in FIGS. 16B-16D. Once all three membranes 1204a-1204c are inflated, the membrane 1204a in channel 1206a is deflated, creating suction that draws fluid from the open well 1202a into the channel 1206a. Deflating the membrane 1204c in the enclosed chamber 1208 creates further suction, drawing fluid from the channel 1206a into the enclosed chamber 1208. Fluid can also be unloaded from the enclosed chamber 1208 to any of the open wells 1202a and 1202b by a similar sequential operation of the membranes 1204a-c.

Methods Using the System and Integrated Chip

In an embodiment according to the invention, there is provided a portable system for extracting, amplifying, and detecting nucleic acids using a compact integrated chip in combination with a portable system for analyzing detected signals, and comparing and distributing the results via a wireless network. A portable, chip-based diagnostic device may be used for the rapid and accurate detection of DNA/RNA signatures in biological samples. The portable device may be used as a platform for personalized and mobilized nanomedicine or companion diagnostics and as a tool to improve efficacy, decrease toxicity, and help accelerate clinical trials and regulatory approvals on novel drugs.

In one embodiment, a system may be used in a method for conducting personalized medicine. A portable assay system is used to extract, amplify, and detect nucleic acids in the sample, and in particular to detect personalized biomarkers based on the nucleic acids. The system may then determine an appropriate dosage and/or drug combination for delivery of customized medicine based on the detected personalized biomarkers. In addition, the system may be used to determine if a person is a responder to a drug therapy. The system can also be used to help stratify patients to enhance drug safety and efficacy, and can help optimize dosing and therapeutic regimens. Further, the system may be used for monitoring a person, for example by monitoring levels of a nucleic acid found in biosamples from the person taken at different times. Such monitoring may be used, for example, to track the progress of a treatment in a patient, or for monitoring a disease in the person. For example, diabetes and other chronic diseases may be diagnosed, classified or monitored via DNA/RNA markers, for example such as inflammation markers.

In another embodiment, a portable system according to an embodiment of the invention may be used to assist in making regulatory clinical trials smaller and less costly, by enriching study populations. Personalizing trials with subset genetic populations can dramatically enhance therapeutic effect, and shorten the approval process. The resulting drug and companion diagnostic combination have a premium value for the target genetic population.

In another embodiment, a portable system according to the invention may be used for providing personalized care, for example in the fields of cosmetics, cosmeticeuticals and in skin care applications. For example, a portable assay system may be used to extract, amplify, and detect nucleic acids in the sample; and in particular to detect personalized biomarkers based on the nucleic acids. The system may then determine a type, amount or combination of a personal care product to deliver based on the personalized biomarkers. For example, the system may be used for the selection and delivery of cosmetics based on personalized cosmetic biomarkers. In one example, a skin type is determined based on personalized biomarkers, which may then be used to determine a type, amount or combination of cosmetic products to deliver to a person. A mobile device may be used to measure and quantify, in real time, the presence of key biomarkers (which could, for example, be DNA or RNA based). Sequence biomarkers (e.g., beauty biomarkers such as age related locus, certain aging genes or gene expression patterns, skin quality) can be measured against skin products. A portable system according to an embodiment of the invention can be used to correlate the genotype of individuals with such sequence biomarkers. An integrated chip can be customized to go along with a library of target genes for beauty biometrics. An individual's beauty biometrics can be measured by quantifying the individual's beauty biomarkers in real time via a portable system according to an embodiment of the invention. It can then be seen how these biomarkers change over time with the use of corresponding cosmetic products. Embodiments may also be used for wellness applications, for nutrigenomics, and for ayurvedic genomics, for example performing ayurvedic diagnosis via genes corresponding to the vata, kapha and pitta body type.

In another embodiment, a portable system according to the invention may be used in which the detection capabilities of an integrated chip are coupled with specific, uniquely determined pharmaceutical products. For example, a portable assay system may be used to extract, amplify, and detect nucleic acids in the sample; and in particular to detect personalized biomarkers based on the nucleic acids, where the personalized biomarkers may indicate the presence of a specific strain of a disease or pathogen. The system may then uniquely determine a customized dosage and/or drug combination to deliver based on the specific strain biomarkers. In one example, drug dosages and/or combinations to deliver may be determined for specific strains of human immunodeficiency virus (HIV). A portable system according to the invention may be used for point-of-care detection of HIV strains, HIV viral load determination, and HIV genotyping or as drug monitoring devices or tools to monitor and prevent mother to child transmission of HIV.

In various embodiments, a portable system according to the invention may be used in a variety of different possible industries. For example, a portable assay system may be used to extract, amplify, and detect nucleic acids in the sample. The detected nucleic acids may then be used in any of a variety of different possible industries (in addition to industries discussed elsewhere herein). For example, the detected nucleic acids may relate to food safety, agricultural diseases, veterinary applications, archaeology, forensics, nutrition, neutraceuticals, neutragenomics, water testing/sanitation, food and beverages, environmental monitoring, customs, security, defense, biofuels, sports and wellness; and may be used for theragnosis.

In various embodiments, results provided by a portable system according to the invention may include a viral load (e.g., in copies/ml), a predicted cell count per volume (e.g., a predicted CD4 count in cells/mm$^3$), and a titration of drug dosing.

In further embodiments according to the invention, a portable system according to the invention may communicate with other systems in a variety of different possible ways. The portable system may transmit and receive modulated data signals pertaining to the biological sample, and may communicate via wired media (e.g., a wired network or direct-wired connection) or wireless media (e.g., acoustic, infrared, radio, microwave, spread-spectrum). The portable system may, for example, communicate via the World Wide Web, and/or a mobile network, and/or via text message (such as an SMS message). The portable system may connect to a remote genomic database that stores genomic profiles. The portable system may store, or transmit or receive, a signal profile of a single reference sample.

In further embodiments according to the invention, the portable system or mobile device may be implemented as part of, or interface with, any of a variety of different possible widely available handheld or tablet devices, such as a smartphone, Personal Digital Assistant (PDA), cellular phone, or other handheld or tablet device, employing an optionally disposable compact integrated chip. In addition, similar graphical user interfaces and external design may be used as are used on such widely available handheld or tablet devices. In one example, an embodiment according to the invention may be implemented in, or interface with, or use a similar graphical user interface or external interface to that of an iPhone, iPad, or iPod, all sold by Apple Inc. of Cupertino, Calif., U.S.A., or a Galaxy, sold by Samsung Electronics Co., Ltd. of Suwon, South Korea.

In an embodiment according to the invention, the portable system, or multiple such portable systems at dispersed locations, may be used to track the outbreak of disease at dispersed analysis sites. The portable system may connect through one or more networks (e.g., a Local Area Network, a Wide-Area Network, and/or the Internet); and may engage in a two-way exchange of information between a central data center and the system end-user. The data center can provide known pathogen/disease mapping information to the end-user/invention system for biological sample analysis, and subsequently the invention system/end-user can transmit assay results to the data center. The data center can receive geographic location information and other case identification information from the end-users/invention system. The data center can monitor incoming assay results from the plurality of deployed units/invention systems and employs pattern detection programs, for example to track the outbreak of a disease. The data center can programmatically generate notifications to remote portable systems according to the invention, upon detection of threshold patterns.

Further Uses and Applications of the System and Integrated Chip

In various embodiments, the system of the present invention can be used to identify pathogens, diagnose disorders having a genetic marker, or genotype an individual. The methods of the present invention generally comprise (1) providing at least one integrated chip; (2) loading the at least one biological sample onto the at least one integrated chip; (3) operably connecting a portable control assembly with at least one integrated chip; and (4) activating the portable control assembly to effect extraction, amplification and detection of nucleic acid from the biological sample loaded onto said integrated chip.

The present invention can be used to diagnose and detect a wide variety of pathogens and disorders that have nucleic acid-based genetic material and/or genetic components. In addition to detection of such targets as HIV, HBV, HCV and sexually transmitted diseases, the system and method of the present invention can be used to detect and diagnose molecular diagnostic targets arising in the fields of oncology, cardiovascular, identity testing and prenatal screening.

Preferably, biological sample is derived from a biological fluid, such as but not limited to blood, saliva, semen, urine, amniotic fluid, cerebrospinal fluid, synovial fluid, vitreous fluid, gastric fluid, nasopharyngeal aspirate and/or lymph.

A biological sample can be a tissue sample, a water sample, an air sample, a food sample or a crop sample. Preferably, the biological sample analysis detects any one or more of water-born pathogen, air-born pathogen, food-born pathogen or crop-born pathogen.

The pathogen detectable by the system and method of the present invention can come from a variety of hosts. The host, whether biological or non-biological, should be capable of supporting replication of an infectious agent by allowing the infectious agent to replicate in or on the host. Examples of such hosts include liquid or solid in vitro culture media, cells or tissues of animals, plants or unicellular organisms, whole organisms including mammals such as humans.

The system and methods of the present invention can be employed in one of more of the following areas. In one embodiment, the system and method of the present invention can be employed in the area of defense against biological weapons. For example, the present invention can be used for point-of-incidence and real-time pathogen-detection. In another embodiment, the system and method of the present invention can be employed in the area of life sciences. For example, the present invention can be used as and with a portable analytical instrument. In another embodiment, the system and method of the present invention can be employed in the area of clinical diagnostics. For example, the present invention can be used to diagnose and/or identify pathogens by doctors, nurses or untrained users in hospitals, homes or in the field. The present invention can also be used for genotyping an organism, thereby determining predisposition to genetic diseases, if any, or antibiotic resistance, if any. The present invention can also be used to determine pathogens present in a patient and the sensitivity and resistance profiles of those pathogens to various antibiotics. The present invention can also be used as a drug monitoring device, a prognostic indicator of disease, and a theragnostic device. In another embodiment, the system and method of the present invention can be employed in the area of industrial and agricultural monitoring. For example, the present invention can be used to monitor and/or detect pathogens born by food, crops, livestock, and the like. In another embodiment, the system and method of the present invention can be employed in the area of forensics. For example, the present invention can be used to genetically identify an individual.

In one embodiment, genetic disorders and disorders having a genetic component can be diagnosed by employing the system and method of the present invention. For example, numerous oncogenes have been identified, including p53, implicated in the development of breast, colorectal and other cancers; c-erbB2, associated with breast cancer development and metastasis; and BRCA1, involved in 50% of all inherited breast cancers, and also associated with increased risk for prostate and other cancers. Screening for these genetic markers can be accomplished using the system and methods described herein.

Infectious agents which can be diagnosed using the system and method of the present invention include, but are not limited to, bacteria, viruses, fungi, actinomycetes, and parasites. Examples include, but are not limited to, *Escherichia, Shigella, Salmonella,* Arizona (*Salmonella* subgenus III), *Citrobacter, Klebsiella, Enterogacter, Serratia, Proteus, Providentia, Morganella; Vibrio* and *Campylobacter; Brucella* such as undulant fever; *Yersinia; Pasteurella; Francisella; Actinocacillosis; Haemophilus, Bordetella* (e.g. *Burdetella pertussis*); *Pseudomonas* and *Legionella; Bacteroides, Fusobacterium, Streptobacillus* and *Calymmatobacterium; Bacillus* (spore forming aerobes); *Clostridium* (spore-forming anaerobes); *Lissteria* and *Erysipelothrix; Corynebacterium; Mycobacterium; Spirochetes; Rickettsias; Chlamydia; Mycoplasmas*; Poxviruses; Herpesviruses; Papovaviruses; Adenoviruses; Orthomyxoviruses, Paramyxoviruses; Rhabdoviruses; Cytomegalovirus; Retroviruses; Picornaviruses; Cornaviruses; Rotaviruses; Hepatitis viruses (e.g., hepatitis C virus, hepatitis B virus); Togaviruses; Bunyaviruses; Arenaviruses; *Cryptococcus; Candida* (e.g., *Candida albicans, Candida glabrata, Candida parapsilosis, Candida tropicalis*); *Sporothrux; Ilestoplasma; Coccidioides; Blastomyces; Aspergilli; Zygomycetes; Dematiaceae; Fusarium; Protozoa; Nemathelminthes;* and *Platyhelminthes.*

In other embodiments, retroviruses such as HIV-1, HIV-2, any of HIV-1 Groups M, N, O or P, any of HIV-1 Group M subtypes A-K, or any other known type or subtype of HIV, HTLV-1 and HTLV-2 and herpesviruses such as HSV-1, HSV-2, VZV, EBV, CMV, and HHV-6 can be detected using the system and methods of the present invention.

In other embodiments, the disorders and diseases that can be detected using the system and methods of the present invention include: *Borellia*, human T-cell lymphoma/leukemia virus-I, human T-cell lymphoma/leukemia virus-II, human immunodeficiency virus, influenza virus, parainfluenza virus, adenoviruses, HSV, VZV, HPV (generic, 6, 11, 16, 18, 31, 33), *Moraxella catarrhalis, Streptococcus pneumonia, Haemophilus influenza, Legionella* spp.; human parvovirus B19, Group B *streptococcus.*

In other embodiments, the disorders and diseases that can be detected using the system and methods of the present invention include genetic disorders and disorders for which there is a genetic predisposition. Example include, but are not limited to, Cystic fibrosis, Gaucher disease, Medium chain acyl dehydrogenase deficiency, Myotonic dystrophy, Sodium channelopathies, Chloride channelopathies, Duchenne/Becker muscular dystrophy.

In certain embodiments, the following pathogens can be diagnosed: a Human Immunodeficiency Virus, a TB bacterium, Hepatitis C Virus, SARS virus, *Chlamydia trachomatis, Cytomegalovirus, Gardnerella vaginalis,* Group A *Streptococcus*, Group B *Streptococcus*, Human Papilloma Virus, *Neisseria gonorrhoeae, Trichomonas vaginalis, Bordetella pertussis,* and *E. coli.*

In one embodiment, the infectious agent being detected is methicillin-resistant *S. aureus* (MRSA). *Staphylococcus aureus* represents one of the most significant pathogens causing nosocomial and community-acquired infections. Beta-lactam antibiotics are the preferred drugs for serious *S. aureus* infections. Since the introduction of methicillin into clinical use in 1961, the occurrence of methicillin-resistant *S. aureus* (MRSA) strains has increased steadily, and nosocomial infections have become a serious problem worldwide. Therefore, the detection of methicillin resistance has important implications for therapy and management of patients. In the clinical laboratory, *S. aureus* is identified by growth characteristics and the subsequent detection of catalase and coagulase activities or specific surface constituents. The DNase and thermostable endonuclease tests have been used as confirmatory tests for inconclusive or negative coagulase tests. Conventional susceptibility testing of *S. aureus* reliably detects resistance to methicillin or oxacillin if agar dilution or agar screening methods are used according to NCCLS standards. Methicillin resistance is associated with the production of a penicillin-binding protein, encoded by the mecA gene, or, in rare cases, with the hyperproduction of beta-lactamase.

Conventional methods of detecting MRSA employ broth- and agar-based antimicrobial susceptibility testing and provide a phenotypic profile of the response of a given microbe to an array of agents. These methods are slow and fraught with problems, such as false positives and false-negatives are common. These failings are due to the expression of the resistance genes in staphylococci, which may be expressed in a very heterogeneous fashion, making phenotypic characterization of resistance difficult. Molecular methods, targeting detection of the resistance gene, mec A, may be used. Screening for mutations in an amplified product may be facilitated by the use of high-density probe arrays such as the Affimetrix® Genechips™ that can be employed in the practice of the present invention.

Similarly detecting drug-resistance by detecting specific antimicrobial-drug resistance genes (resistance genotyping) can be accomplished in many organisms. Examples are listed in the following Table 1:

TABLE 1

Molecular methods for detecting antimicrobial resistance

| Organism(s) | Antimicrobial agent(s) | Gene |
|---|---|---|
| Staphylococci | Methicillin Oxacillin | mec A |
| Enterococci | Vancomycin | van A, B, C, D |
| Enterobacteriaceae Haemophilus influenzae Neisseria gonorrhoeae | Beta-lactams | $bla_{TEM}$ and $bla_{SHV}$ |
| Enterobacteriaceae and gram-positive cocci | Quinolones | Point mutations in gyr A, gyr B, par C and par E |
| Mycobacterium tuberuclosis | Rifampin Isoniazid Ethambutol Streptomycin | Point mutations in rpo B Point mutations in kat G, inh A, and ahp C Point mutations in emb B Point mutations in rps L and rrs |
| Herpes viruses | Acyclovir and related drugs Foscarnet | Mutations or deletions in the TK gene Point mutations in DNA polymerase gene |
| HIV | Nucleoside reverse transcriptase inhibitors Protease inhibitors | Point mutations in RT gene Point mutations in PROT gene |

In other embodiments, the viral and microbial diseases that can be detected by employing the system and method of the present invention are those listed in Table 2:

TABLE 2

Clinically important viral and bacterial pathogens that can be tested by a nucleic acid-based tests

| Organism | Specimen type | Clinical indication |
|---|---|---|
| Epstein-Barr virus (EBV) | Cerebrospinal fluid (CSF) | EBV lymphoproliferative disorder |
| Herpes simplex virus (HSV) types 1 and 2 | CSF Vitreous humor | Encephalitis |
| Varicella-zoster virus (VZV) | Various tissues | VZV reactivation |
| JC virus | CSF | Progressive multifocal leukoencephalopathy |
| Enterovirus | CSF | Aseptic meningitis |
| Parvovirus B19 | Amniotic fluid Serum | Hydrops fetalis Anemia |
| Adenovirus | Urine Tissues Blood | Immunocompromised patients, transplant recipients |
| Ehrlichia | Blood | Human granulocytic and monocytic ehrlichiosis |
| Bordetella pertussis | Nasopharyngeal aspirate | Whooping cough |
| Legionella pneumophila | Respiratory | Atypical pneumonia |
| Chlamydia pneumoniae | Respiratory | Atypical pneumonia |
| Mycoplasma pneumoniae | Respiratory | Atypical pneumonia |
| Helicobacter pylori | Gastric fluid Stool | Peptic ulcer disease |

In further embodiments, the infectious diseases listed in Table 3 can be tested by employing the system and method of the present invention:

TABLE 3

Infectious Diseases that can be tested by nucleic acid-based tests

Chlamydia trachomatis detection
Neisseria gonorrhoeae detection
C. trachomatis/N. gonorrhoeae screening/detection
Mycobacterium tuberculosis detection
HPV screening
CMV TABLE 3-continued Infectious Diseases that can be tested by nucleic acid-based tests Grp A strep detection
HIV quantitation
Gardnerella, T vaginalis, and Candida
Culture confirmation for bacteria and fungi Multi-Sector, Across Industry Use Given the above features and advantages of the present invention, many advances in health care (and other industries), especially across multiple sectors, are enabled. The sectors in the healthcare industry include:

the governmental sector (e.g., Centers for Disease Control, military operations, Department of Agriculture, etc.), the commercial sector (e.g., hospitals/medical institutions, analytic/diagnostic laboratories, pharmaceutical entities, etc.), and the private sector (e.g., physicians, farmers/ranchers, individuals).

In an example embodiment, laboratories or pharmaceutical companies serve as distribution points of a variety of prepared integrated chips described above. Different chips are prepared for analyzing different pathogens and diseases. End-users of the chips are from the various sectors and deploy the portable assay system (described above) at respective locations and environments including in-home patient use, in the field (e.g., crops and veterinary check points), at remote/rural locations as well as at hospitals/medical centers, ports of entry and the like. Due to the plug and play configuration (i.e., quick reader turnaround, chip assay variety and chip disposability) between the invention integrated chips and portable assay system, a given portable assay system/device of the present invention may read a variety of different chips (for detecting different pathogens/diseases) at a site or may be dedicated to reading one type of chip (for detecting a certain pathogen/disease).

During use of the portable assay system, there is a two-way exchange of information between a central data center (where working data libraries and bioinformatics data reside or are maintained) and the system end-user. In this two way exchange, the data center provides known pathogen/disease mapping information to the end-user/invention system for biological sample analysis, and subsequently the invention system/end-user transmits assay results to the data center. In addition to the assay results, the data center may receive geographic location information and other case identification information from the end-users/invention system. The data center monitors incoming assay results from the plurality of deployed units/invention systems and employs pattern detection programs (common in the art). For example, a pattern in the number of cases of a given disease in a concentrated geographical area may be detected, or a pattern of movement (spreading) of a given disease may be detected based on the data received from the plural end-users. Other pattern detection and monitoring for certain conditions or occurrences of pathogens/diseases (e.g., in water supplies, food crops, blood banks, etc.) is contemplated.

In turn, the data center may be configured to programmatically generate notifications upon detection of threshold patterns. The data center may notify medical personnel (ambulance, emergency room, physician), military units, governmental agencies and so on. Such notification may be on a subscription basis where receiving parties pay a subscription to participate in the data center alerts and notifications. Different subscription levels may exists where parties/users pay at one level to have access rights to the data libraries and at another level to have access to the collected assay results data. Another subscription level may provide the automated alerts and notifications to a subscriber using subscriber supplied contact information (where and in what media/form to send the alerts).

As used herein, the notifications and alerts may be in the form of email, phone call, alarm or other audible and/or visual indication.

In addition, the data center may be configured to further respond to the end user after receiving and processing assay results from the end-user. With the given assay results, the data center cross references other known related information such as genotype, effective therapy/treatment, and so forth. The data center transmits this additional information to the end-user for on-site use.

Accordingly the present invention provides enhanced methods of medical care and treatment, disease control, bio-defense (point of incidence and real-time pathogen detection, as well as real-time tracking of infection and contagion), and other multi-sector, across industry use.

EXEMPLIFICATION

A DNA Purification Procedure

The following example is described with reference to an integrated chip as shown in FIG. 4 and a fluorescence detection module as shown in FIG. 9B.

A user injects a biological sample, magnetic beads and lysis buffer into nucleic acid extraction chambers 104 through sample inlet ports 100, then loads the integrated chip 20 into the portable assay system (10, FIG. 1). The system incubates the biological sample for 7 minutes, during which time lysis occurs and the DNA in the sample binds to the magnetic beads. The system then engages a magnet, which causes the magnetic beads (and the attached DNA) to cluster in the region of the field. The beads are washed for two to three minutes with a washing buffer that the user injects into the extraction chambers 104 via the sample inlet ports 100. The magnet is disengaged during the wash. The user repeats this cycle once before injecting DNA/RNA-free water through sample inlet ports 100. Next, the user disengages the magnet, heats the fluid in the nucleic acid extraction chamber at 70° C. for 8-10 minutes, thus freeing the DNA. The magnet is engaged to immobilized the beads, the reagent addition port 106 is sealed with a passive plug, and a syringe is used to force the extracted DNA into the nucleic acid amplification chambers 108.

The user seals the amplification chambers 108, preferably using passive plug valves inserted into reagent addition ports 106 and sample wells 120. Once the chamber is sealed, the extracted DNA mixes with a PCR master mix before a Peltier cooler cycles the temperature between 50° C. and 97° C. up to 35 times to amplify the extracted DNA. Once amplification is complete, the user unseals the amplification chamber, then propels the amplified nucleic acid to the detection module using a hand-pumped syringe coupled to the integrated chip through reagent addition ports 106.

The user loads polymer gel/sieving matrix and the CE running buffer into the eight detection channels 112 through buffer well 116. Next, molecular weight standards are loaded into sample wells 120. Next, the user applies 400 V across electrodes situated on or near the sample well 120 and the sample waste wells 118 to draw the amplified nucleic acid into the detection channels 112. Once a sufficient amount of the amplified nucleic acid enters the detection channel, the user switches off the 400 V field, then applies a 6 kV field from the buffer waste well to the buffer well. This causes the molecular weight standard to separate along the detection channels 112, providing reference times. After optionally flushing the detection channels 112, the user repeats the process using the amplified nucleic acids loaded forced into sample wells 120 by syringe pressure applied to the nucleic acid amplification chambers 108. This causes the amplified nucleic acids to separate into species and migrate down the detection channels 112.

As they migrate, the molecular weight standards or the amplified nucleic acid species pass through a measurement region 1005, where they are interrogated under the control of the detection control module 60 configured to detect fluorescence signals as shown in FIG. 9B. As the species 140 migrate through the measurement region 1005, they are illuminated by a laser beam 1004 of an appropriate wavelength, causing the species 140 to emit a fluorescent beam 1010 of a different wavelength. The fluorescent beam 1010 and the laser beam 1004 propagate out of the measurement region 1005 to a dichroic beamsplitter 1007 that reflects the laser beam 1004 and transmits the fluorescent beam 1010. A beam block 1008 absorbs the laser beam 1004, and a detector 1012 senses the fluorescent beam 1010. The detector 1012 emits a photocurrent (not shown) in proportion to the intensity of the fluorescent beam 1010. A processor 1014 detects, records, and processes the detected photocurrent as a function of time.

The detected, processed signal is matched against the signal from a known reference analyzed under identical conditions to identify pathogens in the sample. The system represents this identification process with an output signal graph 1020. Analyzing the known reference yields a reference signal trace 1021 with peaks corresponding to known pathogens in known amounts. Comparing the time ordinate of a signal peak 1022 from the unknown sample to the reference signal trace 1021 gives the user an indication of the pathogen type; the system determines the viral load by calculating the area under the signal peak 1022.

Cell Cultures

To demonstrate the performance of the integrated chip, E. coli cells were used for experimental testing. E. coli cells (DH-10B, Invitrogen) were cultured overnight in 5 mL tubes in LB media (Invitrogen) at about 37° C. on a shaker at 200 rpm. The stock culture was then either used directly for experiments or diluted (in RNAse free water) to obtain the desired cell dilution/concentration. The cultured cell concentration was obtained by measuring the culture in a spectrophotometer (Ultraspec 10, Amersham Biosciences, UK). Details of the E. coli type are as follows: E. coli, DH10B cells (ElectroMAX™ DH10B™, cat #: 12033-015, Invitrogen, US); Genotype: F-mcrA Δ(mrr-hsdRMS-mcrBC) φ80lacZ ΔM15 ΔlacX74 recA1 endA1 araD139 Δ(ara, leu)7697 galU galK λ-rpsL nupG tonA; Approximate size of the entire genomic DNA is about $4.6 \times 10^6$ bp.

Using these cells, experiments were performed on-chip. Two sets of experiments are presented below. In the first set, stock culture (from 0.2-2 μL) was used directly for chip experiments. In the second set of experiments, 1 μL of stock culture was serially diluted to up to infinite dilution. In each of these experiments, measurements were made during the course of the biological assay, both for the cells and DNA concentration, hence enabling quantified data for analysis. Cells were quantified as described earlier, while DNA concentration was performed on the Nanovue® (GE Health Sciences) spectrophotometer. However, due to the detection limits of both the utilized spectrophotometers, quantification of low concentration samples was challenging until the completion of the biological assay involving PCR-based amplification which enabled DNA amplification that was easily quantifiable. The following experiments were performed on the integrated chip using the protocols outlined above.

Identification of a Pathogen Using Stock Cell Culture

FIGS. 17A through 17D and FIG. 18 show results from the first set of experiments, in which varying amounts of stock culture along with magnetic bead solution (i.e., the lysis solution and streptavidin-coated Dynal® magnetic bead suspension) were loaded into the extraction chamber of the chip. The cell count (cfu) input to the chip was derived from the measured stock concentration. Following cell lysis and DNA capture by the beads, as described in the protocol earlier, the DNA was re-suspended in 2 μL of water (RNAse free). The concentration of the extracted DNA was then measured and the PCR master mix (assay defined earlier) was then added.

PCR was then performed in the PCR chamber on-chip.

Figure 17A:
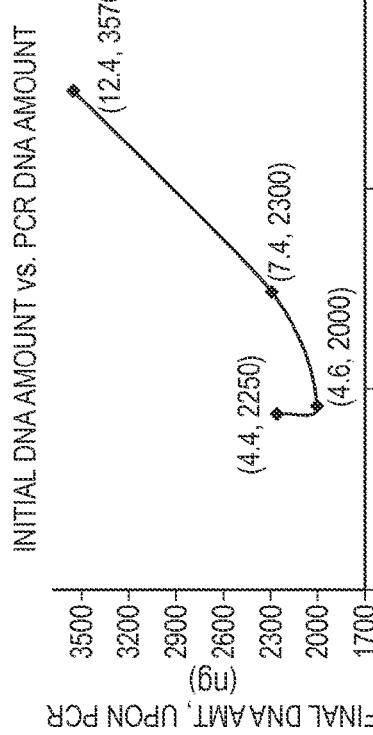
FIGS. 17A, 17B, 17C, and 17D show the results of the on-chip DNA purification and amplification.
Figure 17B:
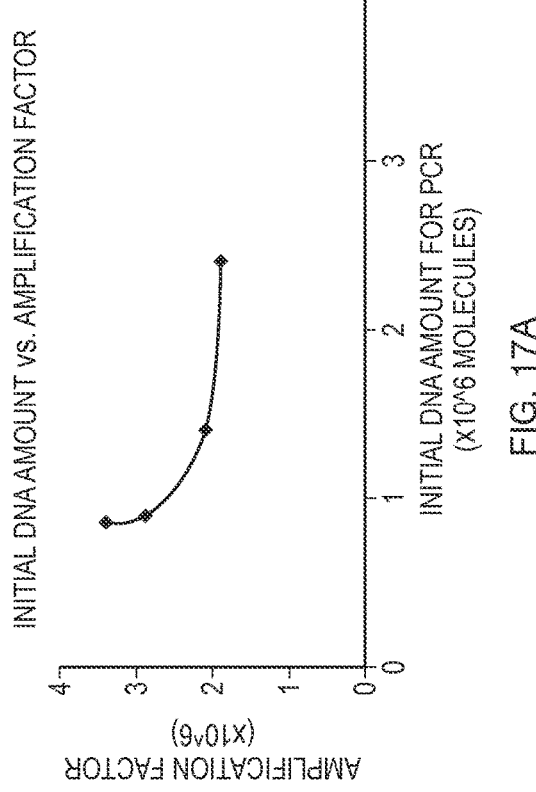
Figure 17C:
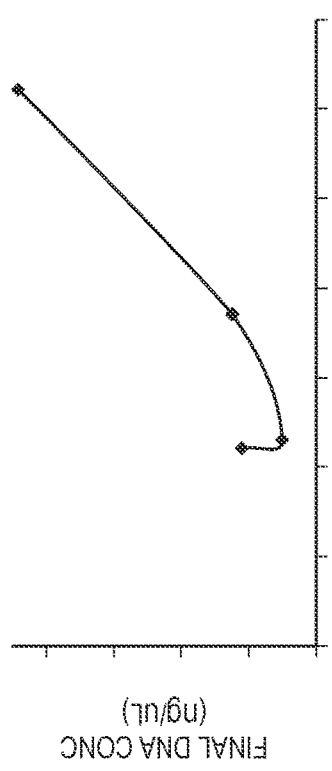
Figure 17D:
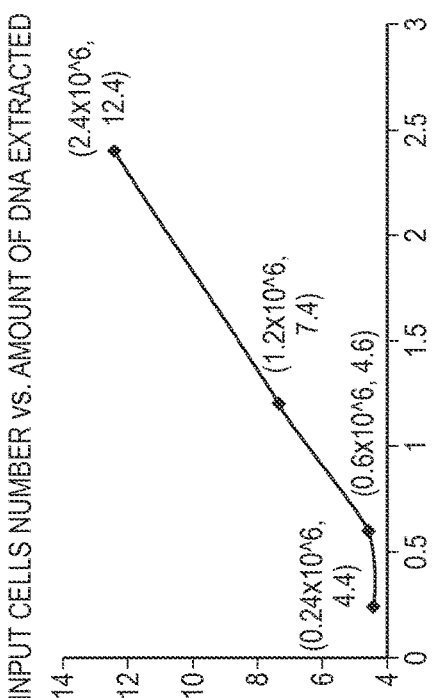

Finally, upon completion of PCR, the DNA concentration was again measured and the molecular count and amplification factors were derived. FIGS. 17A, 17B, 17C, and 17D show the results of the on-chip DNA purification and amplification. The plots show: FIG. 17A—the amplification factor as a function the initial DNA amount, FIG. 17B—the final DNA amount as a function of the initial DNA amount, FIG. 17C the final DNA concentration as a function of the initial DNA concentration, and FIG. 17D—the amount of the extracted DNA as a function of the input cell count are shown.

Figure 18:
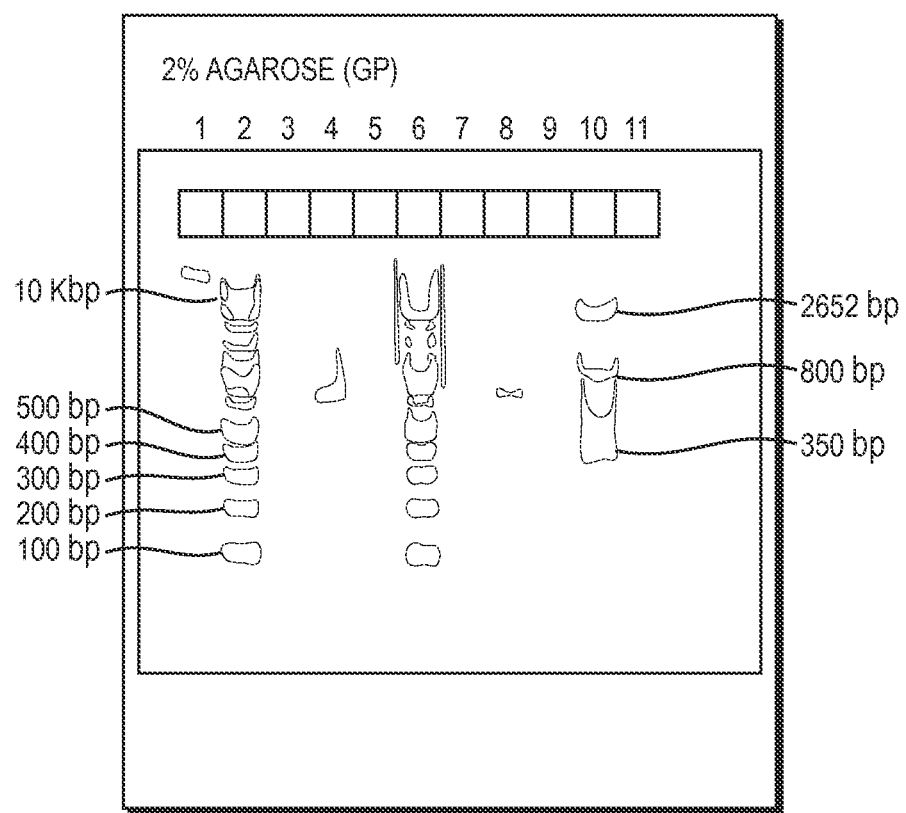
FIG. 18 is a depiction of an agarose gel-based electrophoresis verifying of the size of the resulting PCR product.

Conventional gel based electrophoresis enabled verification of the size of the resulting PCR product to be about 700 bp, as shown in FIG. 18 and expected from the initial primer design. The results presented in FIG. 18 are as follows:
lane 2: DNA ladder;
lane 4: positive control for DH10B cells PCR (about 700 bp);
lane 5: negative control for DH10B cells PCR;
lane 6: DNA ladder;
lane 8: positive control for DH cells PCR (about 700 bp);
lane 9: negative control for DH10B cells PCR; Lane 10: 50 bp ladder.

Identification of a Pathogen Using Dilution of Cell Culture

FIGS. 19A through 19D and FIG. 20 show results form the second set of experiments, in which 1 μL of stock culture solution was serially diluted with 9 μL of water to achieve the derived cell dilutions of up to less than a cell. Since the chip-based approach can only accommodate very low volumes (typically a few microliters), the culture dilutions were then spun-down to ensure utilizing all of the cells in the dilutions. These spun-down cell pellets were then added to 10 μL of Dynal® magnetic beads solution and an extraction process similar to that of the first set of experiments was performed.

As performed earlier, the extracted DNA was re-suspended in 2 μL of water, followed by the addition of about 8 μL of PCR master mix. PCR amplification was then performed on-chip.

DNA concentrations were measured prior and upon PCR amplification. The data was then used to derive the DNA concentration and amplification factor for each culture dilution sample used. FIGS. 19A, 19B, 19C, and 19D show the results of the on-chip DNA purification and amplification. The plots show: FIG. 19A—the measured number of DNA molecules as a function the input cell number, FIG. 19B—the final number of the DNA molecules upon PCR as a function of the initial number of the DNA molecules, prior to PCR, FIG. 19C—the amplification factor as a function of the measured initial number of the DNA molecules, and FIG. 19D—the Amplification factor as a function of the theoretical initial number of the DNA molecules are shown.

Figure 20:
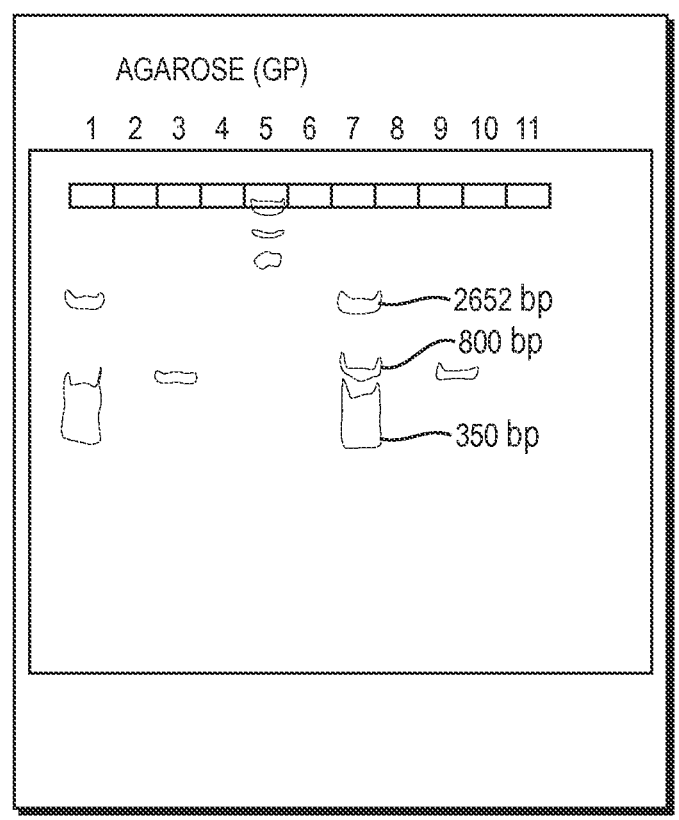
FIG. 20 is a depiction of an agarose gel-based electrophoresis verifying of the size of the resulting PCR product.

Conventional lab based gel electrophoresis was utilized to verify the size of the resulting PCR product as about 700 bp, as shown in FIG. 20. The results presented in FIG. 20 are as follows:
lane 1: DNA ladder;
lane 3: positive control for DH10B cells PCR (about 700 bp);
lane 5: negative control for DH10B cells PCR;
lane 7: DNA ladder;
lane 9: positive control for DH10B cells PCR (about 700 bp).

Results

As evident from either of the above PCR experiments, there is a drop in efficiency (i.e. implied from the amplification factor), as the concentration of initial sample increases. In an ideal assay where theoretical limitations factors are negligible, an exponential amplification should be expected. However, given the limitations with factors such as (1) loss of enzyme efficiency after repeated PCR thermal cycling, (2) lack of sufficient dNTPs and primer set, (3) adsorption factor (adversely enhanced by surface-to-volume ratios on-chip) inhibiting or causing poor retrieval of amplified DNA, the theoretical level of amplification may be difficult to achieve.

Nevertheless, as noted in the second set of experiments, a detectable amplification with as few as about twelve starting cells in an uncontaminated input sample is achieved.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A system for analysis of a sample, comprising:
   a fluidic chip configured to perform a cycle of operations comprising:
   a) extracting a biological material from the sample in an extraction control module;
   b) generating one or more products from the biological material in an amplification control module; and
   c) detecting the one or more products in a detection control module; and
   a device configured to interface with the fluidic chip and comprising a processor configured to activate one or more of the control modules during a cycle of operations a)-c),
   wherein the control modules are configured to exert nanoscale control during the cycle of operations a)-c); and
   wherein the nanoscale control comprises at least one of: applying a stress to a molecular species; adjusting a rotational orientation of a molecular species; adjusting a translational position of a molecular species; and applying a tension to a molecular species.

2. The system of claim 1, wherein the processor is configured to determine a pathogenic load in the sample based on the detected one or more products.

3. The system of claim 1, wherein the fluidic chip comprises:
   a port for loading the sample onto the chip, wherein the extraction module is in fluid communication with the port; and
   a fluid pressure generator.

4. The system of claim 1, wherein the biological material comprises at least one of a nucleic acid and a protein.

5. The system of claim 1, wherein the amplification module is configured to perform isothermal amplification of the biological material to generate the one or more products.

6. The system of claim 1, wherein the processor is configured to receive a feedback signal from the extraction control module, and to adjust the nanoscale control exerted by the extraction control module based on the feedback signal.

7. The system of claim 1, wherein the processor is configured to receive a feedback signal from the detection control module, and to adjust the nanoscale control exerted by the detection control module based on the feedback signal.

8. The system of claim 1, wherein the extraction control module is configured to extract the biological material from the sample by at least one of: chemically extracting the biological material, ultrasonically disrupting the sample to extract the biological material, mechanically disrupting the sample to extract the biological material, thermally disrupting the sample to extract the biological material, performing electroporation on the sample, exposing the sample to silica beads, and exposing the sample to magnetic beads that bind the biological material.

9. The system of claim 1, wherein the biological material comprises a nucleic acid, and wherein the amplification control module is configured to generate the one or more products by amplifying the nucleic acid.

10. The system of claim 9, wherein the amplification control module is configured to perform isothermal amplification of the nucleic acid.

11. The system of claim 10, wherein the amplification control module is configured to perform at least one of: a loop mediated isothermal amplification of the nucleic acid; a helicase-dependent amplification of the nucleic acid; a strand displacement amplification of the nucleic acid; a bridge amplification of the nucleic acid; and a rolling circle amplification of the nucleic acid.

12. The system of claim 1, wherein the detection control module is configured to detect the one or more products by at least one of: measuring an optical signal corresponding to the one or more products, measuring fluorescence emission from the one or more products, determining at least a portion of a sequence of the one or more products, performing capillary electrophoresis separation of the one or more products, performing agarose gel electrophoresis separation of the one or more products, performing capillary electrophoresis separation of the one or more products, performing polyacrylamide gel electrophoresis separation of the one or more products, and antibody labeling of the one or more products.

13. The system of claim 1, wherein the processor is configured to selectively direct the biological material to the amplification control module or the detection control module from the extraction control module.

14. The system of claim 1, wherein the extraction control module comprises a fluid conduit and a fluid-pressure-generating device connected to the fluid conduit and configured to drive a fluid flow through the fluid conduit to apply a shearing force to the sample.

15. The system of claim 1, wherein the extraction control module comprises an adjustable magnetic element, and wherein the processor is configured to adjust a magnetic field generated by the magnetic element to retain magnetic particles within the fluidic chip.

16. The system of claim 1, wherein the biological material comprises a nucleic acid, and wherein the amplification control module is configured to generate the one or more products by performing a thermally cycled amplification of the nucleic acid.

17. The system of claim 1, wherein at least one of the extraction control module, the amplification control module, and the detection control module comprises a control mechanism to exert the nanoscale control, and wherein the control mechanism comprises an electromagnetic field source configured to generate an electromagnetic field to apply tension to the molecular species.

18. The system of claim 17, wherein at least one of the extraction control module, the amplification control module, and the detection control module comprises a control mechanism to exert the nanoscale control, and wherein the control mechanism comprises a member comprising a surface that binds the molecular species.

19. The system of claim 1, wherein at least one of the extraction control module, the amplification control module, and the detection control module comprises a control mechanism to exert the nanoscale control, and wherein the control mechanism comprises a fluidic apparatus comprising one or more fluid conduits positioned to guide a flowing fluid, and thereby to adjust the at least one of the stress applied to the molecular species, the rotational orientation of the molecular species, the translational position of the molecular species, and the tension applied to the molecular species.

20. The system of claim 19, wherein the control mechanism comprises a member comprising a surface that binds the molecular species.

21. The system of claim 19, wherein the one or more fluid conduits are dimensioned to hydrodynamically focus the flowing fluid to adjust the at least one of the stress applied to the molecular species, the rotational orientation of the molecular species, the translational position of the molecular species, and the tension applied to the molecular species.

22. The system of claim 1, wherein:
the molecular species comprises the biological material; and
at least one of the extraction control module and the amplification module is configured to adjust at least one of the stress applied to individual molecules of the biological material, the rotational orientation of individual molecules of the biological material, the translational position of individual molecules of the biological material, and the tension applied to individual molecules of the biological material.

23. The system of claim 1, wherein:
the molecular species comprises the one or more products;
at least one of the amplification control module and the detection control module is configured to adjust at least one of the stress applied to individual molecules of the one or more products, the rotational orientation of individual molecules of the one or more products, the translational position of individual molecules of the one or more products, and the tension applied to individual molecules of the one or more products.

24. The system of claim 1, wherein:
the molecular species comprises an intermediate species generated in the amplification control module; and
the amplification control module is configured to adjust at least one of the stress applied to individual molecules of the intermediate species, the rotational orientation of individual molecules of the intermediate species, the translational position of individual molecules of the intermediate species, and the tension applied to individual molecules of the intermediate species.

25. The system of claim 1, wherein at least one of the extraction control module, the amplification control module, and the detection control module is configured to exert the nanoscale control by controlling a flow of fluid in the chip.

26. The system of claim 1, wherein chip comprises at least one fluidic channel, and wherein the at least one of the extraction control module, the amplification control module, and the detection control module is configured to control a flow of fluid through the at least one fluidic channel to exert the nanoscale control.

27. The system of claim 1, wherein at least one of the extraction control module, the amplification control module, and the detection control module is configured to exert the nanoscale control by applying at least one of a mechanical tension, a hydrodynamic tension, and an electromagnetic tension to the molecular species.

28. A system for analysis of a sample, comprising:
a fluidic chip configured to perform a cycle of operations comprising:
a) extracting a biological material from the sample in an extraction control module;
b) generating one or more products from the biological material in an amplification module; and
c) detecting the one or more products in a detection control module; and
a device configured to interface with the fluidic chip and comprising a processor configured to activate one or more of the control modules during a cycle of operations a)-c),
wherein the extraction control module is configured to exert nanoscale control during the extraction of the biological material to control at least one at least one of a stress applied to molecules of the biological material, a rotational orientation of molecules of the biological material, a translational position of molecules of the biological material, and a tension applied to molecules of the biological material.

29. The system of claim 28, wherein the detection control module is configured to control, during the detection of the one or more products, at least one of a stress applied to molecules of the one or more products, a rotational orientation of molecules of the one or more products, a translational position of molecules of the one or more products, and a tension applied to molecules of the one or more products.

30. The system of claim 29, wherein the processor is configured to receive a feedback signal from the detection control module, and to adjust the detection control module based on the feedback signal.

31. The system of claim 29, wherein the detection control module is configured to detect the one or more products by at least one of: measuring an optical signal corresponding to the one or more products, measuring fluorescence emission from the one or more products, determining at least a portion of a sequence of the one or more products, performing capillary electrophoresis separation of the one or more products, performing agarose gel electrophoresis separation of the one or more products, performing capillary electrophoresis separation of the one or more products, performing polyacrylamide gel electrophoresis separation of the one or more products, and antibody labeling of the one or more products.

32. The system of claim 29, wherein the detection control module comprises a control mechanism, and wherein the control mechanism comprises an electromagnetic field source configured to generate an electromagnetic field to control at least one of the tension and the stress applied to molecules of the one or more products.

33. The system of claim 29, wherein the detection control module comprises a fluidic apparatus comprising one or more fluid conduits positioned to guide a flowing fluid, and thereby to control the at least one of the stress applied to molecules of the one or more products, the rotational orientation of molecules of the one or more products, the translational position of molecules of the one or more products, and the tension applied to molecules of the one or more products.

34. The system of claim 33, wherein the detection control module comprises a member comprising a surface that binds the molecules of the one or more products.

35. The system of claim 33, wherein the one or more fluid conduits are dimensioned to hydrodynamically focus the flowing fluid to control the at least one of the stress applied to molecules of the one or more products, the rotational orientation of molecules of the one or more products, the translational position of molecules of the one or more products, and the tension applied to molecules of the one or more products.

36. The system of claim 29, wherein the detection control module is configure to control the at least one of the stress applied to molecules of the one or more products, the rotational orientation of molecules of the one or more products, the translational position of molecules of the one or more products, and the tension applied to molecules of the one or more products, by controlling a flow of fluid in the chip.

37. The system of claim 29, wherein the chip comprises at least one fluidic channel, and wherein the detection control module is configured to control a flow of fluid through the at least one fluidic channel to control the at least one of the stress applied to molecules of the one or more products, the rotational orientation of molecules of the one or more products, the translational position of molecules of the one or more products, and the tension applied to molecules of the one or more products.

38. The system of claim 29, wherein the detection control module is configured to apply at least one of a mechanical tension, a hydrodynamic tension, and an electromagnetic tension to molecules of the one or more products.

39. The system of claim 28, wherein the processor is configured to determine a pathogenic load in the sample based on the detected one or more products.

40. The system of claim 28, wherein the biological material comprises at least one of a nucleic acid and a protein.

41. The system of claim 28, wherein the processor is configured to receive a feedback signal from the extraction control module, and to adjust the extraction control module based on the feedback signal.

42. The system of claim 28, wherein the extraction control module is configured to extract the biological material from the sample by at least one of: chemically extracting the biological material, ultrasonically disrupting the sample to extract the biological material, mechanically disrupting the sample to extract the biological material, thermally disrupting the sample to extract the biological material, performing electroporation on the sample, exposing the sample to silica beads, and exposing the sample to magnetic beads that bind the biological material.

43. The system of claim 28, wherein the processor is configured to selectively direct the biological material to the amplification control module or the detection control module from the extraction control module.

44. The system of claim 28, wherein the extraction control module comprises a control mechanism, and wherein the control mechanism comprises an electromagnetic field source configured to generate an electromagnetic field to control at least one of the tension and the stress applied to molecules of the biological material.

45. The system of claim 28, wherein the extraction control module comprises a fluidic apparatus comprising one or more fluid conduits positioned to guide a flowing fluid, and thereby to control the at least one of the stress applied to molecules of the biological material, the rotational orientation of molecules of the biological material, the translational position of molecules of the biological material, and the tension applied to molecules of the biological material.

46. The system of claim 45, wherein the extraction control module comprises a member comprising a surface that binds the molecules of the biological material.

47. The system of claim 45, wherein the one or more fluid conduits are dimensioned to hydrodynamically focus the flowing fluid to control the at least one of the stress applied to molecules of the biological material, the rotational orientation of molecules of the biological material, the translational position of molecules of the biological material, and the tension applied to molecules of the biological material.

48. The system of claim 28, wherein the extraction control module is configured to control the at least one of the stress applied to molecules of the biological material, the rotational orientation of molecules of the biological material, the translational position of molecules of the biological material, and the tension applied to molecules of the biological material, by controlling a flow of fluid in the chip.

49. The system of claim 28, wherein the chip comprises at least one fluidic channel, and wherein the extraction control module is configured to control a flow of fluid through the at least one fluidic channel to control the at least one of the stress applied to molecules of the biological material, the rotational orientation of molecules of the biological material, the translational position of molecules of the biological material, and the tension applied to molecules of the biological material.

50. The system of claim 28, wherein the extraction control module is configured to apply at least one of a mechanical tension, a hydrodynamic tension, and an electromagnetic tension to molecules of the biological material.

* * * * *